US006724546B2

(12) United States Patent
Nishimae et al.

(10) Patent No.: US 6,724,546 B2
(45) Date of Patent: Apr. 20, 2004

(54) LIGHT CONVERGING OPTICAL SYSTEM FOR CONVERGING LIGHT ONTO A REFLECTING OPTICAL-SPATIAL MODULATOR ELEMENT AND IMAGE DISPLAYING APPARATUS FOR DISPLAYING AN IMAGE FORMED BY LIGHT REFLECTED BY THE REFLECTING OPTICAL-SPATIAL MODULATOR ELEMENT

(75) Inventors: Junichi Nishimae, Tokyo (JP); Akira Sekiguchi, Tokyo (JP); Tomohiro Sasagawa, Tokyo (JP); Yoshiyuki Goto, Tokyo (JP); Kohei Teramoto, Tokyo (JP); Hiroyuki Kawano, Tokyo (JP); Tatsuki Okamoto, Tokyo (JP); Yukio Satou, Tokyo (JP); Atsuhiro Sono, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 2 days.

(21) Appl. No.: 10/267,797

(22) Filed: Oct. 10, 2002

(65) Prior Publication Data

US 2003/0202259 A1 Oct. 30, 2003

(30) Foreign Application Priority Data

Apr. 25, 2002 (JP) .......................................... 2002-124741
Apr. 30, 2002 (JP) .......................................... 2002-129087

(51) Int. Cl.[7] .............................. G02B 9/00; G02B 9/08
(52) U.S. Cl. ........................................ 359/740; 359/739
(58) Field of Search ................................ 359/726, 738, 359/739, 740

(56) References Cited

U.S. PATENT DOCUMENTS 5,442,414 A    8/1995   Janssen et al. ................. 353/98
5,633,755 A    5/1997   Manabe et al. ................. 359/443
6,382,799 B1   5/2002   Nishikawa et al. ............. 353/122
6,637,894 B2 * 10/2003  Dewald et al. ................. 353/97
2003/0147052 A1 * 8/2003  Penn et al. .................... 353/31

FOREIGN PATENT DOCUMENTS

JP    8-251520    9/1996
JP    2001-42256  2/2001
JP    2002-139698 5/2002

OTHER PUBLICATIONS

Dewald, D. Scott et al.; "Sequential Color Recapture and Dynamic Filtering: A Method of Scrolling Color", Proceedings of SID 01 DIGEST, pp. 1076–1079, (2001).

* cited by examiner

Primary Examiner—David N. Spector
(74) Attorney, Agent, or Firm—Leydig, Voit & Mayer, Ltd.

(57) ABSTRACT

Lengths of both sides of each end plane of a light-intensity distribution uniformizing element receiving a light flux and having an F-number of 1 are set to ½ of those of a reflecting surface of a reflecting optical-spatial modulator element, position information of uniformed light fluxes output from the light-intensity distribution uniformizing element is Fourier-transformed into diverging angle information indicated by incident light fluxes output from a first group of lenses, a relay deformed diaphragm intercepts an interference component of each incident light flux, which is expected to interfere with an outgoing light flux, to produce asymmetric light fluxes, the asymmetric light fluxes are incident on the reflecting optical-spatial modulator element, a projection lens deformed diaphragm removes stray light from outgoing light fluxes output from the reflecting optical-spatial modulator element, and an image is displayed according to the outgoing light fluxes.

19 Claims, 41 Drawing Sheets

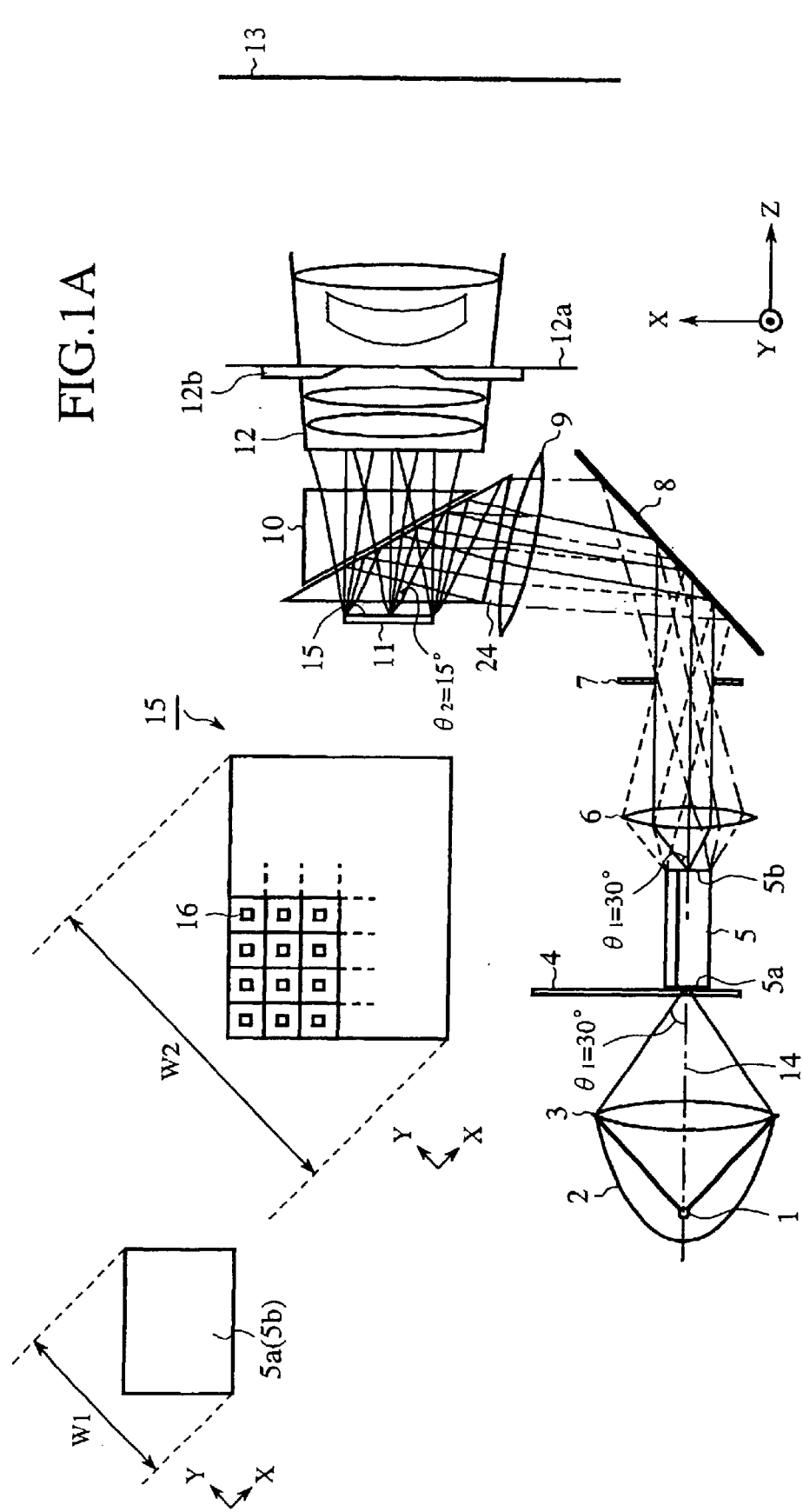

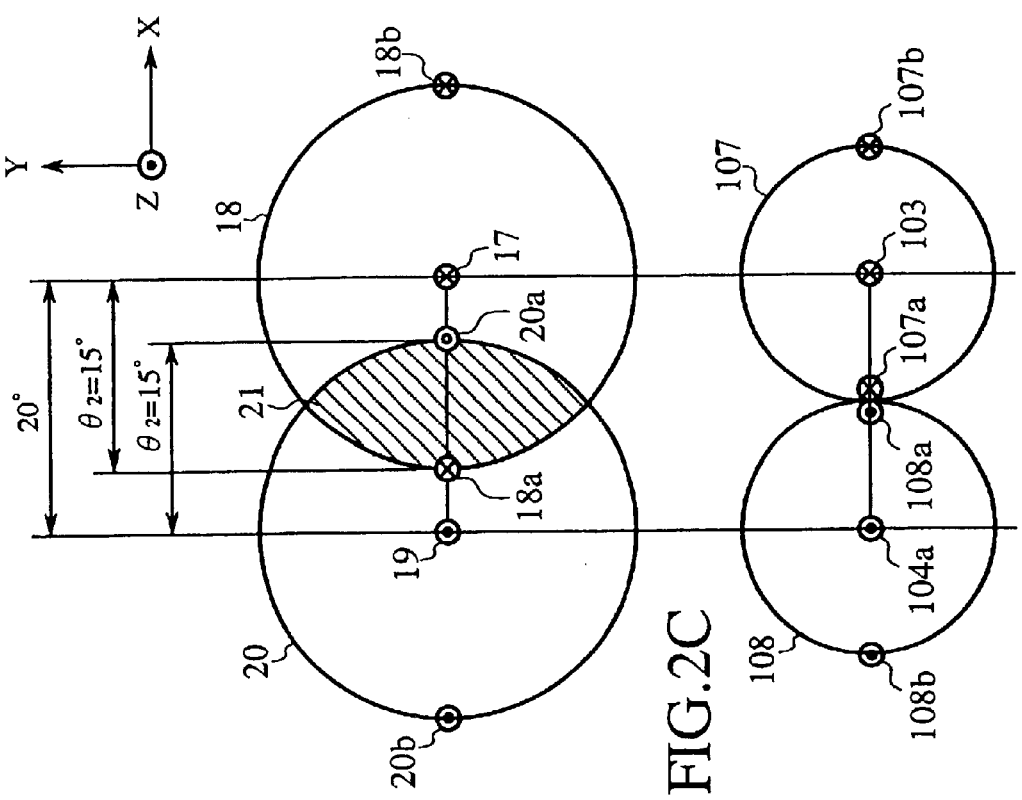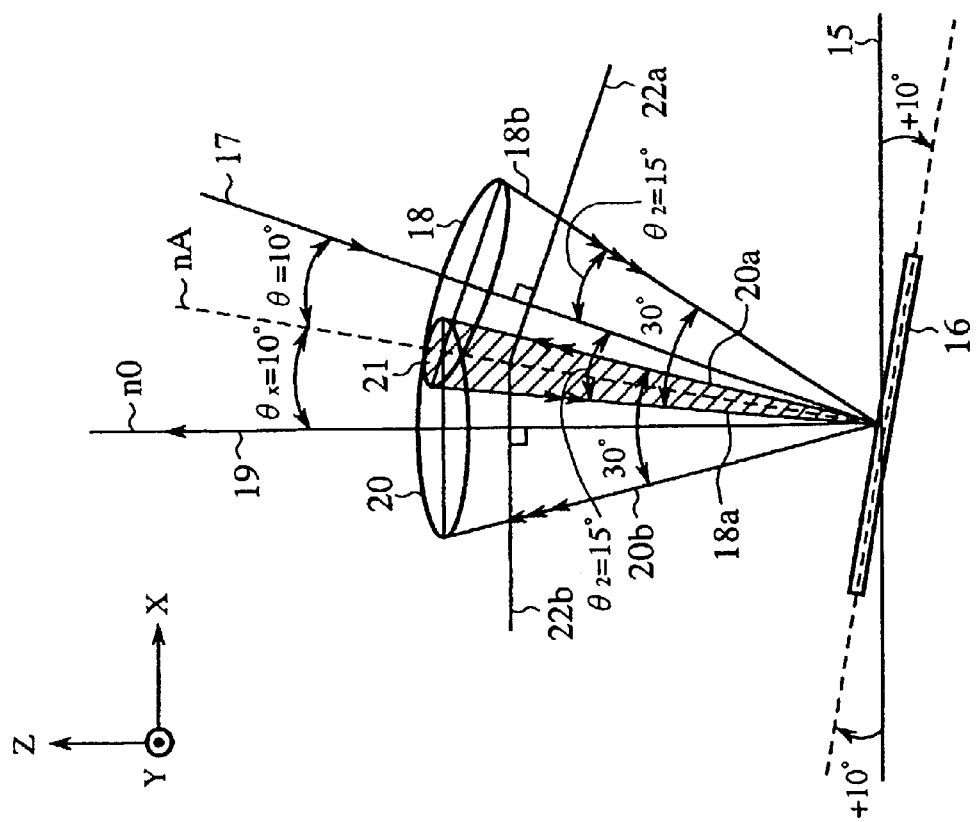

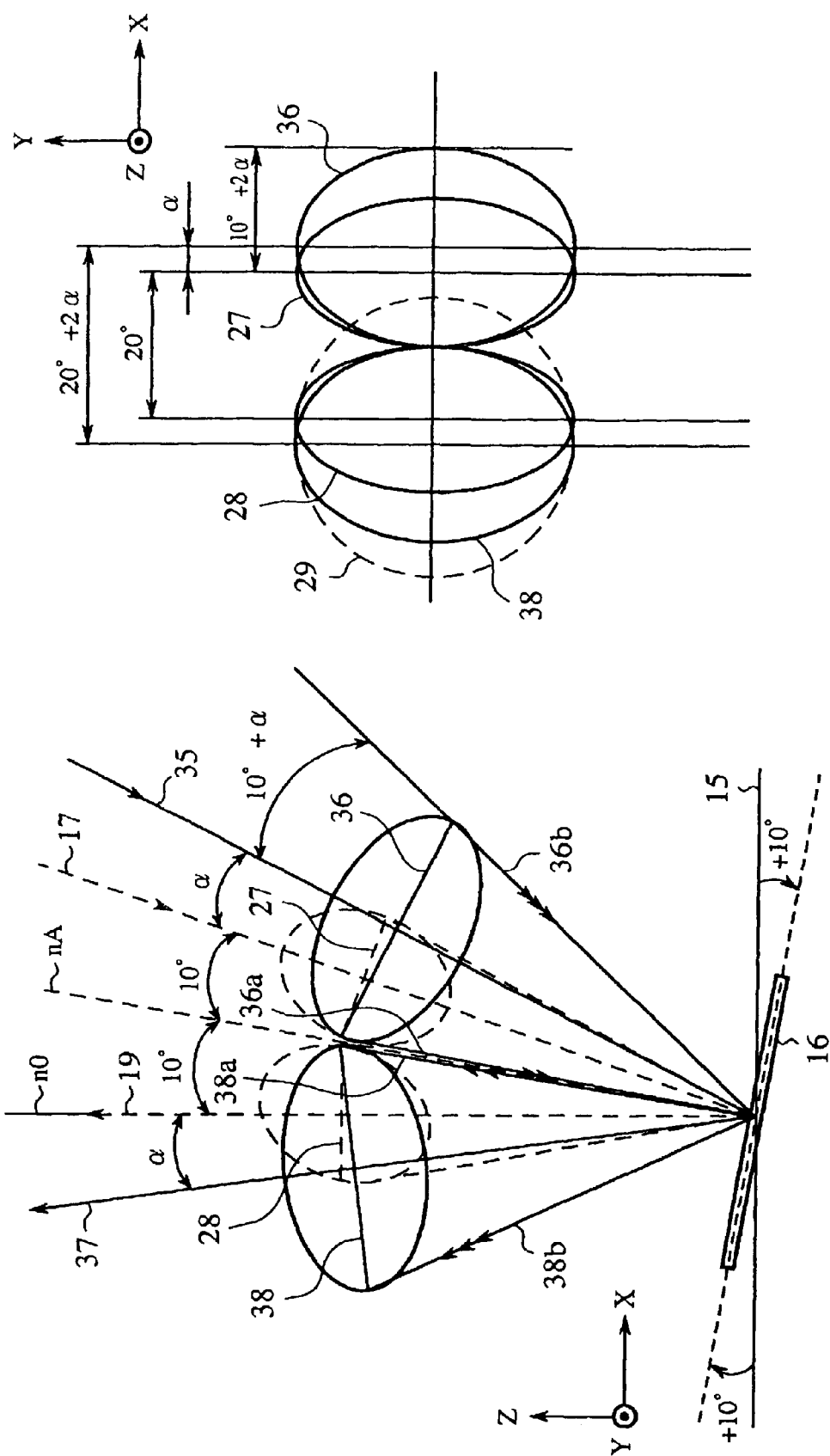

APERTURE SIZE OF REFLECTION FILM (φ)

| LIGHT RECYCLE OPTIC SYSTEM | ASYMMETRIC OPTIC SYSTEM | LIGHT RECYCLE OPTIC SYSTEM + ASYMMETRIC OPTIC SYSTEM |
|---|---|---|
| 1.1 MAGNIFICATIONS | 1.3 MAGNIFICATIONS | 1.8 MAGNIFICATIONS |

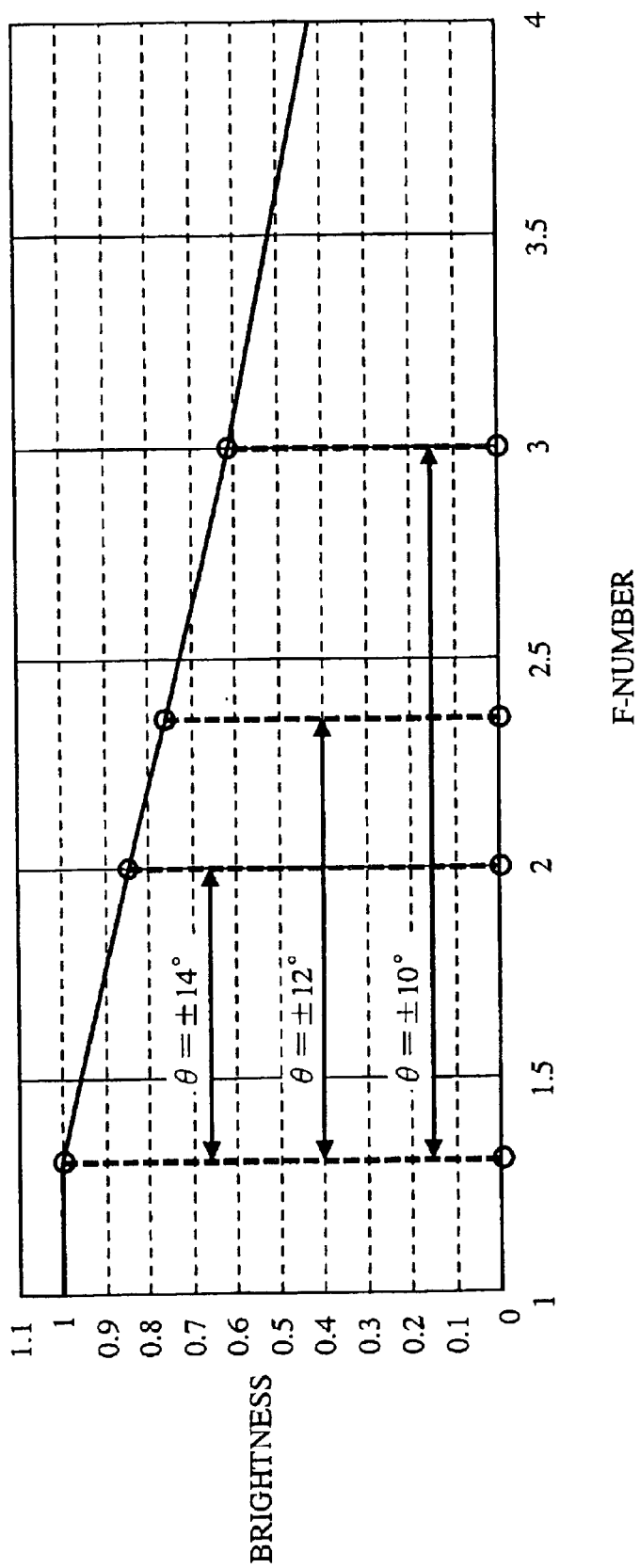

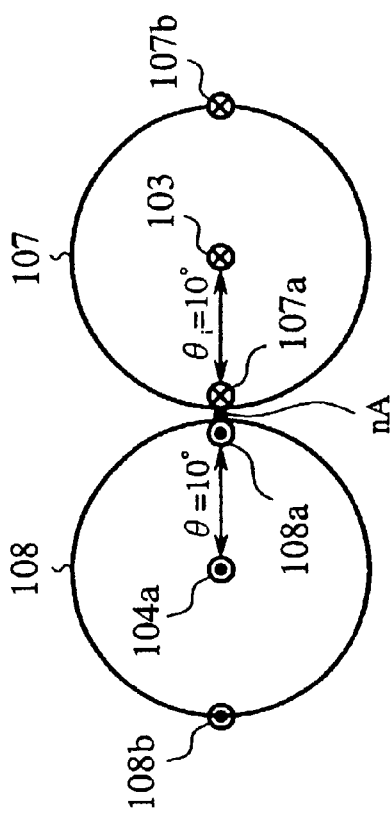
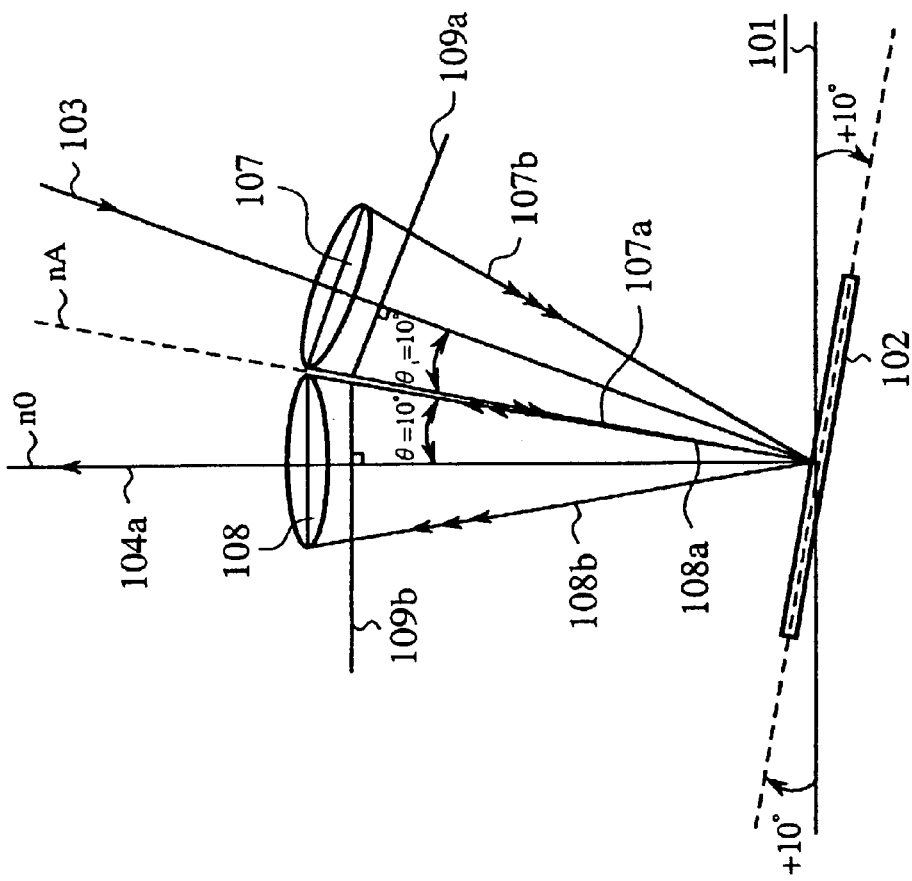
FIG.39A (PRIOR ART)
FIG.39B (PRIOR ART)

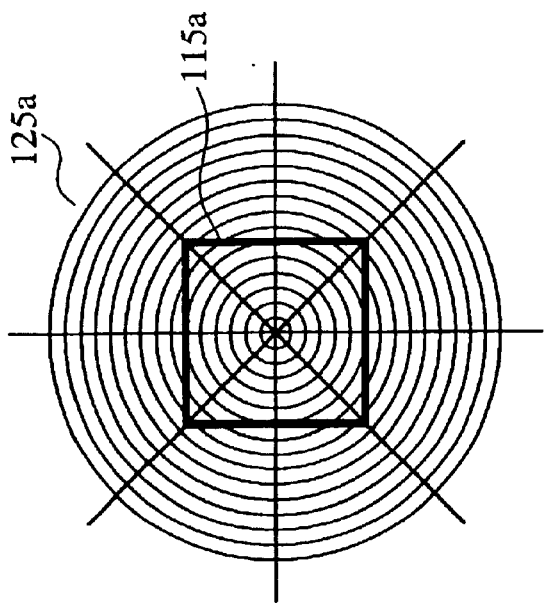
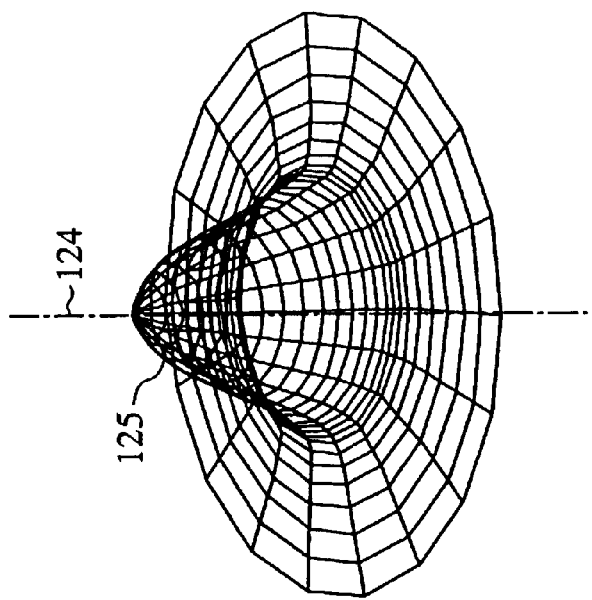
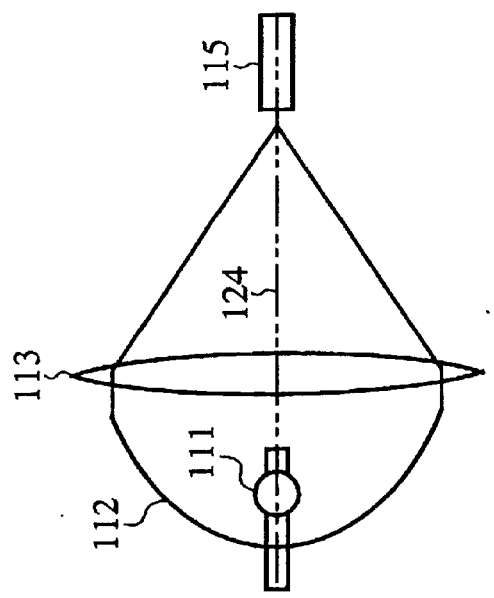
FIG. 42A (PRIOR ART)
FIG. 42B (PRIOR ART)
FIG. 42C (PRIOR ART)

LIGHT CONVERGING OPTICAL SYSTEM FOR CONVERGING LIGHT ONTO A REFLECTING OPTICAL-SPATIAL MODULATOR ELEMENT AND IMAGE DISPLAYING APPARATUS FOR DISPLAYING AN IMAGE FORMED BY LIGHT REFLECTED BY THE REFLECTING OPTICAL-SPATIAL MODULATOR ELEMENT

BACKGROUND OF THE INVENTION

1. Field of the Invention

The present invention relates to a light converging optical system in which rays of light planned to be incident on a reflecting optical-spatial modulator element are converged for the purpose of forming an image from the converged rays. Also, the present invention relates to an image displaying apparatus in which rays of light converged in the light converging optical system are incident on the reflecting optical-spatial modulator element to modulate the rays of light and to display an image reproduced from the modulated light. Also, the present invention relates to a projection image displaying apparatus, such as a digital light processing (DLP™) projector, in which a large number of microminors disposed in a reflecting optical-spatial modulator element in a two-dimensional matrix are respectively switched from an "on" state (or an "off" state) to an "off" state (or the "on" state) to modulate rays of light incident on the reflecting optical-spatial modulator element and to display an image reproduced from the modulated light.

2. Description of Related Art

A digital micro-mirror device (DMD™, hereinafter, simply called DMD) is, for example, used for an image displaying apparatus having a projection type screen. The DMD is formed of a reflection type semiconductor device and functions as a reflection type optical-spatial modulator element. An optical signal is intensity-modulated in the DMD by spatially changing the intensity of the light signal according to digital image information. The DMD used for the image displaying apparatus differs from a transmission type liquid crystal which receives light on a rear surface from a light converging optical system and outputs an intensity-modulated optical signal from a front plane to a projection type optical system. In the DMD used for the image displaying apparatus, a light converging optical system and a projection type optical system are disposed on a side of a reflecting surface of the DMD to form a reflecting optical system. On the reflecting surface of the DMD, a large number of micro-mirrors respectively having a size of 16 square $\mu$ m are disposed in a two-dimensional matrix shape at pitches (or intervals) of 17 $\mu$m. The number of micro-mirrors is equal to the number of pixels forming an image plane of a screen and is larger than hundreds of thousands. Each micro-mirror corresponds to one pixel. Therefore, when light radiated from a lamp light source is received as an optical signal on the reflecting surface of the DMD through a converging lens, the intensity of each optical signal is changed in the corresponding micro-mirror according to digital image information to obtain an intensity-modulated optical signal. The intensity-modulated optical signal is output from the reflecting surface of the DMD as an image information signal according to a time on-off control.

FIG. 37 is a partially enlarged schematic view of a reflecting surface of the DMD. FIG. 38 is an explanatory view of an operation of an inclination control performed for a micro-mirror.

In FIG. 37 and FIG. 38, 101 indicates a reflecting surface of the DMD. 102 indicates each of a plurality of square shaped micro mirrors disposed on the reflecting surface 101 of the DMD. Ar denotes a rotation axis of each micro-mirror. The inclination of the micro mirror 102 on the rotation axis Ar is controlled. The rotation axis Ar is placed on one diagonal line of the micro mirror 102. When a principal ray of a light flux is incident on the micro mirror 102, an incident direction of the principal ray projected on the reflecting surface 101 is parallel to the other diagonal line of the micro mirror 102 also, the incident direction of the principal ray is set to make an angle of 20 degrees to a normal n0 of the reflecting surface 101.

A binary control of on-off is performed for each micro-mirror 102 according to a control voltage based on digital image information stored in a memory, and the micro-mirror 102 is inclined on the rotation axis Ar. The inclination angle of each micro-mirror 102 is set to +10 degrees or −10 degrees, and a reflection direction of a light flux incident on the micro-mirror 102 is changed from a direction corresponding to an "on" state (or "off" state) to a direction corresponding to an "off" state (or "on" state). An operation of the inclination control performed for each micro-mirror 102 will be described below.

In FIG. 38, the reflecting surface 101 of the micro mirrors 102 is placed on the plane of horizontal. 102a indicates one micro-mirror inclined by an inclination angle of +10 degrees to the reflecting surface 101. That is, the micro-mirror 102a is set to an "on" state. 102b indicates a micro-mirror inclined by an inclination angle of −10 degrees to the reflecting surface 101. That is, the micro-mirror 102a is set to an "off" state. Therefore, each micro-mirror 102 make an angle of +10 degrees or −10 degrees to the reflecting surface 101 as the micro-mirror 102a or 102b. The micro-mirrors 102a and 102b are inclined on the rotation axis Ar. In this embodiment, the inclination on the rotation axis Ar in the clockwise direction is indicated by a positive inclination angle, and the inclination on the rotation axis Ar in the counterclockwise direction is indicated by a negative inclination angle.

103 indicates an incident principal ray of a converged incident light flux. The incident principal ray 103 radiated from a light converging optical system (not shown) is incident on the micro-mirror 102a or 102b. 104a indicates an outgoing principal ray of an outgoing light flux. The incident principal ray 103 reflected on the micro-mirror 102a goes out from the micro-mirror 102a as the outgoing principal ray 104a. 104b indicates an outgoing principal ray of another outgoing light flux. The incident principal ray 103 reflected on the micro-mirror 102b goes out from the micro-mirror 102b as the outgoing principal ray 104b. 105 indicates a screen. 105a indicates each of a plurality of pixels of the screen 105. The outgoing principal ray 104a reflected on the micro-mirror 102a is received in one pixel 105a of the screen 105. 106 indicates a projection lens of a projecting optical system. The projection lens 106 is placed between the reflecting surface 101 of the DMD and the screen 105, and the outgoing principal ray 104a transmitted through the projection lens 106 is projected on one pixel 105a of the screen 5.

The incident principal ray 103 makes an angle of 20 degrees to the normal n0 of the reflecting surface 101 and is incident on the micro-mirror 102a or the micro-mirror 102b. In cases where it is intended to project light on one pixel 105a of the screen 105, the inclination angle of one micro-mirror 102 corresponding to the pixel 105a is controlled to +10 degrees according to a control voltage. In this case, the incident principal ray 103 makes an angle of 10 degrees to a normal nA of the micro-mirror 102a and is incident on the micro-mirror 102a. Therefore, the incident principal ray 103 is reflected toward the direction of the normal n0 of the reflecting surface 101 as the outgoing principal ray 104a according to the law of reflection, the outgoing principal ray 104a passes through the projection lens 106, the outgoing principal ray 104a is received in the pixel 105a of the screen 5, and the pixel 105a is brightened (or set to "on" state).

In contrast, in cases where it is intended not to project light on one pixel 105a of the screen 105, the inclination angle of one micro-mirror 102 corresponding to the pixel 105a is controlled to −10 degrees according to another control voltage. In this case, the incident principal ray 103 makes an angle of 30 degrees to a normal nB of the micro-mirror 102b and is incident on the micro-mirror 102b. Therefore, the incident principal ray 103 is reflected as the outgoing principal ray 104b toward a direction making an angle of 40 degrees to the normal n0 of the reflecting surface 101 according to the law of reflection. Because the outgoing principal ray 104b is directed out of a pupil of the projection lens 106, the pixel 105a is not brighten by the outgoing principal ray 104b (or set to "off" state).

As is described above, in the DMD, the on-off control is performed for each micro-mirror 102 to incline the micro-mirror 102 by each of the angles of ±10 degrees to the reflecting surface 101. In this case, because the switching of the inclination angle from +10 degrees (−10 degrees) to −10 degrees (+10 degrees) is performed within a time period of 10 μsec, a light flux incident on the micro-mirror 102 can be modulated as an optical signal in the DMD at high speed.

As is realized from FIG. 38, because the micro-mirror 102 is controlled to be inclined at each of the angles of ±10 degrees, the outgoing principal ray 104b makes an angle of 60 degrees to the incident principal ray 103 in case of the "off" state. In contrast, the outgoing principal ray 104a makes an angle of 20 degrees to the incident principal ray 103 in case of the "on" state and is positioned nearest to the incident principal ray 103. Therefore, when light is converged by a lens to produce a light flux incident on the DMD from the light, to prevent the overlapping of the incident light flux with an outgoing light flux reflected on the micro-mirror 102a, an F-number F (F=f/d, the symbol f denotes a focal length of the lens, and the symbol d denotes a diameter of a stop of the lens) of the lens is restricted by the inclination angles of ±10 degrees.

The reason of the restriction of the F-number will be described in detail with reference to FIG. 39A and FIG. 39b.

FIG. 39A is a view showing both a conical incident light flux incident on one micro-mirror 102 at a diverging angle of 10 degrees corresponding to the F-number of Fi=3 and a conical outgoing light flux reflected on the micro-mirror 102 of the "on" state. The constituent elements, which are the same as those shown in FIG. 38, are indicated by the same reference numerals as those of the constituent elements shown in FIG. 38.

In FIG. 39A, 107 indicates an incident light flux formed in a conical shape and set to a diverging angle of 10 degrees corresponding to an F-number Fi=3 (that is, a diverging angle of 10 degrees). Here, a diverging angle of a light flux is defined as an angle between a principal ray of the light flux and a ray of the light flux furthest from the principal ray. Also, when parallel light is changed to a light flux having a diverging angle θ by a lens of an F-number F, the F-number F of the lens is expressed according to an equation F=1/(2× tan θ)). Therefore, in this specification, it is described that the F-number F corresponds to the diverging angle θ of the light flux. Also, Though the diverging angle θ of the light flux is generally expressed by "steradian" of a solid angle, a diverging angle of a light flux projected on a plane is considered in this specification for convenience of explanation, and the diverging angle is expressed by "degree" in this specification.

108 indicates an outgoing light flux formed in a conical shape corresponding to the F-number of Fi=3. The vertex of the conical shape of each light flux is positioned in the center of the micro-mirror 102. The diverging angle of each light flux is equal to 10 degrees. The incident light flux 107 indicates a light flux converging on the incident side when the light flux 107 is observed from the center of the micro-mirror 102. The outgoing light flux 108 indicates a light flux diverging on the outgoing side when the light flux 108 is observed from the center of the micro-mirror 102.

107a and 107b indicate incident rays included in the incident light flux 107 respectively. 108a and 108b indicate outgoing rays included in the outgoing light flux 108 respectively. The incident ray 107a is positioned nearest to the outgoing principal ray 104a among rays of the incident light flux 107. The incident ray 107b is positioned furthest from the outgoing principal ray 104a among rays of the incident light flux 107. The outgoing ray 108a is positioned nearest to the incident principal ray 103 among rays of the outgoing light flux 108. The outgoing ray 108b is positioned furthest from the incident principal ray 103 among rays of the outgoing light flux 108.

Therefore, the incident rays 107a and 107b are positioned on the most-outer side of the incident light flux 107 and respectively make an angle of 10 degrees to the incident principal ray 103. The incident rays 107a and 107b are incident on the micro-mirror 102 (or 102a) inclined by the angle of +10 degrees and are reflected on the micro-mirror 102. The reflected incident rays 107a and 107b go out as the outgoing rays 108a and 108b.

109a is a plane perpendicular to the incident principal ray 103 of the incident light flux 107. 109b is a plane perpendicular to the outgoing principal ray 104a of the outgoing light flux 108. A sectional view of both the incident light flux 107 taken along the plane 109a and the outgoing light flux 108 taken along the plane 109b is shown in FIG. 39B. In FIG. 39B, for convenience of explanation, it is regarded that the plane 109a is parallel to the plane 109b.

As shown in FIG. 39A and FIG. 39B, in case of the micro-mirror 102 (or 102a) corresponding to the "on" state, the incident principal ray 103 makes the angle of 20 degrees to the outgoing principal ray 104a. Therefore, in cases where a diverging angle θ of the incident light flux 107 is set to a fixed value in any direction centering around the incident principal ray 103, the incident ray 107a and the outgoing ray 108a passes through the same normal nA of the micro-mirror 102 in case of the diverging angle θ equal to 10 degrees.

Therefore, in cases where the diverging angle θ of the incident light flux 107 exceeds 10 degrees, a portion of the incident light flux 107 including the incident ray 107a undesirably interferes with a portion of the outgoing light flux 108 including the outgoing ray 108a. In other words, a lighting optical system providing the incident light flux 107 structurally overlaps with the projecting optical system receiving the outgoing light flux 108. To avoid the overlapping of the optical systems with each other, the diverging angle θ is set to 10 degrees, and the incident light flux 107 is prevented from interfering with the outgoing light flux 108.

Because the F-number of the lighting optical system corresponding to the diverging angle θ is expressed by 1/(2×tan θ) by using the refractive index of the air equal to 1, the minimum value of the F-number is equal to about 3 in case of the diverging angle θ set to 10 degrees. In general, the F-number indicates the brightness of the optical system. As the F-number becomes smaller (or as the diverging angle θ becomes larger), the brightness of the optical system is increased. Therefore, in the conventional light converging optical system structured so as to converge light onto the micro-mirror 102 controlled to the inclination angles of ±10 degrees, in cases where a light flux formed in a conical shape of the diverging angle θ=10 degrees (or the F-number equal to about 3) is incident on the micro-mirror 102, the most-brightened optical system can be obtained.

Next, a conventional image displaying apparatus using a light converging optical system for the DMD will be described below.

FIG. 40 is a view showing the configuration of a conventional image displaying apparatus using a light converging optical system.

In FIG. 40, 111 indicates a light emitting element for emitting light. 112 indicates a parabola reflector figured in a shape of a paraboloid of revolution. The light emitting element 111 is placed at a focal point of the parabola reflector 112, and the light emitted from the light emitting element 111 is reflected on the parabola reflector 112 so as to be changed to parallel light. A lamp light source is composed of the light emitting element 111 and the parabola reflector 112. 113 indicates a converging lens for changing the parallel light obtained in the lamp light source to a light flux. 114 indicates a color wheel for separating light of each primary color from the light flux obtained in the converging lens 113. In this prior art, a single-plate method is used. That is, red light (R), green light (G) and blue light (B) are separated one after another from the light flux in time division by using one color wheel 114. Thereafter, the red light (R), the green light (G) and the blue light (B) are radiated to the DMD 121 in time division one by one, and a color space formed of the three primary colors R, G and B is reproduced. However, it is applicable that a three-plate method be adopted to obtain the three primary colors R, G and B. That is, red light (R), green light (G) and blue light (B) of the three primary colors are separated from three light fluxes respectively by using three plates, and the red light (R), the green light (G) and the blue light (B) are independently radiated to the DMD 121.

115 indicates an integrator rod formed in a rectangular parallelepiped figure. In the integrator rod 115, the light flux color-separated in the color wheel 114 is received in an incident end plane, the light flux is changed to a plurality of light fluxes, intensities of the light fluxes are equalized, and the light fluxes having a uniform intensity distribution are output from an outgoing end plane of the integrator rod 115. 116 indicates a relay lens for relaying the light fluxes output from the integrator rod 115. 118 indicates a bending mirror for bending optical paths of the light fluxes. 119 indicates a field lens for properly adjusting directions of principal rays included in the incident light fluxes.

120 indicates a total internal reflection (TIR) prism. To prevent a light flux incident on the projecting optical system from being not received in an entrance section of the projecting optical system, only the incident light fluxes are totally reflected by the TIR prism 120, and a plurality of outgoing light fluxes are straightly transmitted through the TIR prism 120 without loosing any outgoing light flux. Therefore, the light converging optical system and the projecting optical system are structurally separated from each other.

121 indicates the DMD. The micro-mirrors 102 are disposed on the reflecting surface 101 of the DMD 121. 122 indicates a projection lens for forming an image from the light fluxes intensity-modulated in the DMD 121. 123 indicates a rear projection type screen. The light fluxes denoting the image formed in the projection lens 122 are received in a rear surface of the rear projection type screen 123, and the image is displayed on the screen 123. 124 indicates an optical axis of the constituent elements 111, 112, 113, 114, 115, 116, 118, 119, 120, 121, 122 and 123 of the conventional image displaying apparatus.

Next, an operation of the conventional image displaying apparatus will be described below.

The light emitting element 111 is made in a figure of a point light source within the limits of the possible and is disposed at a focal point of the parabola reflector 112. Therefore, light emitted from the light emitting element 111 is reflected by the parabola reflector 112 and is output as parallel light. The parallel light output from the parabola reflector 112 is converged onto a focal point of the converging lens 113 by the converging lens 113 as a light flux figured in a conical shape corresponding to the F-number of F1=1 (or a diverging angle θ1=30 degrees made to the optical axis 124). Because it is required to make small a converged diameter of the light flux in the use of the color wheel 114, the F-number of F1=1 is generally adopted as an optimum F-number.

In the color wheel 114, the light flux is converged at a small converging spot, and a specified primary color is selected from the three primary colors of the light flux. Thereafter, because the focal point of the converging lens 113 is positioned at the incident end plane of the integrator rod 115, the light flux of the selected primary color is incident on the incident end plane of the integrator rod 115. In the integrator rod 115, the light flux of the selected primary color is reflected on an internal side surface of the integrator rod 115 many times so as to produce a plurality of light fluxes and to equalize intensities of the light fluxes. Therefore, the light fluxes output from the outgoing end plane of the integrator rod 115 have a distribution of an almost uniform intensity in the outgoing end plane. Also, each light flux output from the integrator rod 115 is diverged at the F-number of F1=1 in the same manner as the light flux incident on the integrator rod 115.

Thereafter, the light fluxes are incident on the TIR prism 120 through the relay lens 116, the bending mirror 118 and the field lens 119. The light fluxes incident on the TIR prism 120 are reflected in the inside of the TIR prism 120 and are radiated to the micro-mirrors 102 of the DMD 121. Therefore, image information is given to the light fluxes in the DMD 121 according to digital image information, and intensity-modulated light fluxes having the image information are output from the DMD 121. In this case, the F-number of Fi=3 is selected for the light fluxes radiated to the micro-mirrors 102 of the DMD 121 as an optimum F-number.

Thereafter, the intensity-modulated light fluxes having the image information are again transmitted through the TIR prism 120 and are projected onto the screen 123 through the projection lens 122.

In the conventional image displaying apparatus, a size ratio of the incident end plane (or the outgoing end plane) of the integrator rod 115 to the reflecting surface of the DMD 121 is determined according to both the F-number (F1=1) of the light flux incident on the incident end plane of the integrator rod 115 and the F-number (Fi=3) of the light fluxes incident on the reflecting surface 101 of the DMD 121.

FIG. 41 is an explanatory view showing the relation in size between the integrator rod 115 and the DMD 121. The constituent elements, which are the same as those shown in FIG. 40, are indicated by the same reference numerals as those of the constituent elements shown in FIG. 40. The bending mirror 118, the field lens 119 and the TIR prism 120 are omitted for convenience of explanation, and the function of the field lens 119 is included in that of the relay lens 116. Also, though the light fluxes are actually incident on the DMD 121 at an angle (or an angle of incidence) of 20 degrees to the optical axis 124 of the DMD 121, because only incidence conditions of the light fluxes incident on the DMD 121 are described with reference to FIG. 41, a principal ray incident on the DMD 121 at right angles (or at an incidence angle of 0 degree) is additionally shown in FIG. 41.

In FIG. 41, w denotes a side length of the incident end plane and a side length of the outgoing end plane in the integrator rod 115 a denotes an optical path length between the integrator rod 115 and the relay lens 116. b denotes an optical path length between the relay lens 116 and the DMD 121. W denotes a side length of the reflecting surface of the DMD 121.

Also, θ1 denotes a diverging angle of a light flux output from the outgoing end plane of the integrator rod 115 with respect to the optical axis 124. θi denotes a diverging angle of a light flux incident on the reflecting surface of the DMD 121 with respect to the optical axis 124. In general, when each of the angles θ1 and θi is not set to a large value, the relation w/W=a/b=θi/θ1=F1/Fi is satisfied.

To use the color wheel 114, θ1=30 degrees (F1=1) is inevitably set. Also, θi=10 degrees (Fi=3) is set according to the use condition of the DMD 121 controlled to the inclination angles of ±10 degrees. Therefore, the relation w/W= a/b=θi/θ1=F1/Fi=⅓ is obtained. In other words, in the optical system shown in FIG. 41, the light flux is radiated from the integrator rod 115 having the side length w to the DMD 121 having the side length W through the relay lens 116 at the magnification W/w=3. Therefore, when the size of the reflecting surface of the DMD 121 and the angles θ1 and θi are determined, the size of the incident end plane and the outgoing end plane of the integrator rod 115 is automatically determined.

As is described above, because the conventional image displaying apparatus using the light converging optical system for the DMD 121 has the above-described configuration, the F-number of the light flux incident on the DMD 121 is restricted according to the inclination angle of the DMD 121. In this case, it is difficult to enlarge the incident end plane of the integrator rod 115 and to prevent the light flux from being not received in the integrator rod 115 as a result, a loss of the light flux to be received in the integrator rod 115 cannot be reduced, and a problem has arisen that the brightness of the image obtained in the optical system is undesirably restricted.

This problem will be described below in detail.

FIG. 42A is a view of the lamp light source composed of the light emitting element 111 and the parabola reflector 112. FIG. 42B shows an intensity distribution of rays converged onto the incident end plane of the integrator rod 115. FIG. 42C shows a positional relation between a projected image of the lamp light source and the incident end plane of the integrator rod 115.

As shown in FIG. 42A, in the light converging optical system applied to the conventional image displaying apparatus, rays of light are emitted in all directions from the light emitting element 111 made in a figure of a point light source within the limits of the possible, the rays of light are changed to a light flux set to the F-number of F1=1 (or the diverging angle θ of 30 degrees to the optical axis 124) in the parabola reflector 112 and the converging lens 113, and the light flux is converged onto the incident end plane 115a of the integrator rod 115. In this case, as shown in FIG. 42B, an intensity distribution 125 of rays of the light flux converged onto the incident end plane of the integrator rod 115 is formed in rotation symmetry on the optical axis 124.

Assuming that the lamp light source composed of the light emitting element 111 and the parabola reflector 112 has an infinitely small size, an area of the converging spot formed on the incident end plane of the integrator rod 115 is reduced to almost zero, and all the converged light flux is received in the integrator rod 115. However, because the light emitting element 111 has a certain size, when rays of light emitted in all directions are converged at the diverging angle of 30 degrees, the lamp light source is magnified and projected according to the same principle as that of a relay lens, and an image of the lamp light source is projected onto the incident end plane of the integrator rod 115.

As shown in FIG. 42C, the projected image 125A of the lamp light source is larger than the incident end plane 115a of the integrator rod 115. Therefore, all rays of light emitted from the lamp light source are not received in the integrator rod 115, a portion of the rays of light are converged out of the incident end plane 115a of the integrator rod 115 and are lost. As a result, light sent from the whole light converging optical system to the DMD 121 is undesirably lowered.

Also, in cases where the size of the incident end plane of the integrator rod 115 is increased to decrease an amount of light not received in the integrator rod 115, because the F-number (F1=1) of the light flux output from the converging lens 113 and the F-number (Fi=3) of the light flux incident on the DMD 121 are determined, it is required to increase the size of the DMD 121 so as to satisfy the relation of the magnification W/w=3. Therefore, a manufacturing cost of the conventional image displaying apparatus is undesirably increased.

Also, in the conventional image displaying apparatus, rays of light diverged at a wide diverging angle are incident on the projection lens 122. In this case, because a portion of the rays of light are reflected on the reflecting surface 101 of the DMD 121 or the TIR prism 120 according to the specular reflection, a specular reflection component of the light is undesirably incident on the projection lens 122 as stray light. Therefore, a problem has arisen that a contrast of the image is degraded.

Next, another prior art will be described.

Image displaying apparatuses have been improved to heighten a light use efficiency. In cases where the light use efficiency is heightened, an electric power provided to a lamp light source can be reduced, and the expected life span of image displaying apparatuses can be lengthened.

FIG. 43 is a view of the configuration of another conventional image displaying apparatus. FIG. 44 is a view of the configuration of a color wheel used for the conventional image displaying apparatus shown in FIG. 43.

In FIG. 43 and FIG. 44, 201 indicates a light source. 202 indicates a reflector. 203a and 203b indicate condensing lenses respectively. 204 indicates an integrator rod. 204*in* indicates an incident end plane of the integrator rod 204. 204*out* indicates an outgoing end plane of the integrator rod 204. 205 indicates a disk shaped color wheel. 205*r* indicates a red color filter of the color wheel 205. 205*b* indicates a blue color filter of the color wheel 205. 205*g* indicates a green color filter of the color wheel 205. 206 indicates a relay lens. 207 indicates a TIR prism. 208 indicates a DMD. 209 indicates a projection lens. 210 indicates a screen.

Next, an operation of the conventional image displaying apparatus shown in FIG. 43 will be described below. The color wheel 205 is rotated. When white light is emitted from the light source 201, the white light is reflected by the reflector 202 so as to be changed to parallel white light. This parallel white light is converged onto the incident end plane 204*in* of the integrator rod 204 as a white light flux by the condensing lenses 203*a* and 203*b* and is received in the integrator rod 204. The white light flux received in the integrator rod 204 is reflected many times in the inside of the integrator rod 204 so as to produce a plurality of white light fluxes and to equalize intensities of the white light fluxes in the outgoing end plane 204*out* of the integrator rod 204.

Thereafter, in the color wheel 205 with the color filters 205*r*, 205*b* and 205*g*, a plurality of red light fluxes (R), a plurality of blue light fluxes (B) and a plurality of green light fluxes (G) of three primary colors are separated one after another as a plurality of colored light fluxes from the white light fluxes output from the outgoing end plane 204*out* of the integrator rod 204.

FIG. 45 is a view showing a display condition of three color filters of the color wheel 205 in a single image frame time period. When the color wheel 205 shown in FIG. 44 is rotated, the red color filter 205*r*, the blue color filter 205*b* and the green color filter 205*g* of the color wheel 205 go across the white light one after another in that order every single image frame time period, and the white light is changed to red light, blue light and green light in that order every single image frame time period.

Returning to FIG. 43, the red light fluxes, the blue light fluxes and the green light fluxes separated from the white light fluxes in the color wheel 205 are radiated one after another to the DMD 208 through the relay lens 206 and the TIR prism 207 in the single image frame time period. Thereafter, when a plurality of colored light fluxes are incident on a plurality of micro-mirrors of the DMD 208 set to an "on" state, the colored light fluxes are reflected in an "on" direction by the DMD 208 so as to pass through the TIR prism 207, and the colored light fluxes are projected onto the screen 210 by the projection lens 209.

Also, to improve the light use efficiency in the conventional image displaying apparatus shown in FIG. 43, an image displaying apparatus using a light recycling optical system is disclosed in a literature I "Sequential Color Recapture and Dynamic Filtering" D. Scott Dewald, Steven M. Penn, and Michael Davis, Proc. of SID, pp. 1076–1079, 2001.

FIG. 46 is a view showing the configuration of a conventional image displaying apparatus using a light recycling optical system. FIG. 47 is a view showing the structure of a sequential color recapture (SCR) wheel of the conventional image displaying apparatus shown in FIG. 46. The constituent elements, which are the same as those shown in FIG. 43 and FIG. 44, are indicated by the same reference numerals as those of the constituent elements shown in FIG. 43 and FIG. 44.

In FIG. 46 and FIG. 47, 211 indicates a reflection film disposed on the incident end plane 204*in* of the integrator rod 204. 211*h* indicates an aperture of the reflection film 211. 212 indicates a color wheel peculiar to a light recycling optical system. The color wheel 212 is formed of a sequential color recapture (SCR) wheel disclosed in the literature I. 212*r*, 212*b* and 212*g* indicate a red color filter, a blue color filter and a green color filter of the SCR wheel 212 respectively. The color filters 212*r*, 212*b* and 212*g* of the SCR wheel 212 are formed in a volute pattern (or a "spiral of Archimedes" pattern).

Next, an operation of the conventional image displaying apparatus shown in FIG. 46 will be described below.

The SCR wheel 212 is rotated. When white light is emitted from the light source 201, the white light is reflected by the reflector 202 so as to be changed to parallel white light. This parallel white light is converged onto the incident end plane 204*in* of the integrator rod 204 as a white light flux by the condensing lenses 203*a* and 203*b*, passes through the aperture 211*h* of the reflection film 211, and is received in the integrator rod 204. The white light flux received in the integrator rod 204 is reflected many times in the inside wall of the integrator rod 204 so as to produce a plurality of white light fluxes and to equalize intensities of the white light fluxes in the outgoing end plane 204*out* of the integrator rod 204.

Thereafter, the white light fluxes output from the outgoing end plane 204*out* of the integrator rod 204 pass through the SCR wheel 212. In this case, the red light fluxes (R), the blue light fluxes (B) and the green light fluxes (G) of three primary colors are simultaneously separated from the white light fluxes in the SCR wheel 212.

FIG. 48 is a view showing the color filters 212*r*, 212*b* and 212*g* of the SCR wheel 212 going across the white light fluxes in a single image frame time period.

As shown in FIG. 48, the color filters 212*r*, 212*b* and 212*g* of the SCR wheel 212 go across the white light fluxes in a scanning direction in the single image frame time period.

Next, an operation peculiar to the light recycling optical system will be described below.

FIG. 49 is a view showing loci of rays of light passing through the integrator rod 204 in cases where the reflection film 211 is not disposed on the incident end plane 204*in* of the integrator rod 204. FIG. 50 is a view showing loci of rays of light passing through the integrator rod 204 in cases where the reflection film 211 is disposed on the incident end plane 204*in* of the integrator rod 204. The constituent elements, which are the same as those shown in FIG. 46 and FIG. 47, are indicated by the same reference numerals as those of the constituent elements shown in FIG. 46 and FIG. 47.

In FIG. 49 and FIG. 50, Ll indicates a ray of loss light causing the lowering of a light use efficiency. Lr indicates a ray of recycled light again used.

As shown in FIG. 49, assuming that the conventional image displaying apparatus using a light non-recycling optical system is operated, when the red light (R), the green light (G) and the blue light (B) of three primary colors are separated from the white light in the color filters 212*r*, 212*b* and 212*g* of the SCR wheel 212, colored light other than light of the selected primary color is reflected by the color filter corresponding to the selected primary color in the direction of the incident end plane 204*in* of the integrator rod 204. Because the reflected colored light goes out from the incident end plane 204*in* to the outside of the integrator rod 204, the reflected colored light other than light of the selected primary color cannot be used for the display of an image. Therefore, the reflected colored light is lost as the loss light Ll, and the light use efficiency in the case of the color-separation shown in FIG. 49 is almost equal to ⅓.

In contrast, as shown in FIG. 50, the reflection film 211 is disposed on the incident end plane 204*in* of the conventional image displaying apparatus using the light recycling optical system. Therefore, when the red light (R) separated in the red color filter 212*r* of the SCR wheel 212, the blue light (B) separated in the blue color filter 212*b* of the SCR wheel 212 and the green light (G) separated in the green color filter 212*g* of the SCR wheel 212 simultaneously pass through the SCR wheel 212, the other colored light is reflected on the color filters 212*r*, 212*b* and 212*g* of the SCR wheel 212. In this case, the other colored light is again reflected on the reflection film 211 and propagates toward the outgoing end plane 204*out* as the recycled light Lr. The recycled light Lr again reaches the SCR wheel 212. When the color of the recycled light Lr matches with one color filter of the SCR wheel 212, the recycled light Lr passes through the SCR wheel 212. Therefore, red light (R), blue light (B) and green light (G) of three primary colors are separated from the recycled light Lr in the SCR wheel 212, and the red light (R), the green light (G) and the blue light (B) separated from the recycled light Lr are used for the display of an image.

Therefore, because the light recycling optical system having the reflection film 211 and the SCR wheel 212 is used for the conventional image displaying apparatus, the light reflected by the SCR wheel 212 can be reused for the display of an image as the recycled light Lr, and the light use efficiency can be improved.

Here, the structure of the SCR wheel 212 differs from that of the color wheel 205, and the color filters 212*r*, 212*b* and 212*g* of the SCR wheel 212 are formed in a volute pattern. Therefore, because the color filters 212*r*, 212*b* and 212*g* are always arranged on the outgoing end plane 204*out* of the integrator rod 204, each primary color component of the light reflected toward the incident end plane 204*in* is again reflected on the reflection film 211 and passes through the color filter corresponding to the primary color component. Therefore, the light use efficiency is improved.

Returning to FIG. 46, the red light fluxes, the blue light fluxes and the green light fluxes separated from the white light fluxes in the SCR wheel 212 are simultaneously radiated to the DMD 208 through the relay lens 206 and the TIR prism 207 as colored light fluxes. When a plurality of colored light fluxes are incident on a plurality of micro-mirrors of the DMD 208 set to the "on" state, the colored light fluxes incident on the micro-mirrors are reflected in an "on" direction so as to pass through the TIR prism 207, and the colored light fluxes are projected onto the screen 210 by the projection lens 209.

The inventors of this application estimate that the light use efficiency in the conventional image displaying apparatus of FIG. 46 using the light recycling optical system is almost 1.1 times larger than that in the conventional image displaying apparatus of FIG. 43 using the light non-recycling optical system.

However, because the conventional image displaying apparatus shown in FIG. 46 has the above-described configuration, the light use efficiency is only almost 1.1 times larger than that in the conventional image displaying apparatus of FIG. 43. Therefore, a problem has arisen that the light use efficiency cannot be sufficiently improved.

This problem will be described in detail with reference to FIG. 50.

Only light passing through the aperture 211*h* of the reflection film 211 can be received in the integrator rod 204, and loss light Ll converged by the condensing lenses 203*a* and 203*b* on the incident end plane 204*in* of the integrator rod 204 and reflected on the reflection film 211 cannot be used for the display of an image even though the light recycling optical system is used for the conventional image displaying apparatus. An amount of the loss light Ll depends on the area of the reflection film 211. Therefore, the more the area of the reflection film 211 is increased to reuse the loss light L, the more the light receiving efficiency is lowered. Therefore, the light use efficiency cannot be sufficiently improved.

Also, in the conventional image displaying apparatuses shown in FIG. 43 and FIG. 46, a plurality of micro-mirrors (not shown) are arranged on the DMD 208. Each micro-mirror is inclined by an inclination angle in a clockwise direction or a counter-clockwise direction to direct the light flux reflected on the micro-mirror in the "on" direction or the "off" direction. To prevent the interference between the incident light flux incident on the micro-mirror and the outgoing light flux reflected on the micro-mirror, a diverging angle of the incident light flux corresponding to the F-number is determined according to the inclination angle of the micro-mirror. In this case, because the diverging angle of the light flux incident on the incident end plane 204*in* of the integrator rod 204 is generally set to 30 degrees, the size of the incident end plane 204*in* of the integrator rod 204 is determined according to the relation w/W=a/b=θi/θ1=F1/Fi described with reference to FIG. 40. This size of the incident end plane 204*in* is called a regular size. Therefore, when the incident end plane 204*in* of the integrator rod 204 is set to a size larger than the regular size, the diverging angle of an incident light flux incident on the micro-mirror exceeds the inclination angle of the micro-mirror, and a portion of the incident light flux incident on the micro-mirror overlaps with a portion of the outgoing light flux reflected on the micro-mirror. In this case, the incident light flux and the outgoing light flux interfere with each other. Therefore, the incident end plane 204*in* of the integrator rod 204 is necessarily set to the regular size.

Also, in the conventional image displaying apparatus shown in FIG. 46, the reflection film 211 is disposed on the incident end plane 204*in* of the integrator rod 204 having the regular size, an area of the aperture 211*h* of the reflection film 211 cannot be sufficiently enlarged, and the light receiving efficiency of the integrator rod 204 is inevitably reduced due to the area of the reflection film 211 other than the aperture 211*h*. Therefore, the light use efficiency cannot be sufficiently improved.

Also, because the light source 201 is generally formed of a high pressure mercury lamp, a light emitting area of the light source 201 is determined by an arc size of the light source 201. Therefore, a converged spot of a light flux obtained by the condensing lenses 203*a* and 203*b* has a certain size and is larger than the incident end plane of the integrator rod 204. For example, an arc size of the light source 201 is φ1.0 mm×1.4 mm (a diameter of 1 mm×1.4 mm length). The inclination angle of each micro-mirror of the DMD 208 is +10 degrees or −10 degrees. A length of a diagonal line of a reflecting surface of the DMD 208 is equal to 0.74 inch (about 18.8 mm). In this case, because the diverging angle of the light flux incident on the integrator rod 204 is equal to 30 degrees which is tree times larger than the inclination angle, the regular size of the incident end plane 204*in* of the integrator rod 204 is equal to 5 mm×3.8 mm.

FIG. 51 is a view showing the relation between a light receiving efficiency and a light recycle efficiency when the incident end plane 204*in* of the integrator rod 204 is set to the regular size of 5 mm×3.8 mm. The light receiving efficiency is defined as a ratio of a quantity of light received in the integrator rod 204 to a quantity of light emitted from the light source 201 of the conventional image displaying apparatus shown in FIG. 46. Also, a reference quantity of light passing through the SCR wheel 212 is measured on condition that no reflection film is disposed on the incident end plane 204*in* of the integrator rod 204, and the light recycle efficiency is defined as a ratio of a quantity of light passing through the SCR wheel 212 of the conventional image displaying apparatus shown in FIG. 46 to the reference quantity of light.

As is shown in FIG. 51, the regular size of the incident end plane 204*in* of the integrator rod 204 is smaller than a size of a converged spot of the light converged by the condensing lenses 203*a* and 203*b*, so that the maximum of the light receiving efficiency is equal to about 75%. When the size of the aperture 211*h* of the reflection film 211 is enlarged, the light receiving efficiency is increased, but the light recycle efficiency is decreased. Therefore, the light receiving efficiency and the light recycle efficiency are set in the trade-off relation.

FIG. 52 is a view showing a light use efficiency when the incident end plane 204*in* of the integrator rod 204 is set to the regular size of 5×3.8 mm. The light use efficiency is defined as a product value of the light receiving efficiency and the light recycle efficiency. In this case, the light use efficiency is minimized at the aperture size of about 6.2 mm in diameter (the light recycle efficiency of 1.0 and the light receiving efficiency of 75%), the light use efficiency is normalized to unity at the aperture size of about 6.2 mm by multiplying the light use efficiency by 1/0.75. When the size of the aperture 211*h* of the reflection film 211 is set to about 93.5 mm, the light use efficiency is maximized. Therefore, the maximum of the light use efficiency is only 1.1 times of that in the conventional image displaying apparatus shown in FIG. 43.

SUMMARY OF THE INVENTION

A main object of the present invention is to provide, with due consideration to the drawbacks of the conventional image displaying apparatus, a light converging system in which light is converged so as to be efficiently incident on a reflection type optical-spatial modulator element without being restricted by an inclination angle of each micro-mirror disposed on the reflection type optical-spatial modulator element.

Also, the main object of the present invention is to provide an image displaying apparatus in which the brightness of an image formed by light sent from the light converging system is improved without being restricted by an inclination angle of each micro-mirror disposed on the reflection type optical-spatial modulator element.

Also, a first subordinate object of the present invention is to provide an image displaying apparatus in which a contrast of the image is improved.

Also, a second subordinate object of the present invention is to provide an image displaying apparatus in which a light use efficiency is considerably improved.

The main object is achieved by the provision of a light converging optical system including a converging lens, a light-intensity distribution uniformizing element and a relay optical system. Light emitted from a lamp light source is changed by the converging lens to a first light flux having a first diverging angle corresponding to a first F-number. In light-intensity distribution uniformizing element, the first light flux is changed to a plurality of second light fluxes respectively corresponding to the first F-number, intensities of the second light fluxes are equalized in an outgoing end plane, and the second light fluxes having a uniform intensity distribution are output. In the relay optical system, each second light flux output from the light-intensity distribution uniformizing element is changed to a third light flux having a second diverging angle larger than the inclination angle of each micro-mirror of the reflection type optical-spatial modulator element, and the third light flux of the second diverging angle is relayed to a reflection type optical-spatial modulator element.

The relay optical system includes a first group of lenses, a relay deformed diaphragm and a second group of lenses. A Fourier transformation plane is formed by the first group of lenses. In the Fourier transformation plane, position information indicating positions of rays of the second light fluxes in the outgoing end plane of the light-intensity distribution uniformizing element is transformed into diverging angle information indicating diverging angles of rays of light to an optical axis of the light-intensity distribution uniformizing element. The relay deformed diaphragm is disposed in the neighborhood of the Fourier transformation plane. In the relay deformed diaphragm, the rays of light having the diverging angle information is received from the first group of lenses, a portion of the rays of light functioning as an interference component in the reflection on a micro-mirror set to an "on" state in the reflection type optical-spatial modulator element is intercepted according to the diverging angle information. In the second group of lenses, the rays of light passing through the relay deformed diaphragm are changed to the third light fluxes of the second diverging angle, and the third light fluxes are output to the reflection type optical-spatial modulator element.

Therefore, the third light fluxes are respectively formed in an asymmetric shape in section. In this case, even though each second light flux is changed to the third light flux having a second diverging angle larger than the inclination angle of each micro-mirror of the reflection type optical-spatial modulator element, because a portion of the rays of light functioning as an interference component in the reflection on a micro-mirror set to an "on" state in the reflection type optical-spatial modulator element is intercepted by the relay deformed diaphragm, any portion of each third light flux incident on the corresponding micro-mirror does not overlap with a portion of an outgoing light flux reflected on the micro-mirror.

Accordingly, the contrast of an image formed from the third light fluxes can be maintained, and light is converged so as to be efficiently incident on the reflection type optical-spatial modulator element without being restricted by the inclination angle of each micro-mirror disposed on the reflection type optical-spatial modulator element.

The main object is achieved by the provision of an image displaying apparatus including a converging lens, a light-intensity distribution uniformizing element, a relay optical system, a projecting optical system and a screen. Light emitted from a lamp light source is changed by the converging lens to a first light flux having a first diverging angle corresponding to a first F-number. In light-intensity distribution uniformizing element, the first light flux is changed to a plurality of second light fluxes respectively corresponding to the first F-number, intensities of the second light fluxes are equalized in an outgoing end plane, and the second light fluxes having a uniform intensity distribution are output. In the relay optical system, each second light flux output from the light-intensity distribution uniformizing element is changed to a third light flux having a second diverging angle larger than the inclination angle of each micro-mirror of the reflection type optical-spatial modulator element, and the third light flux of the second diverging angle is relayed to the reflection type optical-spatial modulator element. In the reflection type optical-spatial modulator element, the third light fluxes receive image information. Thereafter, the third light fluxes are projected onto the screen by the projecting optical system, and an image is displayed on the screen according to the image information included in the third light fluxes projected by the projecting optical system.

The relay optical system includes a first group of lenses, a relay deformed diaphragm and a second group of lenses. A Fourier transformation plane is formed by the first group of lenses. In the Fourier transformation plane, position information indicating positions of rays of the second light fluxes in the outgoing end plane of the light-intensity distribution uniformizing element is transformed into diverging angle information indicating diverging angles of rays of light to an optical axis of the light-intensity distribution uniformizing element. The relay deformed diaphragm is disposed in the neighborhood of the Fourier transformation plane. In the relay deformed diaphragm, the rays of light having the diverging angle information is received from the first group of lenses, a portion of the rays of light functioning as an interference component in the reflection on a micro-mirror set to an "on" state in the reflection type optical-spatial modulator element is intercepted according to the diverging angle information. In the second group of lenses, the rays of light passing through the relay deformed diaphragm are changed to the third light fluxes of the second diverging angle, and the third light fluxes are output to the reflection type optical-spatial modulator element.

Therefore, the third light fluxes are respectively formed in an asymmetric shape in section. In this case, even though each second light flux is changed to the third light flux having a second diverging angle larger than the inclination angle of each micro-mirror of the reflection type optical-spatial modulator element, because a portion of the rays of light functioning as an interference component in the reflection on a micro-mirror set to an "on" state in the reflection type optical-spatial modulator element is intercepted by the relay deformed diaphragm, any portion of each third light flux incident on the corresponding micro-mirror does not overlap with a portion of an outgoing light flux reflected on the micro-mirror.

Accordingly, the contrast of an image formed from the third light fluxes can be maintained.

Also, because each third light flux has a second diverging angle larger than the inclination angle of each micro-mirror of the reflection type optical-spatial modulator element, a size of an end plane of the light-intensity distribution uniformizing element can be enlarged. Therefore, a light receiving efficiency of the light-intensity distribution uniformizing element can be heightened. Accordingly, the brightness of the image displayed on the screen can be improved without being restricted by the inclination angle of each micro-mirror disposed on the reflection type optical-spatial modulator element.

To achieve the first subordinate object, it is preferred that the projecting optical system includes an incident-side lens for producing a projecting optical system Fourier transformation plane in which position information indicating positions of a plurality of micro-mirrors set to the "on" state on a reflecting surface of the reflection type optical-spatial modulator element is transformed into diverging angle information indicating diverging angles of rays of a portion of third light fluxes reflected on the micro-mirrors with respect to the optical axis of the light-intensity distribution uniformizing element, a projecting optical system deformed diaphragm, disposed in the neighborhood of the projecting optical system Fourier transformation plane produced by the incident-side lens, for passing the third light fluxes reflected on the micro-mirrors of the "on" state sent from the incident-side lens and intercepting light other than the third light fluxes according to the diverging angle information indicated by the third light fluxes, and an outgoing-side lens for outputting the third light fluxes passing through the projecting optical system deformed diaphragm to the screen.

Because the projecting optical system deformed diaphragm intercepts light other than the third light fluxes, stray light is removed from the third light fluxes. Accordingly, a contrast of the image can be improved.

To achieve the second subordinate object, it is preferred that the image displaying apparatus further includes a reflection film with an aperture, disposed on an incident end plane of the light-intensity distribution uniformizing element, for passing the first light flux through the aperture, and a sequential color recapture wheel, disposed on the outgoing end plane of the light-intensity distribution uniformizing element, for separating light of a color from the second light fluxes which are produced in the light-intensity distribution uniformizing element from the first light flux passing through the aperture of the reflection film.

Therefore, light reflected on the sequential color recapture wheel is reflected on the reflection film and passes through the sequential color recapture wheel. Accordingly, a light use efficiency can be considerably improved.

The main object is also achieved by the provision of an image displaying apparatus including a lamp light source, light changing means, a converging lens, a light-intensity distribution uniformizing element, a rely optical system, a projecting optical system and a screen.

In the light changing means, a width of light emitted from the lamp light source is changed to a first width in a first co-ordinate axial direction perpendicular to a propagation direction of the light, and the width of the light emitted from the lamp light source is changed to a second width larger than the first width in a second co-ordinate axial direction perpendicular to both the propagation direction of the light and the first co-ordinate axial direction. In the converging lens, the light changed by the light changing means is converged to a first light flux in which a diverging angle in the second co-ordinate axial direction is larger than that in the first co-ordinate axial direction. In the light-intensity distribution uniformizing element, the first light flux is changed to a plurality of second light fluxes. A diverging angle of each second light flux in the second co-ordinate axial direction is larger than that in the first co-ordinate axial direction. Intensities of the second light fluxes are equalized in an outgoing end plane of the light-intensity distribution uniformizing element, and each second light flux is output. In the relay optical system, each second light flux output from the light-intensity distribution uniformizing element is changed to a third light flux. A diverging angle of the third light flux in the second co-ordinate axial direction is larger than that in the first co-ordinate axial direction and is larger than the inclination angle of the corresponding micro-mirror of the reflection type optical-spatial modulator element. Thereafter, the third light fluxes is relayed to the reflection type optical-spatial modulator element while making the second co-ordinate axial direction be parallel to a rotation axis each micro-mirror of the reflection type optical-spatial modulator element. In the reflection type optical-spatial modulator element, the third light fluxes receive image information. Thereafter, the third light fluxes are projected onto the screen by the projecting optical system, and an image is displayed on the screen according to the image information included in the third light fluxes projected by the projecting optical system.

Therefore, each third light flux is formed in an elliptical shape in section. In this case, even though the diverging angle of the third light flux in the second co-ordinate axial direction is larger than the inclination angle of the corresponding micro-mirror of the reflection type optical-spatial modulator element, because the second co-ordinate axial direction be parallel to a rotation axis each micro-mirror of the reflection type optical-spatial modulator element, any portion of each third light flux incident on the corresponding micro-mirror does not overlap with a portion of an outgoing light flux reflected on the micro-mirror.

Accordingly, the contrast of an image formed from the third light fluxes can be maintained.

Also, because the diverging angle of the third light flux in the second co-ordinate axial direction is larger than the inclination angle of the corresponding micro-mirror of the reflection type optical-spatial modulator element, a size of an end plane of the light-intensity distribution uniformizing element can be enlarged. Therefore, a light receiving efficiency of the light-intensity distribution uniformizing element can be heightened. Accordingly, the brightness of the image displayed on the screen can be improved without being restricted by the inclination angle of each micromirror disposed on the reflection type optical-spatial modulator element.

BRIEF DESCRIPTION OF THE DRAWINGS

FIG. 1A is a view of an image displaying apparatus using a light converging optical system according to a first embodiment of the present invention;

FIG. 1B is a front view of a light-intensity distribution uniformizing element arranged in the image displaying apparatus shown in FIG. 1A;

FIG. 1C is a front view of a reflection type optical-spatial modulator element arranged in the image displaying apparatus shown in FIG. 1A;

FIG. 2A is a view of both a conical shaped light flux incident on a micro-minor in an "on" state and a conical shaped light flux outgoing from the micro-minor at a diverging angle of 15 degrees;

FIG. 2B shows an incident light flux cut along a plane and an outgoing light flux cut along another plane;

FIG. 2C shows the comparison of the incident light flux and the outgoing light flux shown in FIG. 2B with light fluxes shown in FIG. 39B;

FIG. 18A is a view showing an incident elliptical light flux incident on a micro-minor set to an "on" condition and an outgoing elliptical light flux reflected on the micro-minor;

FIG. 18B is a sectional view of both the incident elliptical light flux and the outgoing elliptical light flux shown in FIG. 18A;

FIG. 35 is a graphic view showing the brightness of an image with respect to an F-number corresponding to an asymmetric light flux incident on a reflection type optical-spatial modulator element;

FIG. 39A is a view showing both a light flux incident on one micro-mirror at an F-number of Fi=3 and a light flux reflected by the micro-mirror;

FIG. 39B is a sectional view of an incident light flux and an outgoing light flux taken along planes respectively;

FIG. 42A is a view of a lamp light source composed of a light emitting element and a parabolic reflector;

FIG. 42B shows an intensity distribution of rays converged onto an incident end plane of a integrator rod;

FIG. 42C shows a positional relation between a projected image of the lamp light source and the incident end plane of the integrator rod;

DETAILED DESCRIPTION OF THE PREFERRED EMBODIMENTS

Figure 3:
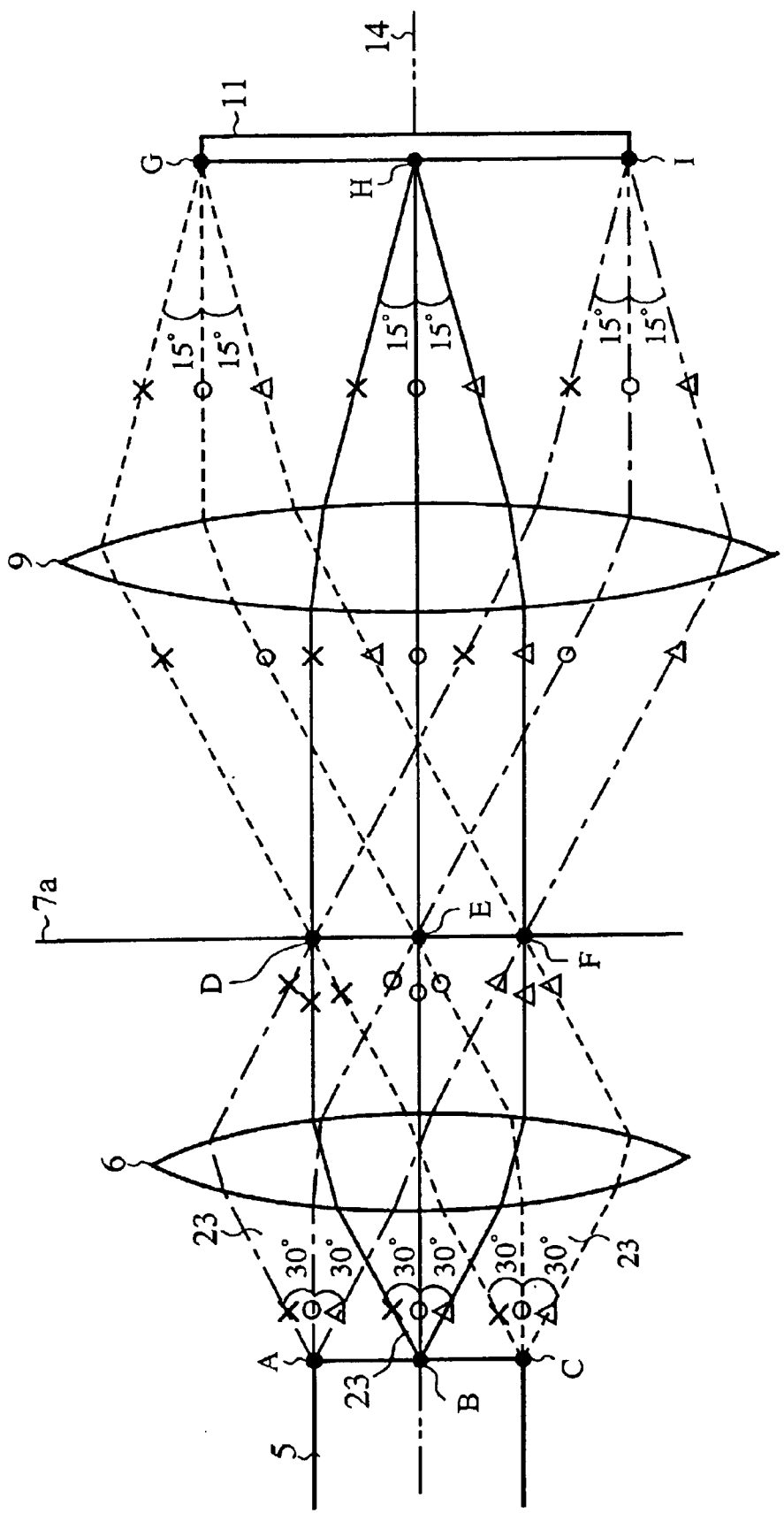
FIG. 3 is an explanatory view showing functions of a first group of lenses, a relay deformed diaphragm and a second group of lenses arranged in the image displaying apparatus shown in FIG. 1A.

Embodiments of the present invention will now be described with reference to the accompanying drawings.
Embodiment 1

FIG. 1A is a view of an image displaying apparatus using a light converging optical system according to a first embodiment of the present invention. FIG. 1B is a front view of a light-intensity distribution uniformizing element arranged in the image displaying apparatus. FIG. 1C is a front view of a reflection type optical-spatial modulator element arranged in the image displaying apparatus.

In FIG. 1A, 1 indicates a light emitting element (or a lamp light source) for emitting light. 2 indicates a parabola reflector (or the lamp light source) figured in a shape of a paraboloid of revolution. The light emitting element 1 is placed at a focal point of the parabola reflector 2. Therefore, the light emitted from the light emitting element 1 is changed to parallel light by the parabola reflector 2. 3 indicates a converging lens for converging the parallel light reflected by the parabola reflector 2 to form a light flux (or a first light flux). 4 indicates a color wheel for separating light of each primary color from the light flux converged by the converging lens 3. In this embodiment, a single-plate method is used. That is, red light (R), green light (G) and blue light (B) of three primary colors are separated one after another from the light flux in time division by using one color wheel 4. The red light (R), the green light (G) and the blue light (B) are radiated to a reflection type optical-spatial modulator element one by one, and a color space formed of the three primary colors R, G and B is reproduced. However, it is applicable that a three-plate method be adopted to obtain the three primary colors R, G and B. That is, red light (R), green light (G) and blue light (B) of the three primary colors are separated from three light fluxes respectively by using three plates, and the red light (R), the green light (G) and the blue light (B) are independently radiated to a reflection type optical-spatial modulator element.

5 indicates a light-intensity distribution uniformizing element formed in a rectangular parallelepiped figure. The light color-separated in the color wheel 4 is received in an incident end plane 5a of the light-intensity distribution uniformizing element 5. In the light-intensity distribution uniformizing element 5, a plurality of light fluxes (or a plurality of second light fluxes) are produced from the incident light flux, intensities of the light fluxes are equalized while reflecting the light fluxes on an internal wall, and the light fluxes having a uniform light-intensity distribution are output from an outgoing end plane 5b of the light-intensity distribution uniformizing element 5. Therefore, the light-intensity distribution uniformizing element 5 functions in the same manner as integrator rod 115 shown in FIG. 40. 6 indicates a first group of lenses (or a relay optical system) for changing rays of each light flux output from the light-intensity distribution uniformizing element 5 to parallel rays. The first group of lenses 6 is shown by a single representative lens in FIG. 1A for convenience. 7 indicates a relay deformed diaphragm (or the relay optical system) for intercepting a portion of each group of parallel rays output from the first group of lenses 6 to reshape the group of parallel rays. 8 indicates a bending mirror for bending each group of the reshaped parallel rays obtained by the relay deformed diaphragm 7. 9 indicates a second group of lenses (or the relay optical system) for adjusting propagation directions of principal rays of each group of the reshaped parallel rays bent by the bending mirror 8 to produce an asymmetric light flux for each light flux output from the light-intensity distribution uniformizing element 5. Therefore, the asymmetric light fluxes are formed by the functions of the first group of lenses 6, the relay deformed diaphragm 7 and the second group of lenses 9.

10 indicates a total internal reflection (TIR) prism. To prevent a portion of the asymmetric light fluxes incident on a projecting optical system from being not received in an entrance section of the projecting optical system, only the asymmetric light fluxes incident on the TIR prism 10 are totally reflected by the TIR prism 10, and the asymmetric light fluxes going out from the TIR prism 10 are straightly transmitted through the TIR prism 10 without loosing a power of the outgoing asymmetric light flux. Therefore, the light converging optical system and the projecting optical system are optically separated from each other.

11 indicates a reflection type optical-spatial modulator element. A large number of micro-mirrors 16 respectively formed in a square shape are disposed on a reflecting surface 15 of the reflection type optical-spatial modulator element 11 in a two-dimensional matrix (refer to FIG. 1C). An aspect ratio of the reflecting surface 15 of the reflection type optical-spatial modulator element 11 is, for example, set to be 3:4. Each micro-mirror 16 is controlled to be inclined at an angle of +10 degrees corresponding to an "on" state or −10 degrees corresponding to an "off" state. The asymmetric light fluxes formed by the first group of lenses 6, the relay deformed diaphragm 7 and the second group of lenses 9 are incident on the micro-mirrors 16 respectively, and intensities of the asymmetric light fluxes are changed in the reflection type optical-spatial modulator element 11 to spatially modulate the asymmetric light fluxes. Therefore, the reflection type optical-spatial modulator element 11 functions in the same manner as the DMD 121 shown in FIG. 20.

12 indicates a projection lens (or a projecting optical system) for forming an image from the asymmetric light fluxes intensity-modulated in the reflection type optical-spatial modulator element 11. The asymmetric light flux reflected on one micro-mirror 16 of the "on" state reaches the projection lens 12, and the asymmetric light flux reflected on one micro-mirror 16 of the "off" state passes out of the projection lens 12. 12a indicates a Fourier transformation plane determined by an incident group of lenses of the projection lens 12. 12b indicates a projection deformed diaphragm (or the projecting optical system) placed on the Fourier transformation plane 12a or in the neighborhood of the Fourier transformation plane 12a. The projection deformed diaphragm 12b intercepts a specular reflection component (or stray light) included in the asymmetric light fluxes according to the specular reflection on the reflecting surface 15 of the reflection type optical-spatial modulator element 11.

13 indicates a rear projection type screen. The asymmetric light fluxes having the image formed in the projection lens 12 are received in a rear surface of the rear projection type screen 13, and the image is displayed on the screen 13. 14 indicates an optical axis of the constituent elements 1, 2, 3, 4, 5, 6, 7, 8, 9, 10, 11, 12 and 13 of the image displaying apparatus.

Next, an operation of the image displaying apparatus will be described below.

The light emitting element 1 is placed at a focal point of the parabola reflector 2. Because the light emitting element 1 has a short arc length to be similar to a point light source, rays of light emitted from the light emitting element 1 are reflected by the parabola reflector 2 and go out as almost parallel light. In the converging lens 3, the parallel light going out from the parabola reflector 2 is converged to a focal point of the converging lens 3 as a light flux formed in a conical shape. This converged light flux has a first diverging angle θ1 corresponding to the first F-number F1=1. That is, the first diverging angle θ1 of the converged light flux is equal to 30 degrees with respect to the optical axis 14. In cases where the color wheel 4 is used for the image displaying apparatus, it is required to make the converged light flux have a small diameter. Therefore, the first F-number F1=1 is generally selected as an optimum value.

As shown in FIG. 1B, the incident end plane 5a and the outgoing end plane 5b of the light-intensity distribution uniformizing element 5 are respectively formed in a rectangular shape, and the incident end plane 5a is placed at the focal point of the converging lens 3. Light of a specified color selected by the color wheel 4 is incident on the incident end plane 5a of the light-intensity distribution uniformizing element 5 and is transmitted through the light-intensity distribution uniformizing element 5. In the first embodiment, as shown in FIG. 1B and FIG. 1C, each diagonal line of the incident end plane 5a (or an outgoing end plane 5b) of the light-intensity distribution uniformizing element 5 is set to a length W1 which is equal to half of a length W2 of a diagonal line of the reflecting surface 15 of the reflection type optical-spatial modulator element 11 (W2/W1=2). As compared with the prior art (a side length ratio of the DMD 121 to the integrator rod 115 is equal to W/w=3), even though the size of the reflecting surface 15 of the reflection type optical-spatial modulator element 11 is equal to that of the reflecting surface of the DMD 121, the size of the incident end plane 5a of the light-intensity distribution uniformizing element 5 is larger than that of the incident end plane of the integrator rod 115. Therefore, a light receiving efficiency of the light-intensity distribution uniformizing element 5 for the converged light flux output from the converging lens 3 can be heightened as compared with that of the integrator rod 115 in the prior art.

Thereafter, the incident light flux having the first diverging angle θ1 corresponding to the first F-number F1=1 is reflected on the inner wall surface of the light-intensity distribution uniformizing element 5 many times while passing through the light-intensity distribution uniformizing element 5. Therefore, a plurality of light fluxes (or second light fluxes) respectively having the first diverging angle θ1 corresponding to the first F-number F1=1 are formed, and intensities of the light fluxes are almost equalized in the outgoing end plane 5b of the light-intensity distribution uniformizing element 5. That is, the light fluxes having a uniform intensity distribution of the light are formed in the light-intensity distribution uniformizing element 5. The light fluxes having the first diverging angle θ1 corresponding to the first F-number F1=1 are output from the light-intensity distribution uniformizing element 5. Thereafter, the light fluxes pass through the first group of lenses 6, the relay deformed diaphragm 7, the bending mirror 8 and the second group of lenses 9 in that order so as to be changed to a plurality of asymmetric light fluxes 24. As is described later in detail, the asymmetric light fluxes 24 respectively have a second diverging angle θ2 of 15 degrees corresponding to a second F-number F2=2. Thereafter, the asymmetric light fluxes 24 are incident on the TIR prism 10.

The asymmetric light fluxes 24 incident on the TIR prism 10 are reflected in the inside of the TIR prism 10 and are radiated to the micro-mirrors 16 of the reflection type optical-spatial modulator element 11. In the reflection type optical-spatial modulator element 11, a plurality of intensity-modulated light fluxes respectively having the second diverging angle θ2 of 15 degrees corresponding to the second F-number F2=2 are produced by adding image information to the asymmetric light fluxes according to digital image information. The intensity-modulated light fluxes are output from the reflection type optical-spatial modulator element 11 and straightly pass through the TIR prism 10. Thereafter, the intensity-modulated light fluxes are projected onto the screen 13 through the projection lens 12.

In this embodiment, to improve a light receiving efficiency as compared with the prior art, the magnification W2/W1=2 is set. Because the relation W1/W2=θ2/θ1=F1/F2 is satisfied as is described in the prior art, the asymmetric light fluxes 24 incident on the reflection type optical-spatial modulator element 11 is set to have the second diverging angle θ2 of 15 degrees corresponding to the second F-number F2=2. In this embodiment, the second diverging angle θ2 of 15 degrees corresponding to the second F-number F2=2 is, for example, set for the asymmetric light fluxes 24. However, for the purpose of improving the light receiving efficiency, it is applicable that the second diverging angle θ2 be larger than the inclination angle (10 degrees) of the micro-mirror 16 (θ2>10 degrees). The inclination angle (10 degrees) of the micro-mirror 16 is equal to ⅓ of the first diverging angle θ1 corresponding to the first F-number F1=1.

In cases where the F-number F2=2 is, for example, adopted for the conventional image displaying apparatus, following problems occur.

FIG. 2A is a view of both a conical shaped light flux incident on a micro-mirror of the "on" state and a conical shaped light flux outgoing from the micro-mirror at the second diverging angle θ2 of 15 degrees corresponding to the F-number F2=2.

In FIG. 2A, 15 indicates the reflecting surface of the reflection type optical-spatial modulator element 11 horizontally disposed. n0 denotes a normal of the reflecting surface 15 of the reflection type optical-spatial modulator element 11. nA denotes a normal of the micro-mirror 16. The micro-mirror 16 is controlled to the "on" state to be inclined on its diagonal line at the angle of +10 degrees with respect to the reflecting surface 15 of the reflection type optical-spatial modulator element 11 in the clockwise direction. Therefore, the angle between the normal nA and the normal n0 is set to θx=10 degrees.

18 indicates an incident light flux having the second diverging angle of 15 degrees corresponding to the F-number F2=2. 17 indicates an incident principal ray of the incident light flux 18. The incident principal ray 17 is incident on the center of the micro-mirror 16. 18a and 18b indicate incident rays included in the incident light flux 18 respectively.

20 indicates an outgoing light flux obtained by reflecting of the incident light flux 18 on the micro-mirror 16. Therefore, the outgoing light flux 20 has the second diverging angle of 15 degrees corresponding to the F-number F2=2 according to the law of reflection. 19 indicates an outgoing principal ray of the outgoing light flux 20. The outgoing principal ray 19 is obtained by reflecting the incident principal ray 17 on the micro-mirror 16. 20a and 20b indicate outgoing rays included in the outgoing light flux 20 respectively.

The incident light flux 18 and the outgoing light flux 20 indicate the divergence of the light on both the incident side and the outgoing side respectively when the light fluxes 18 and 20 are observed from the micro-mirror 16. The incident ray 18a is positioned nearest to the outgoing principal ray 19 among rays of the incident light flux 18. The incident ray 18b is positioned furthest from the outgoing principal ray 19 among rays of the incident light flux 18. The outgoing ray 20a is positioned nearest to the incident principal ray 17 among rays of the outgoing light flux 20. The outgoing ray 20b is positioned furthest from the incident principal ray 17 among rays of the outgoing light flux 20.

Therefore, the incident rays 18a and 18b are positioned on the most-outer side of the incident light flux 18 and are incident on the micro-mirror 16 while making the angle θ2 of 15 degrees to the incident principal ray 17 respectively. The incident rays 18a and 18b are reflected on the micro-mirror 16 and are changed to the outgoing rays 20a and 20b respectively.

21 indicates an interference component generated in the interference of the incident light flux 18 and the outgoing light flux 20 with each other. 22a indicates a plane perpendicular to the incident principal ray 17. 22b indicates a plane perpendicular to the outgoing principal ray 19. The incident light flux 18 cut along the plane 22a and the outgoing light flux 20 cut along the plane 22b are shown in FIG. 2B. In FIG. 2B, for convenience of explanation, the incident principal ray 17 and the outgoing principal ray 19 are shown so as to be parallel to each other. Also, to compare the incident light flux 18 and the outgoing light flux 20 shown in FIG. 2B with the light fluxes 107 and 108 (set to the diverging angle of θi=10 degrees) shown in FIG. 39B, the same drawing as FIG. 39B is shown as FIG. 2C.

As shown in FIG. 2A, the incident principal ray 17 makes an angle of θ=10 degrees to the normal nA of the micro-mirror 16 controlled at the inclination angle of +10 degrees. When the incident principal ray 17 is reflected on the micro-mirror 16, the outgoing principal ray 19 makes the angle of θ=10 degrees to the normal nA of the micro-mirror 16 according to the law of reflection. Therefore, the outgoing principal ray 19 makes an angle of 20 degrees to the incident principal ray 17. In this case, when the incident light flux 18 set to the second diverging angle θ2 of 15 degrees is incident on the micro-mirror 16, a portion of the incident light flux 18 and a portion of the outgoing light flux 20 inevitably overlap with each other, the interference component 21 shown by a diagonal-line region in FIG. 2B is generated due to the interference of the incident light flux 18 and the outgoing light flux 20 with each other.

In comparison with the light fluxes 107 and 108 shown in FIG. 2C, because the second diverging angle of θ2 of 15 degrees set in the first embodiment is adopted in place of the diverging angle of θi=10 degrees set in the prior art, the size of the incident end plane 5a of the light-intensity distribution uniformizing element 5 can be set to be larger than that of the integrator rod 115. Therefore, the light receiving efficiency of the light-intensity distribution uniformizing element 5 is higher than that of the integrator rod 115, and a quantity of light in the incident light flux 18 (or the outgoing light flux 20) shown in FIG. 2B is larger than that in the incident light flux 107b (or the outgoing light flux 108b) shown in FIG. 2C. Therefore, when the second diverging angle θ2 of 15 degrees set in the first embodiment is adopted in place of the diverging angle of θi=10 degrees set in the prior art, a lighting efficiency indicating an efficiency of the use of light in the image displaying apparatus can be improved in the first embodiment.

However, assuming that the second diverging angle of θ2 of 15 degrees is adopted for the conventional image displaying apparatus, the interference component 21 is inevitably generated, and there is a problem that an image reproduced on the screen 123 lacks clearness or contrast. Therefore, in the conventional design criteria, it is forbidden that the incident light flux set to an F-number lower than the F-number of Fi=3 is incident on the DMD 121. That is, the design of an optical system is restricted for the purpose of preventing the generation of the interference component 21. Therefore, in case of an optical system (the image converging optical system including the relay optical system) designed according to the conventional design criteria, the F-number of a light flux incident on the DMD 121 is restricted, and the brightness of an image displayed by the conventional image displaying apparatus cannot be improved.

In contrast, in the first embodiment, the conventional design criteria is not adopted. That is, to improve the brightness of a displayed image by radiating incident light fluxes respectively having the second diverging angle θ2 of 15 degrees corresponding to the second F-number of F2=2 to the reflection type optical-spatial modulator element 11, the asymmetric light fluxes 24 corresponding to the second F-number of F2=2 are produced in the relay optical system comprising the first group of lenses 6, the relay deformed diaphragm 7 and the second group of lenses 9. Each asymmetric light flux 24 is obtained by removing the interference component 21 from the incident light flux 18 corresponding to the F-number of F2=2.

An operation of the relay optical system performed in the first group of lenses 6, the relay deformed diaphragm 7 and the second group of lenses 9 will be described below.

FIG. 3 is an explanatory view showing functions of the first group of lenses 6, the relay deformed diaphragm 7 and the second group of lenses 9. The constituent elements, which are the same as those shown in FIG. 1A, are indicated by the same reference numerals as those of the constituent elements shown in FIG. 1A. For convenience of explanation, the bending mirror 8 and the TIR prism 10 are omitted in FIG. 3, and a plurality of incident principal rays of the light fluxes going out from the reflection type optical-spatial modulator element 11 are perpendicularly incident on the reflecting surface 15 of the reflection type optical-spatial modulator element 11.

In FIG. 3, 23 indicates each of a plurality of light fluxes respectively having the first diverging angle θ1 of 30 degrees corresponding to the first F-number F1=1. The light fluxes 23 go out from a plurality of points (represented by three points A, B and C) placed in the outgoing end plane 5b of the light-intensity distribution uniformizing element 5 respectively. In this explanation, three light fluxes 23 going out from the points A, B and C are considered as representative light fluxes. The light flux 23 going out from the point A is expressed by a dot-dash-line, the light flux 23 going out from the point B is expressed by a solid line, and the light flux 23 going out from the point C is expressed by a broken line. Also, a principal ray of each light flux 23 is designated by a symbol ○, and a pair of rays of each light flux 23 making the angle of 30 degrees to the principal ray (or the optical axis 24) are designated by a symbol × and a symbol △ respectively. Propagation directions of the principal ray and the other rays of each light flux 23 are changed in the first group of lenses 6 so as to make the principal ray and the other rays be parallel to each other. The interference component 21 is formed of the rays designated by the symbol × and those peripheral rays.

The light fluxes 23 go out from the points A, B and C of the outgoing end plane 5b of the reflection type optical-spatial modulator element 5 at the first diverging angle θ1 of 30 degrees and are incident on the first group of lenses 6. In the first group of lenses 6, all rays of each light flux 23 are changed to parallel rays. Therefore, the rays of the symbol × going out from the points A, B and C are respectively converged onto a point D placed on a Fourier transformation plane 7a perpendicular to the optical axis 14, the principal rays of the symbol ○ going out from the points A, B and C are respectively converged onto a point E placed on the Fourier transformation plane 7a, and the rays of the symbol Δ going out from the points A, B and C are respectively converged onto a point F placed on the Fourier transformation plane 7a.

In other words, the two-dimensional Fourier transformation is performed by the first group of lenses 6 for positional information (that is, positions of the points A, B and C) of the light fluxes 23 in the outgoing end plane 5b of the light-intensity distribution uniformizing element 5, so that the positional information of the light fluxes 23 is changed to diverging angle information of a plurality of groups of parallel rays. Therefore, all rays going out from the outgoing end plane 5b of the light-intensity distribution uniformizing element 5 at the same angle to the optical axis 14 (or in the same propagation direction) are converged onto one point of the Fourier transformation plane 7a.

Thereafter, the groups of parallel rays passing through the points D, E and F are incident on the second group of lenses 9. In the second group of lenses 9, the groups of parallel rays are changed to a plurality of light fluxes respectively having the second diverging angle θ2 of 15 degrees corresponding to the second F-value F2=2, and the light fluxes are converged onto the central points of the micro-mirrors 16 represented by a point G, a point H and a point I of the reflection type optical-spatial modulator element 11 respectively. In the light flux converged onto each of the points G, H and I, each of the rays designated by the symbol Δ and the symbol × makes the angle of 15 degrees to the principal ray designated by the symbol ○.

Figure 4:
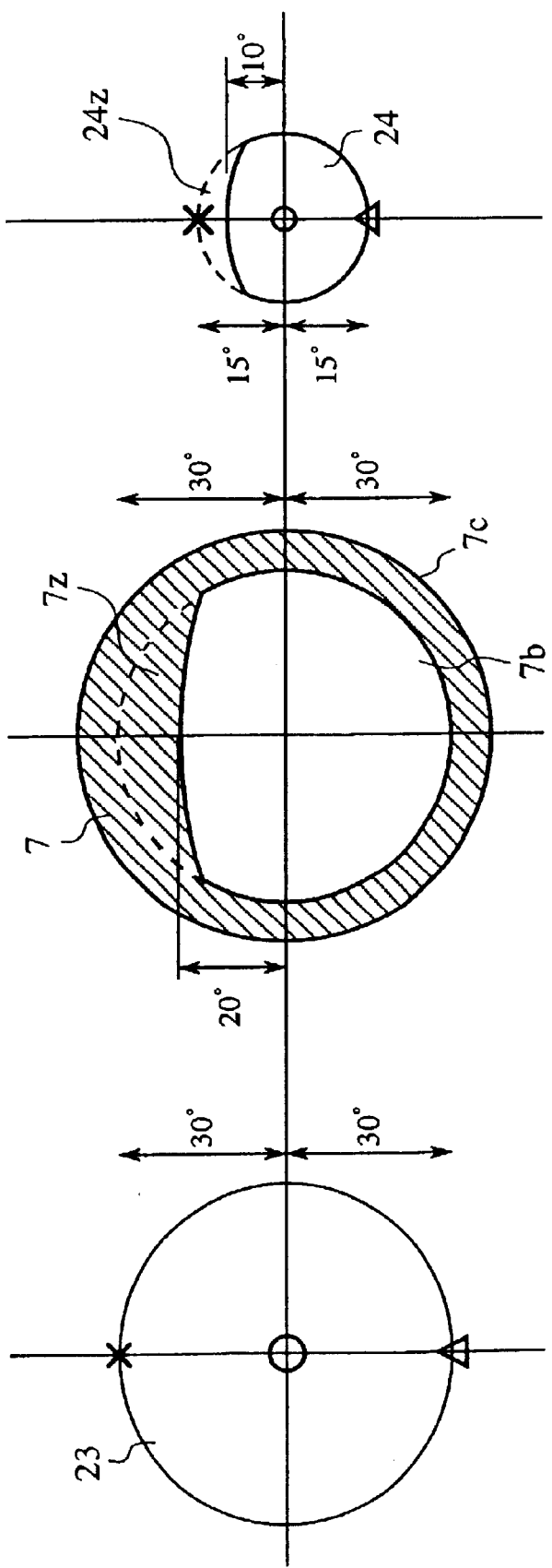
FIG. 4A is a view showing a sectional shape of each light flux going out at a diverging angle of 30 degrees from a light-intensity distribution uniformizing element arranged in the image displaying apparatus shown in FIG. 1A.
FIG. 4B is a plan view of a relay deformed diaphragm arranged in the image displaying apparatus shown in FIG. 1A.
FIG. 4C is a view showing a sectional shape of each asymmetric light flux.

FIG. 4A is a view showing a sectional shape of each light flux 23 going out at the first diverging angle θ1 of 30 degrees corresponding to the first F-number F1=1 from the light-intensity distribution uniformizing element 5, FIG. 4B is a plan view of the relay deformed diaphragm 7, and FIG. 4C is a view showing a sectional shape of each asymmetric light flux 24 expected to be incident on the reflection type optical-spatial modulator element 11. The constituent elements, which are the same as those shown in FIG. 1A and FIG. 3, are indicated by the same reference numerals as those of the constituent elements shown in FIG. 1A and FIG. 3.

To accurately remove the interference component 21 from each light flux 23 shown in FIG. 4A neither too much nor too less, characteristics of the TIR prism 10 and the reflection type optical-spatial modulator element 11 are considered, and the relay deformed diaphragm 7 is placed on the Fourier transformation plane 7a or in the neighborhood of the Fourier transformation plane 7a to intercept the interference component 21.

In FIG. 4B, an aperture 7b of the relay deformed diaphragm 7 is formed in a slightly curved D shape. That is, the aperture 7b is figured by slightly curving a chord portion of a D shape outward. 7z indicates a crescent-shaped shielding portion of the relay deformed diaphragm 7. The second group of lenses 9 are shielded by the crescent-shaped shielding portion 7z of the relay deformed diaphragm 7 from the group of parallel rays having the interference component 21. 7c indicates an O-ring portion of the relay deformed diaphragm 7. The aperture 7b is almost formed in a circular shape by the O-ring portion 7c, and the aperture 7b is formed in the almost D shape by the shielding portion 7z and the O-ring portion 7c. As shown in FIG. 4C, each asymmetric light flux 24 is formed of rays of light passing through the aperture 7b of the relay deformed diaphragm 7. 24z indicates a crescent-shaped non-flux region adjacent to the asymmetric light flux 24. Assuming that the shielding portion 7z of the relay deformed diaphragm 7 does not intercept portions of the groups of parallel rays denoting the interference components 21, the portions of the groups of parallel rays are placed at the non-flux region 24z. Propagation directions of rays denoting the interference component 21 in each light flux 23 have angles larger than 10 degrees to the propagation direction of the principal ray of the light flux 23. Therefore, propagation directions of rays of the asymmetric light flux 24 placed on one side are restricted to an angular range from 0 to 10 degrees to the propagation direction of the principal ray of the asymmetric light flux 24.

Figure 5:
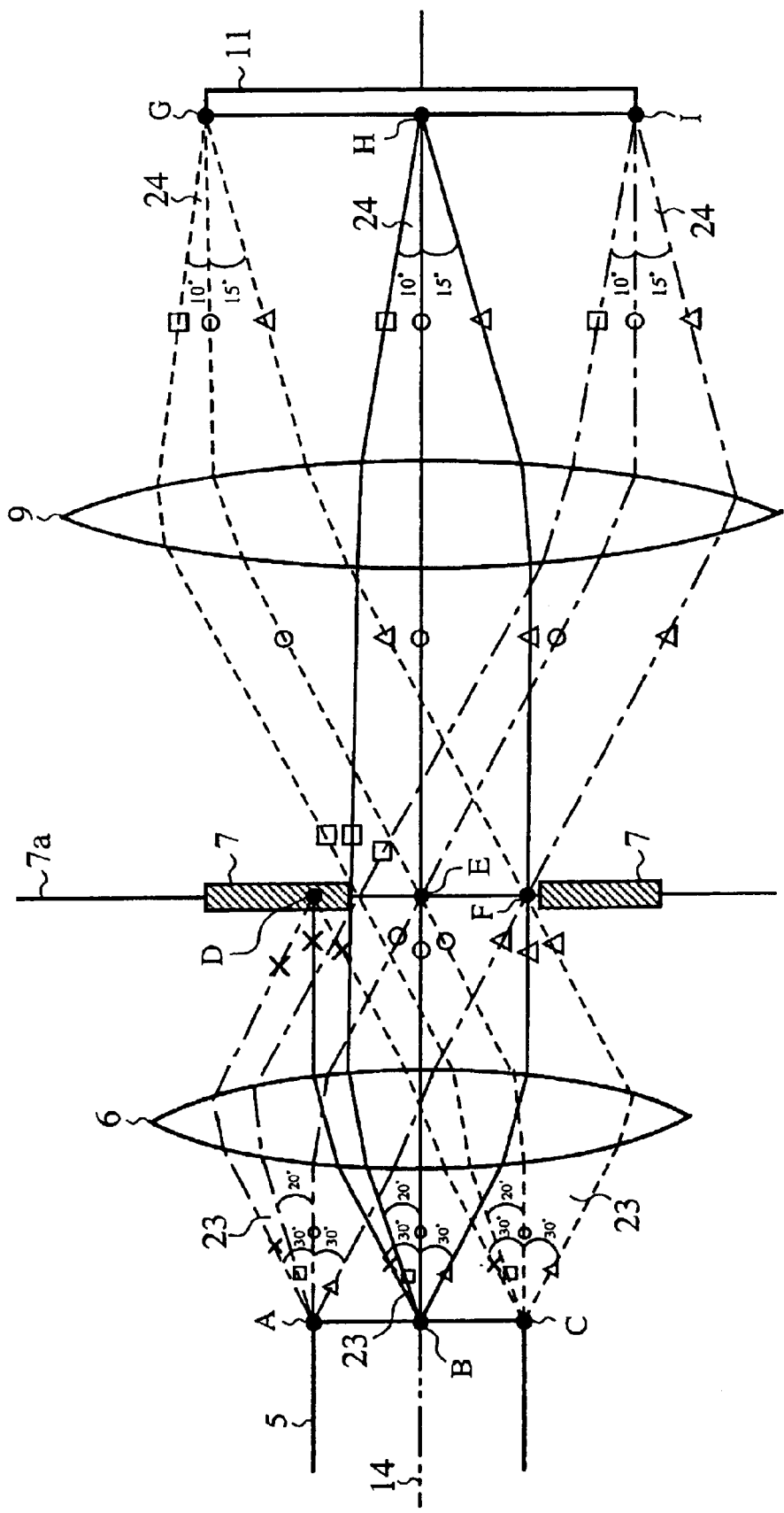
FIG. 5 is an explanatory view showing a function of the relay deformed diaphragm shown in FIG. 4B.

FIG. 5 is an explanatory view showing the function of the relay deformed diaphragm 7. The constituent elements, which are the same as those shown in FIG. 1A and FIG. 3, are indicated by the same reference numerals as those of the constituent elements shown in FIG. 1A and FIG. 3.

As shown in FIG. 5, in the relay optical system comprising the first group of lenses 6, the relay deformed diaphragm 7 and the second group of lenses 9, the aperture 7b of the relay deformed diaphragm 7 shown in FIG. 4B is set to be perpendicular to the optical axis 14, and the relay deformed diaphragm 7 is placed at a position near the Fourier transformation plane 7a.

In the relay deformed diaphragm 7 placed at a position near the Fourier transformation plane 7a, because the rays designated by the symbol × and other rays adjacent to the rays designated by the symbol × denote a portion of the light flux 23 generating the interference component 21, the second group of lenses 9 are shielded by the shielding portion 7z from the rays designated by the symbol × and the adjacent rays. A ray making an angle of 20 degrees to the principal ray (designated by the symbol ○) of each light flux 23 in the neighborhood of the ray designated by the symbol × is designated by a symbol □. In this case, the ray of the symbol □ corresponding to a diverging angle of 20 degrees, the ray of the symbol Δ corresponding to the diverging angle of 30 degrees and the principal ray of the symbol ○ pass through the aperture 7b of the relay deformed diaphragm 7 for each light flux 23. Therefore, the light fluxes 23 are changed to the asymmetric light fluxes 24 by the first group of lenses 6, the relay deformed diaphragm 7 and the second group of lenses 9.

In this embodiment, the aperture 7b of the relay deformed diaphragm 7 is almost formed in a circular shape by the O-ring portion 7c and is apparently figured by the O-ring portion 7c. However, in cases where the first group of lenses 6 is formed so as to prevent portions of the light fluxes 23 expected to reach the O-ring portion 7c from reaching the O-ring portion 7c, the O-ring portion 7c of the relay deformed diaphragm 7 is not required, and the relay deformed diaphragm 7 having only the shielding portion 7z can be used to form the asymmetric light fluxes 24.

The groups of parallel rays incident on the second group of lenses 9 are changed to the asymmetric light fluxes 24 corresponding to the second F-number F2=2 in the second group of lenses 9, and the ray of the symbol □ corresponding to a diverging angle of 10 degrees, the ray of the symbol Δ corresponding to a diverging angle of 15 degrees and the principal ray of the symbol ○ are converged onto the reflection type optical-spatial modulator element 11 for each asymmetric light flux 24. For example, the ray of the symbol □, the ray of the symbol Δ and the principal ray of the symbol ○ in the asymmetric light flux 24 indicated by dotted lines are converged onto the point G of the reflection type optical-spatial modulator element 11. Also, the ray of the symbol □, the ray of the symbol Δ and the principal ray of the symbol ○ in the asymmetric light flux 24 indicated by solid lines are converged onto the point H of the reflection type optical-spatial modulator element 11. Also, the ray of the symbol □, the ray of the symbol Δ and the principal ray of the symbol ○ in the asymmetric light flux 24 indicated by dot-dash-lines lines are converged onto the point I of the reflection type optical-spatial modulator element 11. Therefore, the asymmetric light fluxes 24 are formed in the relay optical system comprising the first group of lenses 6, the relay deformed diaphragm 7, the second group of lenses 9.

Figure 6:
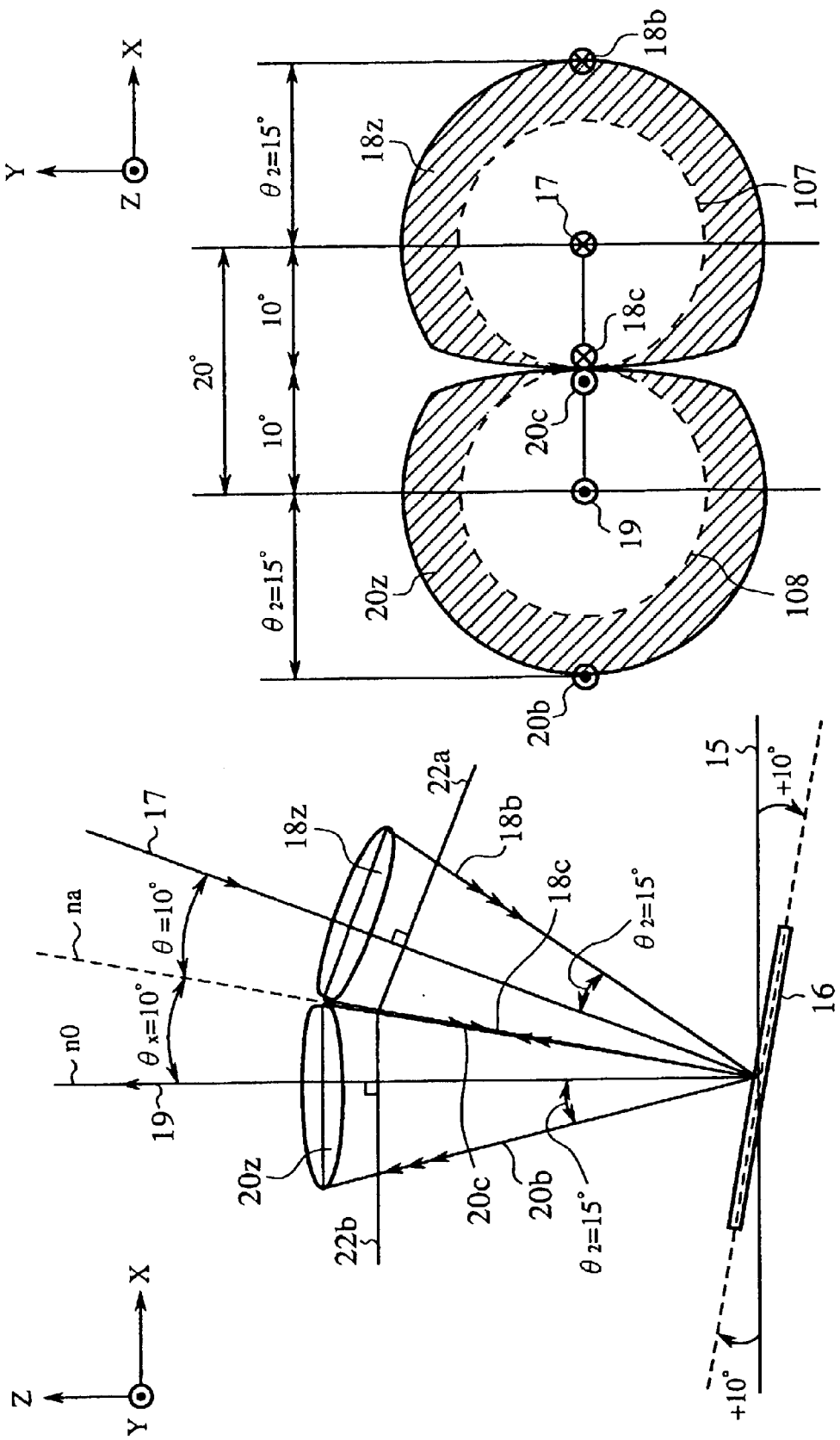
FIG. 6A is a view showing an incident asymmetric light flux incident on a micro-mirror set to an "on" condition and an outgoing asymmetric light flux outgoing from the micromirror.
FIG. 6B shows a sectional view of both the incident asymmetric light flux and the outgoing asymmetric light flux shown in FIG. 6A in comparison with both an incident light flux and an outgoing incident light flux of the prior art.

FIG. 6A is a view showing one asymmetric light flux incident on the micro-mirror 16 set to the "on" condition. The constituent elements, which are the same as those shown in FIG. 2, are indicated by the same reference numerals as those of the constituent elements shown in FIG. 2.

An incident asymmetric light flux 18z denoting one asymmetric light flux 24 is incident on the micro-mirror 16 of the reflection type optical-spatial modulator element 11. The incident asymmetric light flux 18z includes an incident ray 18b and an incident ray 18c. The incident ray 18b corresponds to the ray of the symbol Δ in FIG. 5. The incident ray 18c is adjacent to the interference component 21 (refer to FIG. 2A and FIG. 2B) in the light flux 23 and corresponds to the ray of the symbol □ in FIG. 5. The incident ray 18b is reflected on the micro-mirror 16 and is changed to an outgoing ray 20b of an outgoing asymmetric light flux 20z. The incident ray 18c is reflected on the micro-mirror 16 and is changed to an outgoing ray 20c of the outgoing asymmetric light flux 20z.

FIG. 6B shows a sectional view of both the incident asymmetric light flux 18z and the outgoing asymmetric light flux 20z in comparison with both the incident light flux 107 and the outgoing incident light flux 108 formed in the conventional image displaying apparatus.

As shown in FIG. 6B, because the size of the incident end plane 5a of the light-intensity distribution uniformizing element 5 is set to be larger than that of the integrator rod 115, a quantity of light in the incident asymmetric light flux 18z is larger than that in the incident light flux 107 shown in FIG. 6B. Therefore, the micro-mirror 16 of the reflection type optical-spatial modulator element 11 is radiated by the asymmetric light flux 24 having a larger light quantity, and the brightness of an image displayed by the screen 13 can be heightened.

Also, because the incident asymmetric light flux 18z is formed in an asymmetric shape in section, the incident asymmetric light flux 18z does not interfere with the outgoing asymmetric light flux 20z. Therefore, an image reproduced on the screen 13 can sufficiently have clearness or contrast.

Here, portions of the asymmetric light fluxes 18z and 20z placed at two diagonal line regions shown in FIG. 6B respectively contribute to the improvement of the brightness of the image while maintaining the clearness of the image. Also, the shape of the shielding portion 7z is determined according to the second F-number F2=2 and the incident angle of the asymmetric light fluxes incident on the reflection type optical-spatial modulator element 11 on condition that no interference component is generated in the asymmetric light fluxes.

As is described above, in the first embodiment, the length W1 of the diagonal line of the incident end plane 5a of the light-intensity distribution uniformizing element 5 receiving the light flux corresponding to the first F-number F1=1 is set to half of the length W2 of the diagonal line of the reflecting surface 15 of the reflection type optical-spatial modulator element 11, and the position information of the light fluxes 23 going out from the light-intensity distribution uniformizing element 5 is transformed to the diverging angle information in the first group of lenses 6 according to the Fourier transformation. Therefore, even though an area of the reflecting surface 15 of the reflection type optical-spatial modulator element 11 is equal to that of the reflecting surface of the DMD 121, an area of the incident end plane 5a of the light-intensity distribution uniformizing element 5 is larger than that of the incident end plane of the integrator rod 115. Accordingly, a light receiving efficiency of the light-intensity distribution uniformizing element 5 for the light emitted from the light emitting element 1 can be heightened, and the brightness of an image displayed on the screen 13 can be improved without restricting the F-number of the light fluxes incident on the reflection type optical-spatial modulator element 11 according to the predetermined inclination angle of the micro-mirrors 16 of the reflection type optical-spatial modulator element 11.

Also, in the first embodiment, the shielding portion 7z of the relay deformed diaphragm 7 with a D-shaped aperture intercepts portions of the light fluxes 23 generating the interference component 21 to shield portions of the light fluxes 23 generating the interference component 21 from the reflection type optical-spatial modulator element 11. Therefore, the asymmetric light fluxes 24 not including the interference component 21 are produced in an asymmetric optical system (or the image converging optical system including the relay optical system) from the light fluxes 23 in the first group of lenses 6, the relay deformed diaphragm 7 and the second group of lenses 9, and the asymmetric light fluxes 24 are radiated to the reflection type optical-spatial modulator element 11. Accordingly, the clearness or contrast of the image can be maintained.

Next, a modification of the first embodiment will be described below.

In the asymmetric optical system of the first embodiment, the second diverging angle θ2 of the asymmetric light flux 24 reflected on each micro-mirror 16 of the reflection type optical-spatial modulator element 11 is larger than that in a symmetric optical system of the prior art. Therefore, the asymmetric light flux 24 reflected on each micro-mirror 16 is widely diverged and is directed toward the projection lens 12. To receive all rays of the asymmetric light fluxes 24 diverged in a wide area in the projection lens 12, the projection lens 12 is set to a small F-number. However, specular reflection component is inevitably generated as stray light according to the specular reflection of the asymmetric light fluxes 24 on the TIR prism 10 or the reflecting surface 15 of the reflection type optical-spatial modulator element 11. Therefore, in cases where the projection lens 12 is set to a small F-number to receive light diverged in a wide area, there is high probability that a portion of the specular reflection component (or stray light) undesirably passes through an entrance pupil of the projection lens 12 and reaches a pixel of the screen 13 even when the micro-mirror 16 corresponding to the pixel is set to the "off" state. In this case, the contrast of an image displayed on the screen 13 deteriorates, and a color-faded image not clear in the difference between light and darkness is undesirably displayed on the screen 13.

A first reason of the deterioration of the contrast in the image will be described below.

Figure 7:
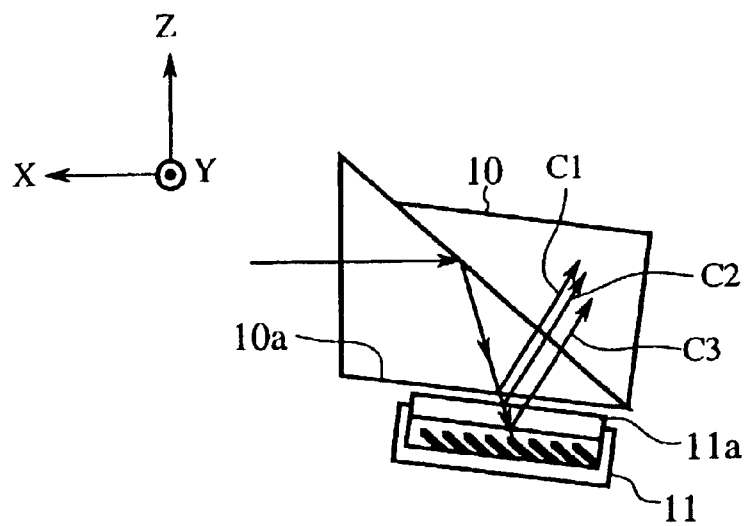
FIG. 7 is a schematic view showing rays of light reflected in a TIR prism and a reflecting optical-spatial modulator element shown in FIG. 1A.

FIG. 7 is a schematic view showing rays of light reflected in the TIR prism 10 and the reflection type optical-spatial modulator element 11 when the TIR prism 10 and the reflection type optical-spatial modulator element 11 shown in FIG. 1A are seen from the back side of a drawing paper of FIG. 1A. Therefore, the relation between right and left in FIG. 7, FIG. 8, FIG. 9, FIG. 10, FIG. 11A, FIG. 11B, FIG. 12 and FIG. 13B is opposite to that in FIG. 1A, FIG. 6A and FIG. 6B.

As shown in FIG. 7, when each asymmetric light flux 24 is incident on the TIR prism 10, a ray of the asymmetric light flux 24 is reflected on a plane 10a of the TIR prism 10 facing the reflection type optical-spatial modulator element 11 to produce a reflected ray C1 of light, a ray of the asymmetric light flux 24 is reflected on an upper plane of a cover glass 11a of the reflection type optical-spatial modulator element 11 to produce a reflected ray C2 of light, and a ray of the asymmetric light flux 24 is reflected on a lower plane of the cover glass 11a to produce a reflected ray C3 of light. The reflected rays C1, C2 and C3 of light reach the screen 13 as stray light to deteriorate the contrast. When no antireflection film is used for the TIR prism 10 and the reflection type optical-spatial modulator element 11, reflectivity of the asymmetric light flux 24 is equal to almost 4%. Also, even though a reflection reducing film is used for the TIR prism 10 and the reflection type optical-spatial modulator element 11, because the spectrum of the asymmetric light flux 24 is changed in a wide spectral range corresponding to white light and because the asymmetric light flux 24 has a wide incident angle to the micro-mirror 16, reflectivity of the asymmetric light flux 24 is only lowered to 0.5 to 1% at the best. Therefore, the reflected rays C1, C2 and C3 of light inevitably function as stray light.

Also, as a second reason of the deterioration of the contrast, rays of the asymmetric light flux 24 are scattered on the reflecting surface 15, and a portion of the scattered rays function as stray light.

Figure 8:
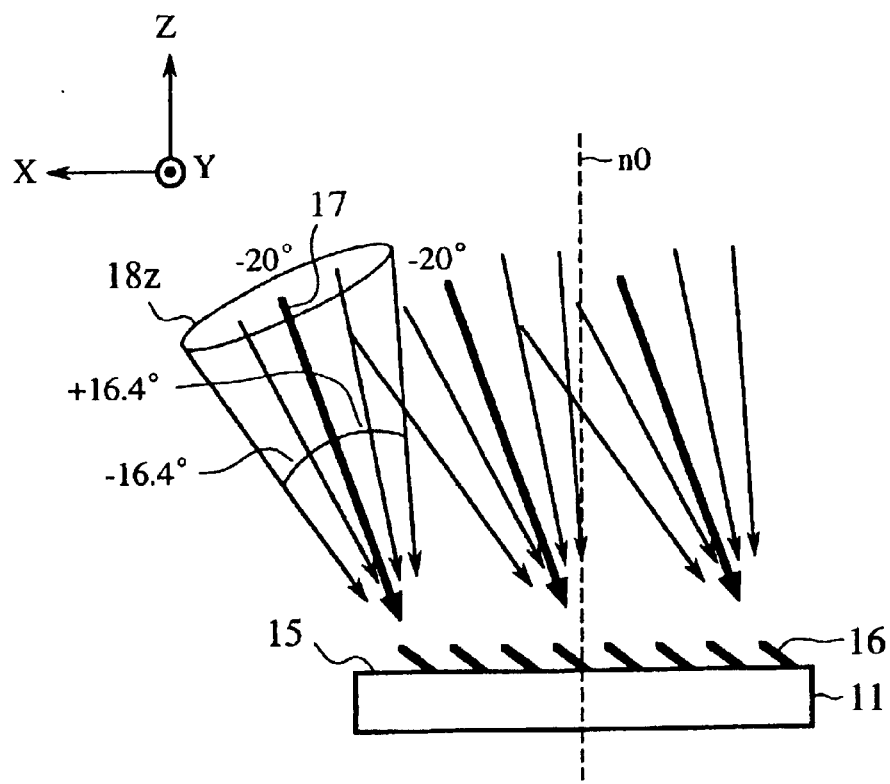
FIG. 8 is a schematic view showing rays of an asymmetric light fluxes incident on a micro-mirrors set to an "off" state.
Figure 9:
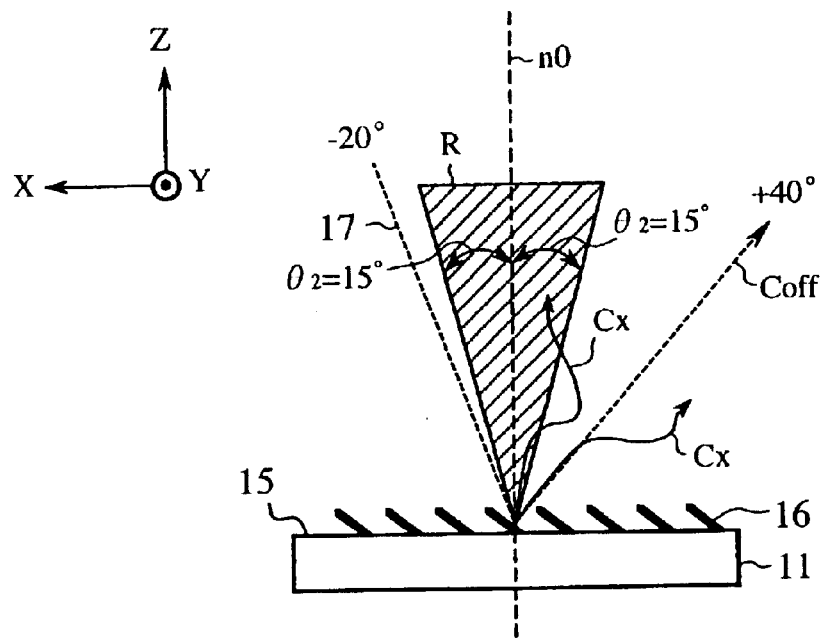
FIG. 9 is an explanatory view showing rays of stray light derived from a principal ray which is reflected on a micromirrors set to an "off" state.
Figure 10:
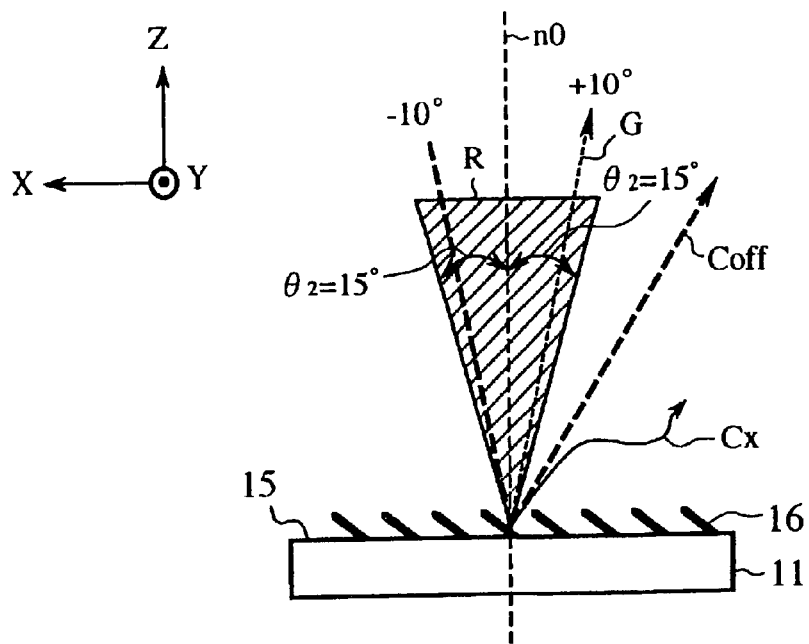
FIG. 10 is an explanatory view showing rays of stray light derived from specular reflection on a micro-mirror.

FIG. 8 is a schematic view showing rays of the asymmetric light fluxes 18z incident on the micro-mirrors 16 set to the "off" state. FIG. 9 is an explanatory view showing rays of stray light derived from a principal ray which is reflected on the micro-mirrors 16 set to the "off" state. FIG. 10 is an explanatory view showing rays of stray light derived from the specular reflection on the micro-mirror 16. Rays of the asymmetric light fluxes 18z and the reflection type optical-spatial modulator element 11 are seen from the back side of the drawing paper of FIG. 1A. Therefore, the incident principal ray 17 is incident on the reflection type optical-spatial modulator element 11 from the left side in FIG. 8 to FIG. 10 in contrast to the incident principal ray 17 incident from the right side in FIG. 6A. Also, the micro-mirror 16 inclined clockwise is set to the "off" state because the relation between right and left is opposite to that in FIG. 6A.

As shown in FIG. 8, the propagation direction of the incident principal ray 17 is inclined from the normal n0 of the reflection plate 15 of the reflection type optical-spatial modulator element 11 by an angle of −20 degrees (the counter-clockwise direction is indicated by a negative value), and rays of the asymmetric light flux 18z including the incident principal ray 17 are inclined from the propagation direction of the incident principal ray 17 in a range from −15 to +15 degrees (the clockwise direction is indicated by a positive value). When the micro-mirror 16 is inclined from the reflection plate 15 by an angle of −10 degrees to be set to the "on" state, a reflected principal ray (that is, the outgoing principal ray 19 shown in FIG. 6A) propagates in a direction parallel to the normal n0 of the reflection plate 15, and rays of a reflected asymmetric light flux propagate through a region R placed in an angle range of ±15 degrees centering around the reflected principal ray. This region R is indicated by a diagonal-line region in FIG. 9 and is called an entrance pupil region hereinafter. The angle range of 15 degrees for the asymmetric light flux 18z corresponds to the projection lens 12 set to the F-number F2=2.

As shown in FIG. 9, when the micro-mirror 16 is inclined from the reflection plate 15 by an angle of +10 degrees to be set to the "off" state, a reflected principal ray Coff is inclined from the normal no of the reflection plate 15 by an angle of +40 degrees, and a major portion of rays of a reflected asymmetric light flux propagate in an angle range (from +25 to +55 degrees) of ±15 degrees centering around the reflected principal ray Coff. However, because the remaining portion of the rays of the reflected asymmetric light flux are scattered or diffracted, the remaining portion of the rays of the reflected asymmetric light flux propagate as rays Cx in directions other than the angle range (from +25 to +55 degrees) of ±15 degrees centering around the reflected principal ray Coff. In particular, many of the rays Cx propagate in a direction of the specular reflection performed on the reflection plate 15. For example, a portion of the rays Cx are obtained by reflecting rays of the asymmetric light flux 18z on a bottom plane of the micro-mirror 16, and another portion of the rays Cx are obtained by reflecting rays of the asymmetric light flux 24 on a supporting pole placed in the center of the micro-mirror 16.

In cases where a portion of the asymmetric light flux 18z are incident on the reflection type optical-spatial modulator element 11 at angles ranging from −15 degrees to 0 degree with respect to the normal n0 of the reflection plate 15, a portion of rays Cx are reflected on the reflecting surface 15 according to the specular reflection and propagates through the entrance pupil region R placed within the angle range from −15 degrees to +15 degrees with respect to the normal n0 of the reflection plate 15, the portion of rays Cx pass through the entrance pupil of the projection lens 12 when the diameter d (d=2×tan θ×F2, θ denotes a diverging angle of light) of the entrance pupil is equal to or larger than half of the second F-number F2 (d≧1/2×F2 for θ=15 degrees). Therefore, the portion of rays Cx functions as stray light. This phenomenon causes the deterioration of the contrast based on the second reason.

Also, as shown in FIG. 10, when a ray of the symmetric light flux 10z inclined from the normal no of the reflecting surface 15 by an angle of −10 degrees is reflected on the reflecting surface 15 according to the specular reflection, the reflected ray propagates in a direction inclined from the normal n0 of the reflecting surface 15 by an angle of +10 degrees. Therefore, the reflected ray passes through the entrance pupil of the projection lens 12 when the diameter d of the entrance pupil is equal to or larger than 1/1.7×F2 (d≧1/2×F2 for θ=10 degrees).

Because the stray light based on the two types of specular reflection is generated, rays of stray light passing through the entrance pupil region R have an intensity distribution not uniform with respect to the angle from the normal n0 of the reflecting surface 15 and is biased to the plus angle region (a region toward a clockwise direction from the normal n0). In other words, because a ray of light incident on the reflecting surface 15 at an incident angle of −20 degrees is reflected in a specular reflection direction making an angle of +20 degrees from the normal n0 of the reflecting surface 15 according to the specular reflection, rays of stray light occurring on the reflection type optical-spatial modulator element 11 have an almost uniform intensity distribution centering around the specular reflection direction, and a portion of the stray light passes through the entrance pupil region R.

Figure 11A:
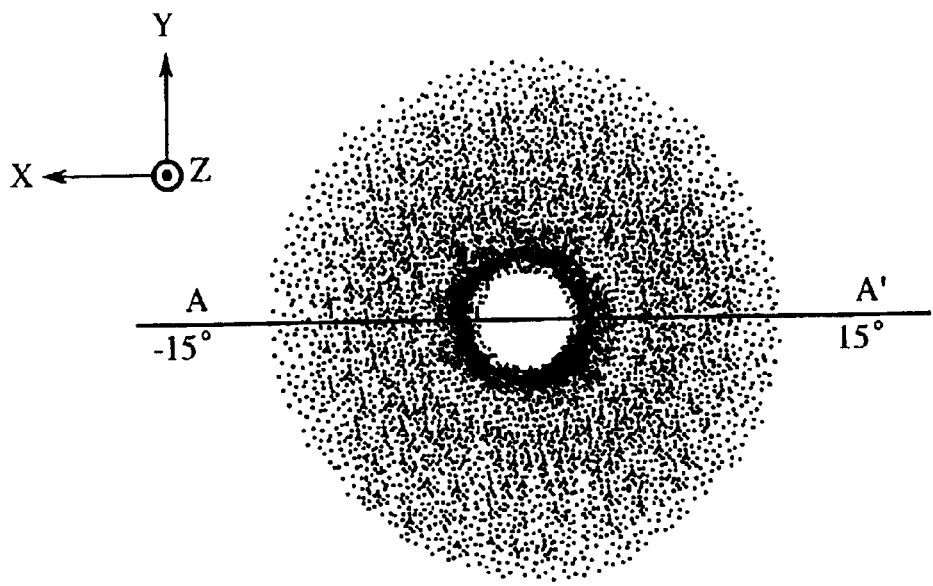
FIG. 11A shows a light and shade distribution of intensities of stray light occurring on a reflecting optical-spatial modulator element shown in FIG. 1A.
Figure 11B:
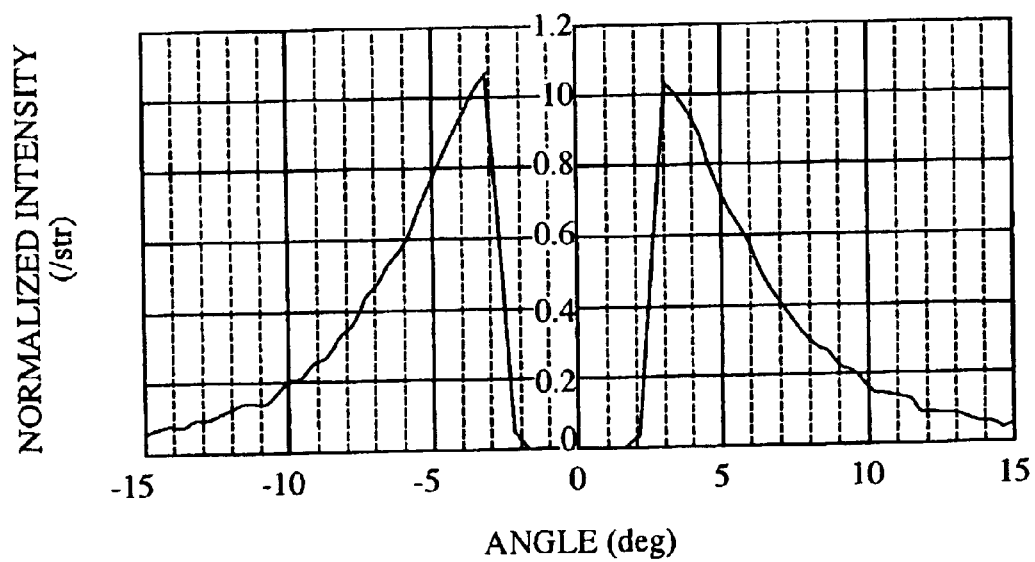
FIG. 11B is a view of an angular distribution of intensities of rays of stray light which is taken substantially along line A–A' of FIG. 11A.

FIG. 11A shows a light and shade distribution of intensities of stray light occurring on the reflection type optical-spatial modulator element 11 as an example, and FIG. 11B is a view of an angular distribution of intensities of rays of the stray light which is taken substantially along line A–A' of FIG. 11A and is almost uniformly distributed around the specular reflection direction indicated by an angle of 0 degree.

Dark portions of the light and shade distribution shown in FIG. 11A denote regions of the high intensity of light. Each ray not passing through the relay deformed diaphragm 7 placed on the Fourier transformation plane of the relay optical system is not shown in FIG. 11A or FIG. 11B.

In a digital light processing (DLP™) projector, a high pressure mercury lamp with a reflector having a parabolic surface is generally used. In an angular distribution of intensities of rays of light emitted from the high pressure mercury lamp, the intensities of rays of light passing in directions (or in an angle range neighboring 0 degree) near the optical axis are low, and the intensities of rays of light passing through areas making angles of about 3 degrees have highest values. That is, as shown in FIG. 11A and FIG. 11B, intensities of rays of light emitted from the high pressure mercury lamp have a doughnut shaped angular distribution with respect to the angle from the optical axis.

Figure 12:
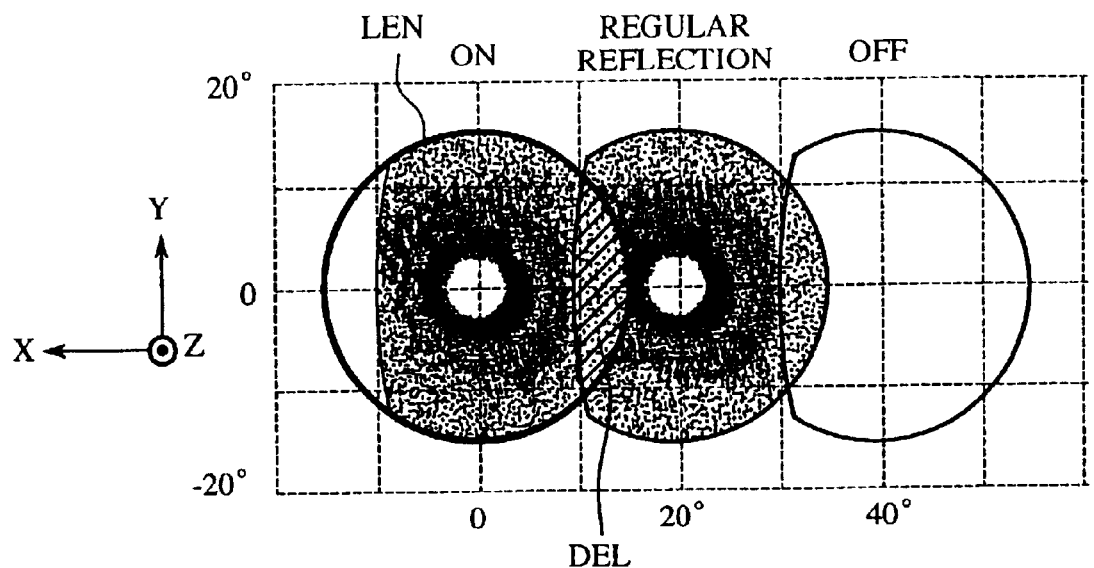
FIG. 12 is a schematic view of three angular distributions of rays of light with respect to an angle from a normal line of a reflecting surface shown in FIG. 1C.

FIG. 12 is a schematic view of three angular distributions of rays of light with respect to the angle from the normal line n0 of the reflecting surface 15 in cases where the rays of light having the doughnut shaped angular distribution are emitted from the light converging optical system. The left one indicates an angular distribution of rays of the asymmetric light flux 24 (or 20z) reflected on one micro-mirror 16 of the "on" state, the central one indicates an angular distribution of rays of stray light occurring on the reflecting surface 15 of the reflection type optical-spatial modulator element 11, and the right one merely indicates an angular range of rays of the asymmetric light flux 24 (or 20z) reflected on the micro-mirrors 16 of the "off" state.

As shown in FIG. 12, a circle LEN in the angular distribution of rays of the asymmetric light flux 24 reflected on the micro-mirrors 16 of the "on" state indicates an angular area of the entrance pupil of the projection lens 12 having the diameter d equal to F2/2.0. An angular area of rays of the asymmetric light flux 24 reflected on the micro-mirrors 16 of the "on" state overlaps with an angular area of rays of stray light occurring on the reflecting surface 15 of the reflection type optical-spatial modulator element 11, and an overlapping area DEL is indicated by a diagonal line portion. Because a portion of the stray light distributed in the overlapping area DEL is placed within the angular area of the entrance pupil of the projection lens 12, the portion of the stray light is undesirably received in the projection lens 12 to display a color-faded image not clear in the difference between light and darkness on the screen 13.

In the modification of the first embodiment, to prevent a portion of stray light distributed in the overlapping area DEL from being received in the screen 13, a projection lens deformed diaphragm is arranged in the projection lens 12 so as to shield a portion of stray light distributed in the overlapping area DEL from the screen 13.

Figure 13A:
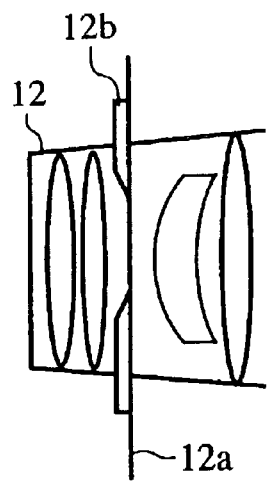
FIG. 13A is a vertical sectional view of a projection lens having a projection lens deformed diaphragm.
Figure 13B:
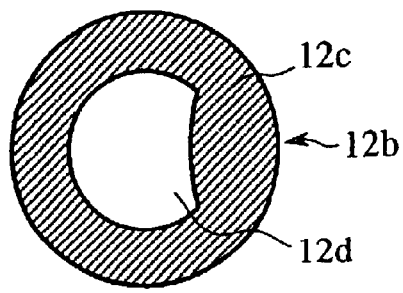
FIG. 13B is a plan view of the projection lens deformed diaphragm shown in FIG. 13A.

FIG. 13A is a vertical sectional view of the projection lens 12 having a projection lens deformed diaphragm 12b, and FIG. 13B is a plan view of the projection lens deformed diaphragm 12b. The constituent elements, which are the same as those shown in FIG. 1, are indicated by the same reference numerals as those of the constituent elements shown in FIG. 1.

As shown in FIG. 13A, a Fourier transformation plane 12a is determined by a group of incident lenses placed on the incident side of the projection lens 12. On the Fourier transformation plane 12a, positional information indicating positions of a plurality of micro-mirrors set to the "on" state on the reflecting surface 15 of the reflection type optical-spatial modulator element 11 is transformed into diverging angle information indicating diverging angles of rays of a portion of the symmetric light fluxes 24 reflected on the micro-mirrors 16 with respect to the optical axis 14 of the reflection type optical-spatial modulator element 11. A projection lens deformed diaphragm (or a projecting optical system deformed diaphragm) 12b is placed on the Fourier transformation plane 12a to shield a portion of stray light distributed in the overlapping area DEL from the screen 13. As shown in FIG. 13B, the projection lens deformed diaphragm 12b has a shielding region 12c to deform an aperture 12d in an almost D shape having a chord portion slightly curved inward.

Therefore, even though the asymmetric light fluxes 24 having the positional information go out with stray light from the reflection type optical-spatial modulator element 11, a portion of the stray light distributed in the overlapping area DEL is shielded from the screen 13 by the shielding region 12c of the projection lens deformed diaphragm 12b, only the asymmetric light fluxes 24 having the positional information pass through a plurality of outgoing-side lenses placed on the outgoing side of the projection lens 12, and an image is displayed on the screen 13 according to the asymmetric light fluxes 24 having the positional information.

Here, the aperture 12d of the projection lens deformed diaphragm 12b is formed in the almost D shape by forming the right side portion of the aperture 12d in an almost straight line shape. However, the modification of the first embodiment is not limited to the aperture 12d of the projection lens deformed diaphragm 12b formed in an almost D shape.

Also, the more an area of the shielding region 12c of the projection lens deformed diaphragm 12b is increased, the more the stray light occurring according to the specular reflection is shielded by the projection lens deformed diaphragm 12b. However, in cases where an area of the shielding region 12c of the projection lens deformed diaphragm 12b is excessively increased, the brightness of an image displayed on the screen 13 is undesirably lowered. Therefore, it is preferable that the shape of the aperture 12d of the projection lens deformed diaphragm 12b be determined on condition that the lowering of the brightness of an image displayed on the screen 13 is admitted.

As is described above, in the modification of the first embodiment, in addition to the relay deformed diaphragm 7 arranged in the relay optical system, the Fourier transformation plane 12a is determined by a plurality of incident lenses placed on the incident side of the projection lens 12 to transform positional information indicating positions of a plurality of micro-mirrors set to the "on" state on the reflecting surface 15 of the reflection type optical-spatial modulator element 11 into diverging angle information indicating diverging angles of rays of a portion of the symmetric light fluxes 24 reflected on the micro-mirrors 16 with respect to the optical axis 14 of the reflection type optical-spatial modulator element 11. Also, the projection lens deformed diaphragm 12b is disposed in the neighborhood of the Fourier transformation plane 12a to remove light (for example, stray light) other than the symmetric light fluxes 24 reflected on the micro-mirrors 16 of the "on" state, and the symmetric light fluxes 24 passing through the projection lens deformed diaphragm 12b go out from a plurality of lenses placed on the outgoing side of the projection lens 12 to the screen 13. Therefore, stray light occurring on the reflecting surface 15 of the reflection type optical-spatial modulator element 11 according to the specular reflection can be removed from the symmetric light fluxes 24 received in the screen 13. Accordingly, an image clear in the difference between light and darkness can be displayed on the screen 13 at high contrast.

In the first embodiment, the second diverging angle of the asymmetric light flux 24 is set to 15 degrees corresponding to the second F-number F=2. However, the first embodiment is not limited to the second diverging angle of 15 degrees corresponding to the second F-number F=2, and it is applicable that the asymmetric light flux 24 be set to a value higher than the inclination angle (10 degrees) of the micro-mirror 16.

Embodiment 2

In the first embodiment, the asymmetric light fluxes 24 are formed in the first group of lenses 6, the relay deformed diaphragm 7 and the second group of lenses 9 to remove interference components from the light fluxes 23 obtained in the light converging optical system of the image displaying apparatus. In contrast, in a second embodiment, the relay deformed diaphragm 7 is not arranged in an image displaying apparatus, but a plurality of light fluxes respectively having an elliptic shape in section are formed in a light converging optical system of the image displaying apparatus.

Figure 14A:
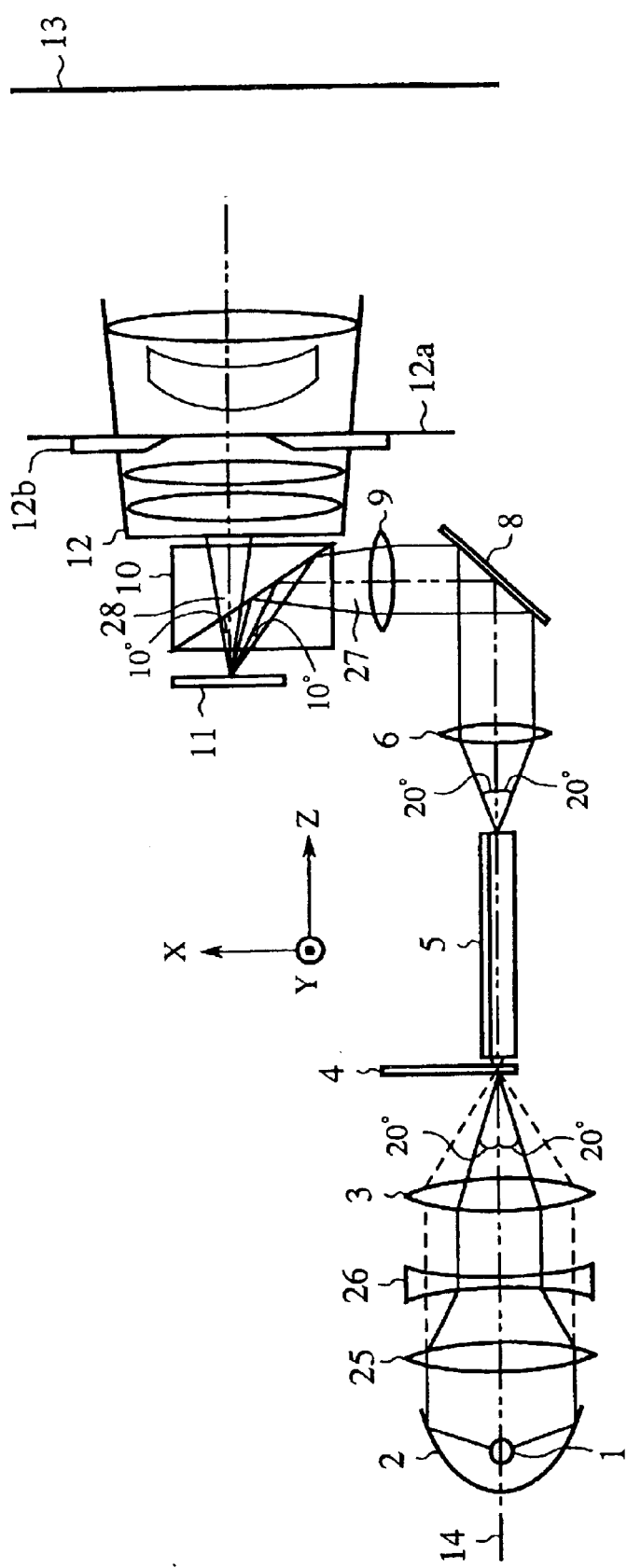
FIG. 14A is a sectional view, taken along an X-Z plane, of an image displaying apparatus according to a second embodiment of the present invention.
Figure 14C:
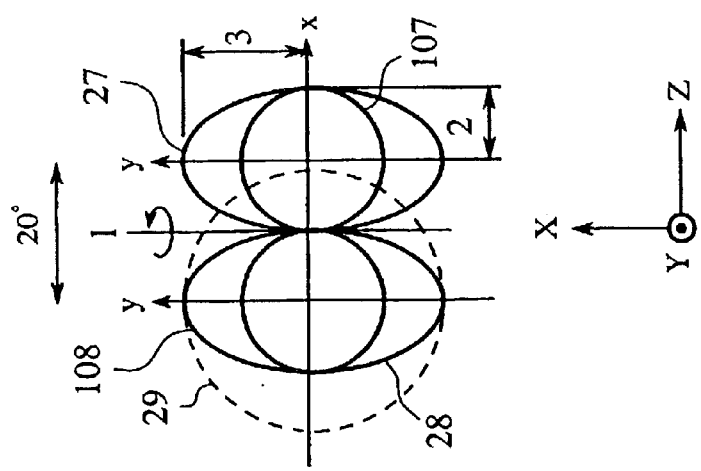
FIG. 14C shows a sectional view of both an incident light flux and an outgoing light flux respectively having an elliptic shape in section.
Figure 14B:
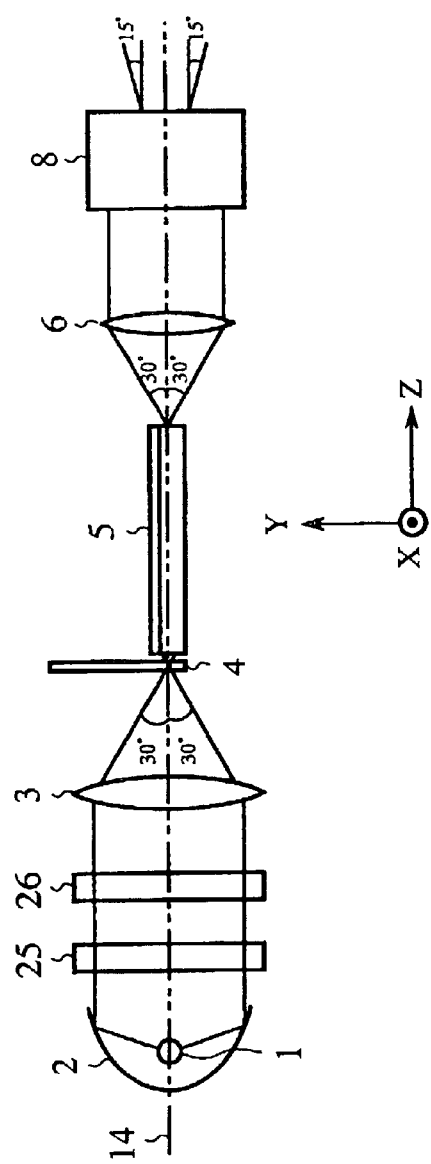
FIG. 14B is a sectional view, taken along a Y-Z plane, of the image displaying apparatus shown in FIG. 14A.

FIG. 14A is a sectional view, taken along an X-Z plane, of an image displaying apparatus with a light converging optical system according to a second embodiment of the present invention. FIG. 14B is a sectional view, taken along a Y-Z plane, of the image displaying apparatus. FIG. 14C shows a sectional view of a light flux having an elliptic shape in section. FIG. 14D is a plane view of the reflecting surface 15 of the reflection type optical-spatial modulator element 11. The constituent elements, which are the same as those shown in FIG. 1, are indicated by the same reference numerals as those of the constituent elements shown in FIG. 1.

In FIG. 14A, FIG. 14B and FIG. 14C, the direction of the optical axis 14 is defined as that of a Z axis, and an X axis (or a first co-ordinate axis) and a Y axis (or a second co-ordinate axis) perpendicular to the Z axis are set.

In FIG. 14A and FIG. 14B, 25 and 26 indicate a plurality of cylindrical lenses (or a converging system, light changing means or a group of cylindrical lenses) disposed between the converging lens 3 and the lamp light source composed of both the light emitting element 1 and the parabola reflector 2. Each of the cylindrical lenses 25 and 26 has a lens function only in the X-axial direction. The cylindrical lens 25 functions as a positive lens, and the cylindrical lens 26 functions as a negative lens. Also, as shown in FIG. 14D, the reflecting surface 15 of the reflection type optical-spatial modulator element 11 is set to a width Wx in the x-axial direction, and the reflecting surface 15 is set to a width Wy in the y-axial direction.

Next, an operation of the image displaying apparatus will be described below.

Parallel light emitted from the lamp light source passes through the cylindrical lenses 25 and 26 so as to shorten a width of the parallel light to Ax in the x-axial direction (refer to FIG. 14A). In contrast, because the cylindrical lenses 25 and 26 have no function in the Y-axial direction, parallel light having a width Ay in the Y-axial direction is emitted from the lamp light source and passes through the cylindrical lenses 25 and 26 without changing the width of the parallel light in the Y-axial direction (refer to FIG. 14B). In this case, the cylindrical lenses 25 and 26 are formed so as to set the ratio of Ax to Ay to 2:3. Therefore, parallel light going out from the cylindrical lenses 25 and 26 is formed in an elliptic shape in section, and a ratio of the major axis to the minor axis in the elliptic shape of the parallel light is set to 3:2.

Thereafter, the parallel light going out from the cylindrical lenses 25 and 26 is converged in the converging lens 3 at a diverging angle of 20 degrees in the x-axial direction and a diverging angle of 30 degrees in they-axial direction, and the converged light having an x-directional angular distribution and a y-directional angular distribution different from each other is incident on the incident end plane 5a of the light-intensity distribution uniformizing element 5 while passing through the color wheel 4.

Figure 14E:
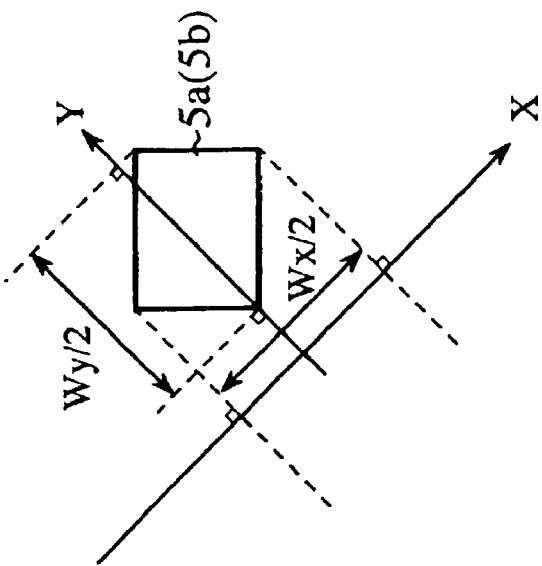
FIG. 14E is a plan view of an incident end plane (or an outgoing end plane) of a light-intensity distribution uniformizing element shown in FIG. 14B.
Figure 14D:
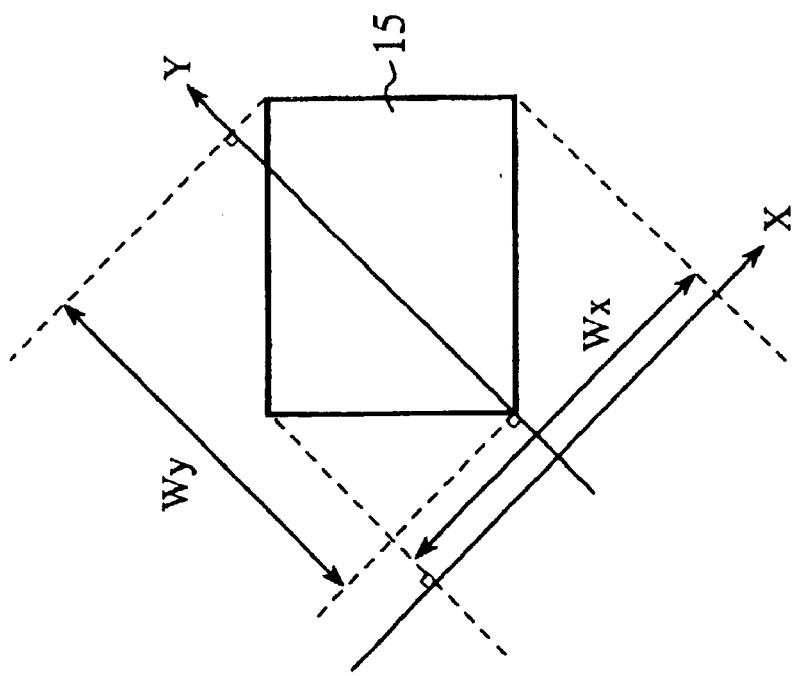
FIG. 14D is a plane view of a reflecting surface of a reflection type optical-spatial modulator element shown in FIG. 14B.

FIG. 14E is a plan view of the incident end plane 5a (or the outgoing end plane 5b) of the light-intensity distribution uniformizing element 5.

As shown in FIG. 14E, the incident end plane 5a and the outgoing end plane 5b of the light-intensity distribution uniformizing element 5 are respectively formed in a rectangular shape, the width of the incident end plane 5a (or the outgoing end plane 5b) in the x-axial direction is set to Wx/2 which is half of that of the reflecting surface 15 in the x-axial direction, and the width of the incident end plane 5a (or the outgoing end plane 5b) in the y-axial direction is set to Wy/2 which is half of that of the reflecting surface 15 in the y-axial direction. Therefore, as compared with the conventional image displaying apparatus shown in FIG. 40, even though the size of the reflection type optical-spatial modulator element 11 is the same as that of the DMD 121, because the size of the end plane 5a or 5b of the light-intensity distribution uniformizing element 5 is larger than that of the integrator rod 115, the light receiving efficiency of the light-intensity distribution uniformizing element 5 is higher than that of the integrator rod 115.

Thereafter, a plurality of light fluxes respectively formed in the elliptic shape in section are output from the outgoing end plane 5b of the light-intensity distribution uniformizing element 5. In this case, each light flux formed in the elliptic shape in section has a diverging angle of 20 degrees in the x-axial direction and a diverging angle of 30 degrees in the y-axial direction. Thereafter, the light fluxes pass through the first group of lenses 6, the bending mirror 8 and the second group of lenses 9 and are incident as elliptic light fluxes 27 on the reflection type optical-spatial modulator element 11 through the TIR prism 10. In this case, as shown in FIG. 14C, each elliptic light fluxes 27 incident on the reflection type optical-spatial modulator element 11 is formed in the elliptic shape in section and has a diverging angle of 10 degrees in the x-axial direction and a diverging angle of 15 degrees in the y-axial direction.

Thereafter, the elliptic light fluxes 27 light fluxes 27 are reflected on the micro-mirrors 16 set to the "on" state, and a plurality of elliptic light fluxes 28 go out from the reflection type optical-spatial modulator element 11. In this embodiment, a rotation axis of each micro-mirror 16 is set to be extended in the y-axial direction. That is, the rotation axis of each micro-mirror 16 is parallel to the major axis of the elliptic shape of each elliptic light flux 27. In this case, as shown in FIG. 14C, when a principal ray of each elliptic light flux 27 making an angle of 20 degrees to the normal n0 of the reflecting surface 15 is reflected on the micro-mirror 16 set to the "on" state, a principal ray of the elliptic light flux 28 goes out in the direction of the normal n0 of the reflecting surface 15, and the outgoing elliptic light flux 28 does not overlap with the corresponding incident elliptic light flux 27. Therefore, no interference component is generated from the incident elliptic light fluxes 27 and the outgoing elliptic light fluxes 28. Also, as is described in the first embodiment, because the light receiving efficiency of the light-intensity distribution uniformizing element 5 is higher than that of the integrator rod 115 of the conventional image displaying apparatus, a quantity of light in the incident elliptic light flux 27 (or the outgoing elliptic light flux 28) formed in the elliptic shape in section is larger than that of the incident light flux 107 (or the outgoing light flux 108) formed in the circular shape in section.

Accordingly, in the second embodiment, the lighting efficiency of the image displaying apparatus can be improved so as to display an image on the screen 13 at high brightness, and the image can be displayed at high clearness or contrast.

Also, because the parallel light emitted from the lamp light source is transmitted through the cylindrical lenses 25 and 26 without lowering a quantity of the parallel light, a quantity of light in the light fluxes incident on the reflection type optical-spatial modulator element 11 is larger than that of the first embodiment. Accordingly, the parallel light emitted from the lamp light source can be efficiently incident on the reflection type optical-spatial modulator element 11, and the brightness of the image can be further heightened.

Also, because stray light is generated in the reflection type optical-spatial modulator element 11 and the TIR prism 10 in the same manner as in the first embodiment, the projection lens deformed diaphragm 12b shown in FIG. 13B is arranged in the image displaying apparatus in the same manner as in the modification of the first embodiment (refer to FIG. 14A). Therefore, the image can be displayed on the screen at high contrast.

Here, the ratio of the major axis length to the minor axis length in the elliptic shape of the incident elliptic light flux 27 (or the outgoing elliptic light flux 28) in section is determined while considering the light receiving performance of the projection lens 12. The light receiving performance of the projection lens 12 depends on the size of an entrance pupil 29 of the projection lens 12. Also, the number of lenses in the cylindrical lens 25 and the number of lenses in the cylindrical lens 26 cannot be limited.

Next, a plurality of modifications of the second embodiment will be described.

Here, in the modifications of the second embodiment, the reflecting surface 15 of the reflection type optical-spatial modulator element 11 is set to the width Wx in the x-axial direction, the reflecting surface 15 is set to the width Wy in the y-axial direction, the incident end plane 5a (or the outgoing end plane 5b) is set to the width Wx/2 in the x-axial direction, and the incident end plane 5a (or the outgoing end plane 5b) is set to the width Wy/2 in the y-axial direction. Also, a rotation axis of each micro-mirror 16 is directed in the y-axial direction.

Figure 15A:
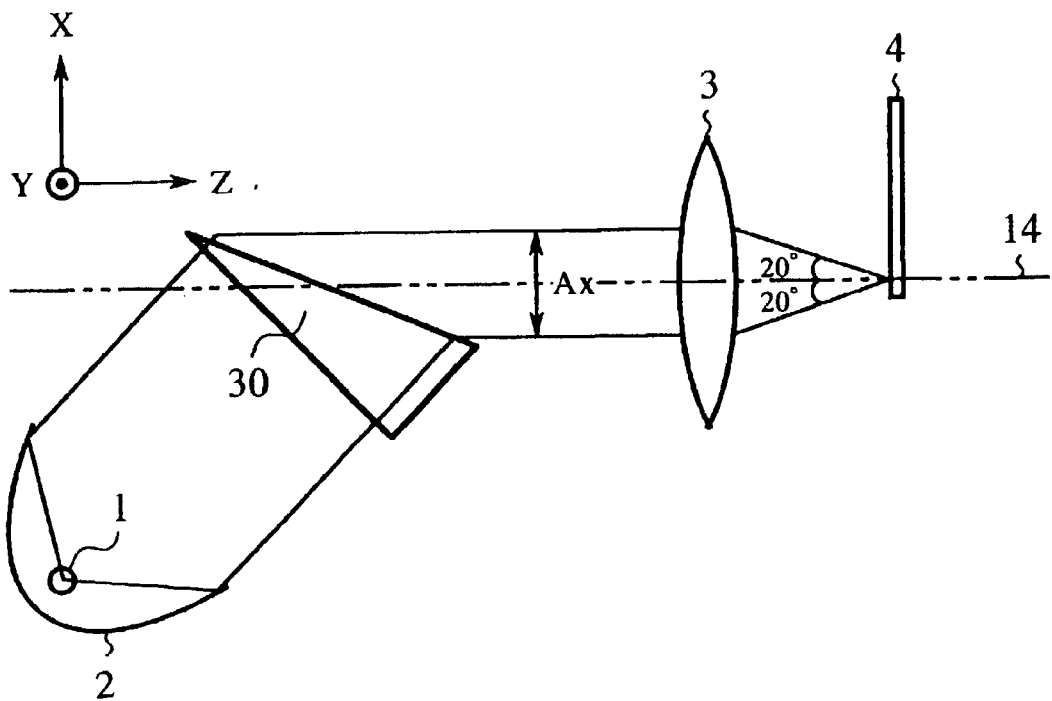
FIG. 15A is a sectional view, taken along an X-Z plane, of a light converging optical system of an image displaying apparatus according to a first modification of the second embodiment of the present invention.
Figure 15B:
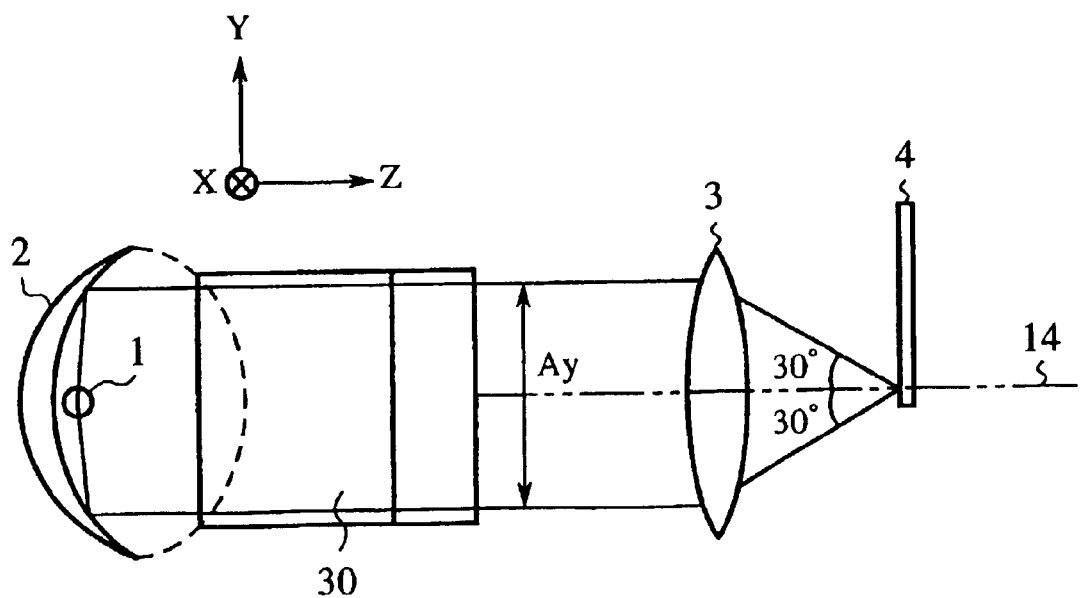
FIG. 15B is a sectional view, taken along a Y-Z plane, of the light converging optical system of the image displaying apparatus shown in FIG. 15A.

FIG. 15A is a sectional view, taken along an X-Z plane, of a light converging optical system of an image displaying apparatus according to a first modification of the second embodiment of the present invention. FIG. 15B is a sectional view, taken along a Y-Z plane, of the light converging optical system of the image displaying apparatus shown in FIG. 15A. The constituent elements, which are the same as those shown in FIG. 1, are indicated by the same reference numerals as those of the constituent elements shown in FIG. 1.

Figure 30:
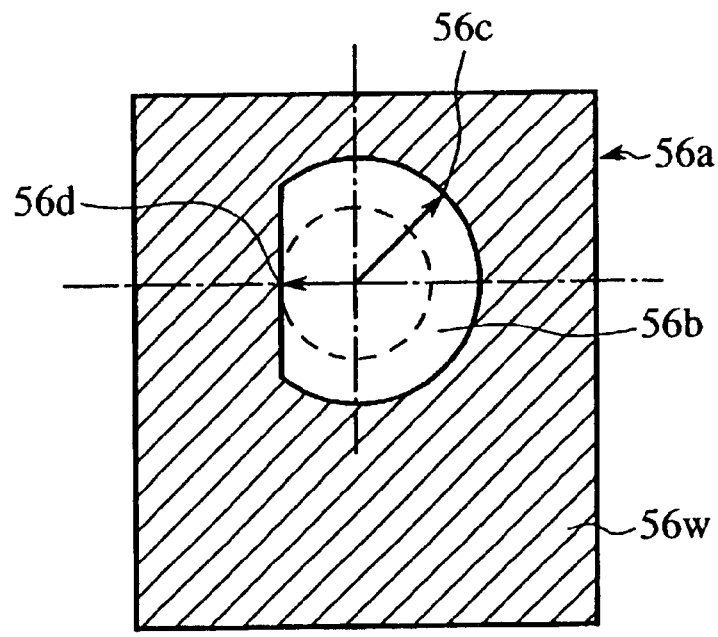
FIG. 30 shows a plan view of a relay deformed diaphragm.

In FIG. 15A and FIG. 15B, 30 indicates a prism (or the light converging optical system or light changing means) disposed between the lamp light source and the converging lens 3. The light emitting element 1 and the parabola reflector 2 composing the lamp light source are shifted from the optical axis 14 in the x-axial direction.

As shown in FIG. 15A, on the X-Z plane, the parallel light emitted from the lamp light source obliquely to the optical axis 14 of the converging lens 3 is refracted by the prism 30 so as to propagate the parallel light in the z-axial direction parallel to the optical axis 14. In this case, the width of the parallel light refracted by the prism 30 is shortened to Ax in the x-axial direction. Thereafter, the parallel light is converged by the converging lens 3 to produce a light flux having a diverging angle of 20 degrees in the x-axial direction. The light flux is incident on the incident end plane 5a of the light-intensity distribution uniformizing element 5 (not shown) through the color wheel 4.

Also, as shown in FIG. 15B, on the Y-Z plane, the parallel light emitted from the lamp light source in parallel to the optical axis 14 of the converging lens 3 passes through the prism 30 while maintaining the width Ay of the parallel light in the y-axial direction. Thereafter, the parallel light is converged by the converging lens 3 to produce a light flux having a diverging angle of 30 degrees in the y-axial direction. The light flux is incident on the incident end plane 5a of the light-intensity distribution uniformizing element 5 (not shown) through the color wheel 4.

Therefore, the parallel light emitted from the lamp light source is changed in the prism 30 to parallel light having the width of Ax in the x-axial direction and the width of Ay in the y-axial direction, and the ratio of Ax to Ay is set to 2:3. That is, the prism 30 functions in the same manner as the cylindrical lenses 25 and 26, parallel light going out from the prism 30 is formed in an elliptic shape in section, and a ratio of the major axis to the minor axis in the elliptic shape of the parallel light is set to 3:2.

Thereafter, a plurality of light fluxes respectively formed in an elliptic shape in section are output from the light-intensity distribution uniformizing element 5.

As is described above, in the first modification of the second embodiment, because the light flux having the x-directional angular distribution and the y-directional angular distribution different from each other is received in the light-intensity distribution uniformizing element 5, the light fluxes respectively formed in the elliptic shape in section are output from the light-intensity distribution uniformizing element 5. Accordingly, no interference component is generated from the light fluxes formed in the elliptic shape in section, and an image can be displayed on the screen 13 at high brightness and high clearness.

Also, because the parallel light emitted from the lamp light source is transmitted through the prism 30 without lowering a quantity of the parallel light, a quantity of light in the elliptic light fluxes incident on the reflection type optical-spatial modulator element 11 is larger than that of the first embodiment. Accordingly, the parallel light emitted from the lamp light source can be efficiently incident on the reflection type optical-spatial modulator element 11, and the brightness of the image can be further heightened.

Also, because stray light is generated in the reflection type optical-spatial modulator element 11 and the TIR prism 10 in the same manner as in the first embodiment, the projection lens deformed diaphragm 12b shown in FIG. 13B is arranged in the image displaying apparatus in the same manner as in the modification of the first embodiment (refer to FIG. 14A). Therefore, the image can be displayed on the screen at high contrast.

Figure 16A:
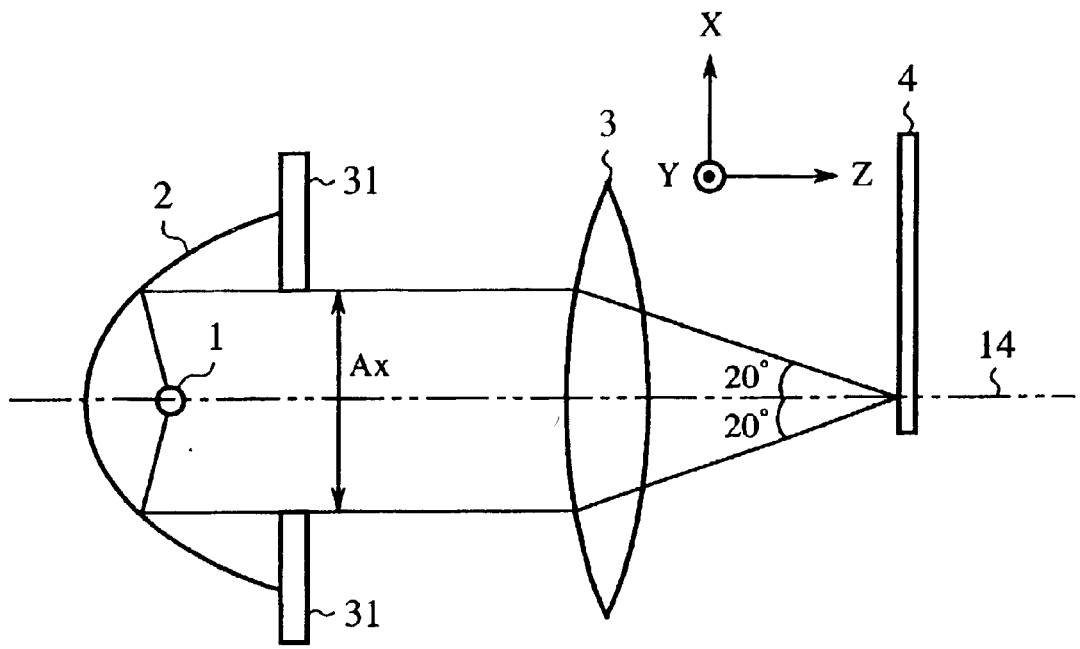
FIG. 16A is a sectional view, taken along an X-Z plane, of a light converging optical system of an image displaying apparatus according to a second modification of the second embodiment of the present invention.
Figure 16B:
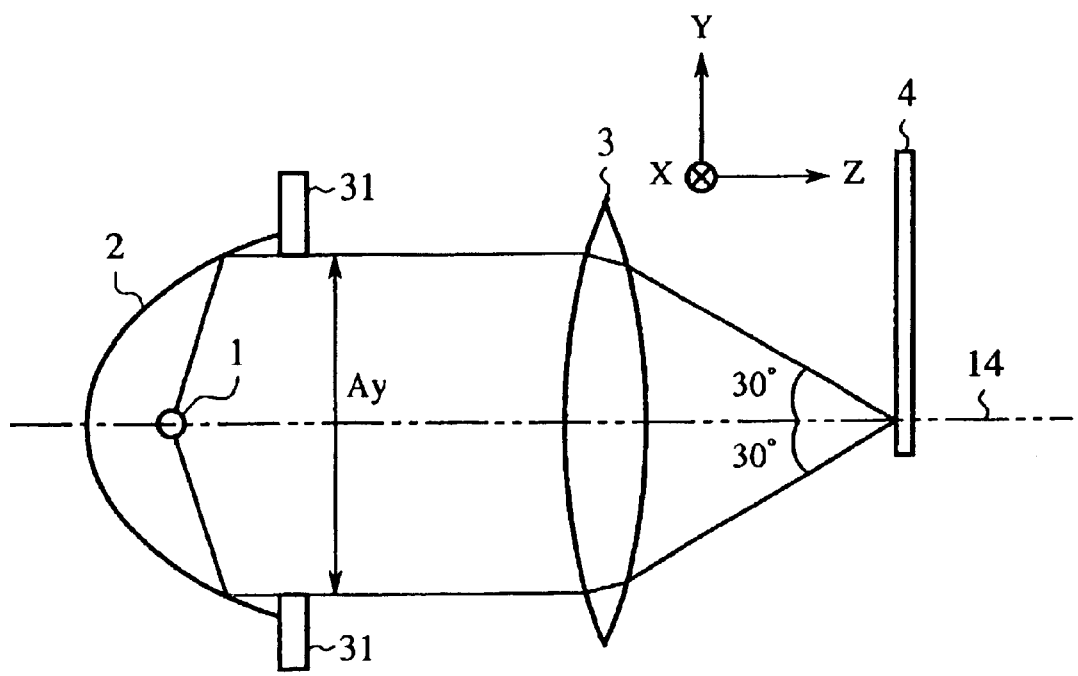
FIG. 16B is a sectional view, taken along a Y-Z plane, of the light converging optical system of the image displaying apparatus shown in FIG. 16A.

FIG. 16A is a sectional view, taken along an X-Z plane, of a light converging optical system of an image displaying apparatus according to a second modification of the second embodiment of the present invention. FIG. 16B is a sectional view, taken along a Y-Z plane, of the light converging optical system of the image displaying apparatus shown in FIG. 16A. The constituent elements, which are the same as those shown in FIG. 1, are indicated by the same reference numerals as those of the constituent elements shown in FIG. 1.

Figure 31:
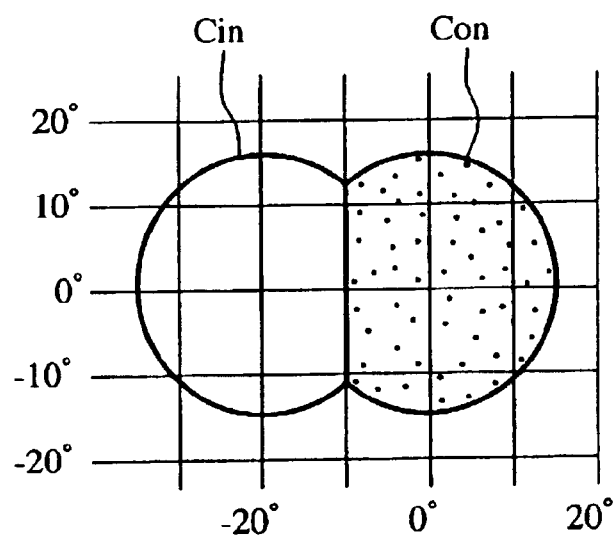
FIG. 31 shows an asymmetric incident light flux Cin and an asymmetric outgoing light flux Cout set to a diverging angle of about 16 degrees corresponding to the F-number F=1.7 in the asymmetric optical system.

In FIG. 16A and FIG. 16B, 31 indicates an aperture plate (or the light converging optical system or light changing means) disposed between the lamp light source and the converging lens 3. An aperture of the parabola reflector 2 is narrowed by the aperture plate 31.

The parallel light emitted from the lamp light source passes through the aperture plate 31 on the Y-Z plane while maintaining the width Ay of the parallel light. Also, on the X-Z plane, the parallel light emitted from the lamp light source passes through the aperture plate 31 while narrowing the width of the parallel light to a value Ax. The ratio of Ax to Ay is set to 2:3. Therefore, the parallel light emitted from the lamp light source is changed in the aperture plate 31 to parallel light having the width Ax in the x-axial direction and the width Ay in the y-axial direction. That is, the aperture plate 31 functions in the same manner as the cylindrical lenses 25 and 26, parallel light going out from the aperture plate 31 is formed in an elliptic shape in section, and a ratio of the major axis to the minor axis in the elliptic shape of the parallel light is set to 3:2.

Thereafter, the parallel light is converged by the converging lens 3 to produce a light flux. In this case, a diverging angle of the light flux to the optical axis 14 in the x-axial direction is equal to 20 degrees, and a diverging angle of the light flux to the optical axis 14 in the y-axial direction is equal to 30 degrees. Thereafter, the light flux is incident on the incident end plane 5a of the light-intensity distribution uniformizing element 5 (not shown) through the color wheel 4. Therefore, a plurality of light fluxes respectively formed in an elliptic shape in section are output from the light-intensity distribution uniformizing element 5.

As is described above, in the second modification of the second embodiment, because the light flux having the x-directional angular distribution and the y-directional angular distribution different from each other is received in the light-intensity distribution uniformizing element 5, the light fluxes respectively formed in the elliptic shape in section are output from the light-intensity distribution uniformizing element 5. Accordingly, no interference component is generated from the light fluxes formed in the elliptic shape in section, and an image can be displayed on the screen 13 at high brightness and high clearness.

Also, because the configuration of the aperture plate 31 is simple as compared with that of the cylindrical lenses 25 and 26 (refer to FIG. 14A and FIG. 14B) or the prism 30 (refer to FIG. 15A and FIG. 15B), the light fluxes formed in the elliptic shape in section can be easily produced as compared with those in the second embodiment and the first modification of the second embodiment.

Also, in cases where a rear surface of the aperture plate 31 facing the parabola reflector 2 is formed to reflect light, light emitted from the light emitting element 1 and intercepted by the rear surface of the aperture plate 31 is reflected on the parabola reflector 2 and the rear surface of the aperture plate 31 many times, and the light is finally transmitted through the aperture plate 31 as a portion of the parallel light having the width Ax in the x-axial direction. Therefore, rays of light emitted from the light emitting element 1 and incident on the reflection type optical-spatial modulator element 11 can be increased, and the brightness of the image can be further heightened. Also, because stray light is generated in the reflection type optical-spatial modulator element 11 and the TIR prism 10 in the same manner as in the first embodiment, the projection lens deformed diaphragm 12b shown in FIG. 13B is arranged in the image displaying apparatus in the same manner as in the modification of the first embodiment (refer to FIG. 14A). Therefore, the image can be displayed on the screen 13 at high contrast.

Embodiment 3

In the second embodiment, the light flux having the elliptic shape in section is formed on the incident side of the light-intensity distribution uniformizing element 5. However, in a third embodiment, a light flux having an elliptic shape in section is formed on the outgoing side of the light-intensity distribution uniformizing element 5.

Figure 17A:
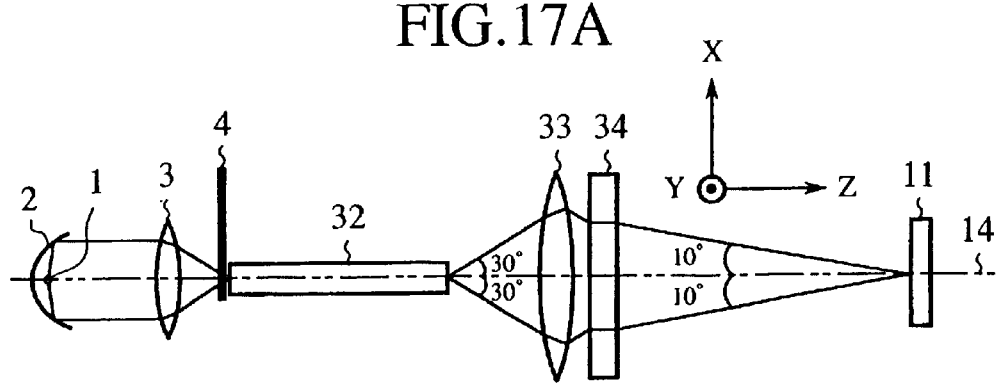
FIG. 17A is a sectional view, taken along an X-Z plane, of an image displaying apparatus according to a third embodiment of the present invention.
Figure 17B:
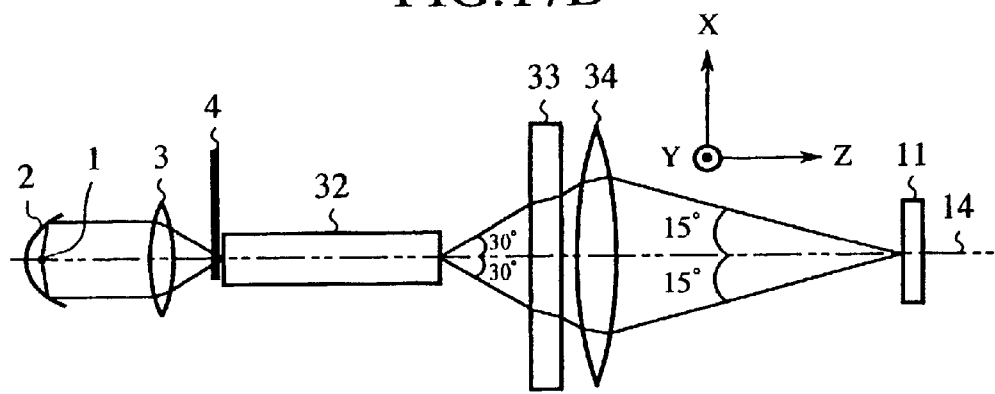
FIG. 17B is a sectional view, taken along a Y-Z plane, of the image displaying apparatus shown in FIG. 17A.

FIG. 17A is a sectional view, taken along an X-z plane, of an image displaying apparatus according to a third embodiment of the present invention. FIG. 17B is a sectional view, taken along a Y-Z plane, of the image displaying apparatus shown in FIG. 17A. The constituent elements, which are the same as those shown in FIG. 1, are indicated by the same reference numerals as those of the constituent elements shown in FIG. 1. Also, for convenience of explanation, the bending mirror 8, the second group of lenses 9, the TIR prism 10, the projection lens and the projection lens deformed diaphragm 12b arranged in the image displaying apparatus of the third embodiment are omitted in FIG. 17A and FIG. 17B. Also, the propagation direction of a principal ray of a light flux incident on the reflection type optical-spatial modulator element 11 is perpendicular to the reflecting surface 15 of the reflection type optical-spatial modulator element 11.

Figure 32:
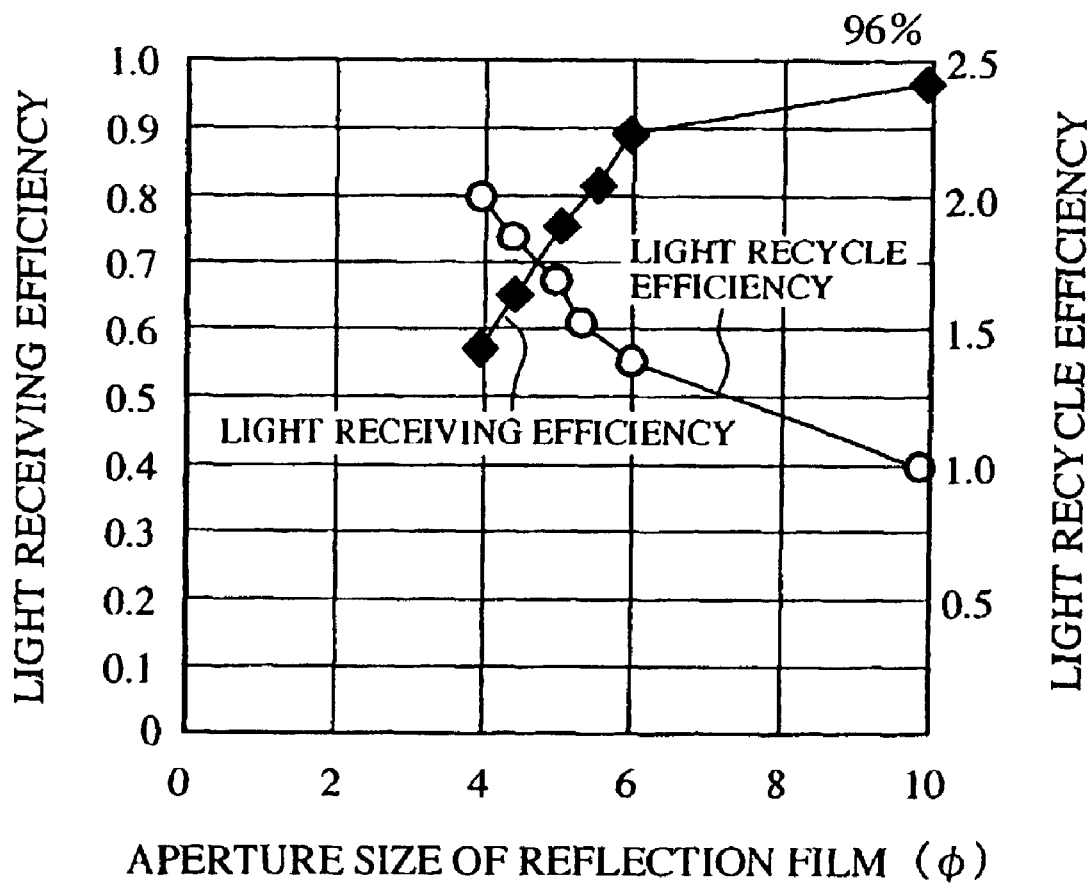
FIG. 32 shows the relation between a light receiving efficiency and a light recycle efficiency with respect to a size of an aperture of a relay deformed diaphragm.

In FIG. 17A and FIG. 17B, 32 indicates a light-intensity distribution uniformizing element. The shape of an incident end plane and an outgoing end plane of the light-intensity distribution uniformizing element 32 is described.

Figure 17C:
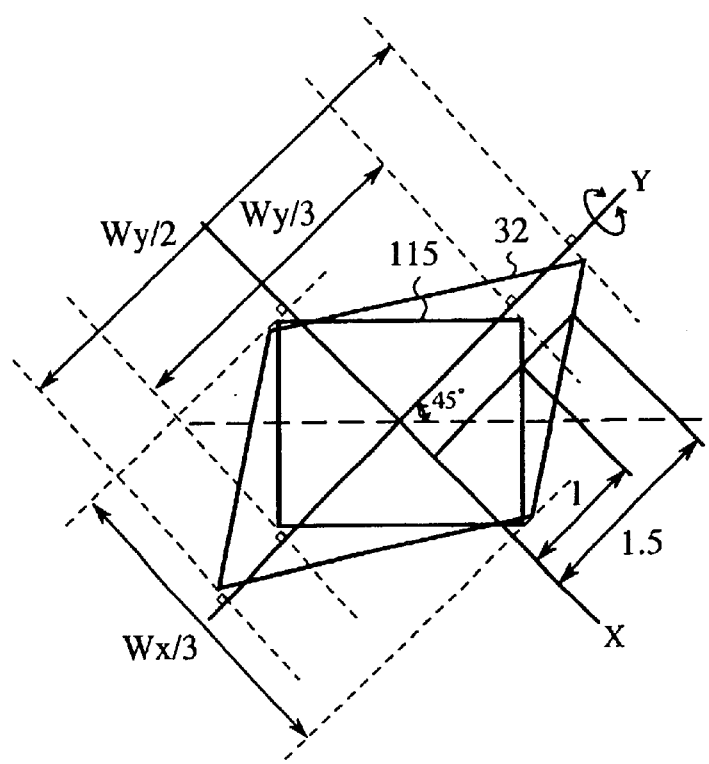
FIG. 17C shows the comparison of an outgoing end plane of a light-intensity distribution uniformizing element shown in FIG. 17A and an outgoing end plane of an integrator rod shown in FIG. 40.
Figure 40:
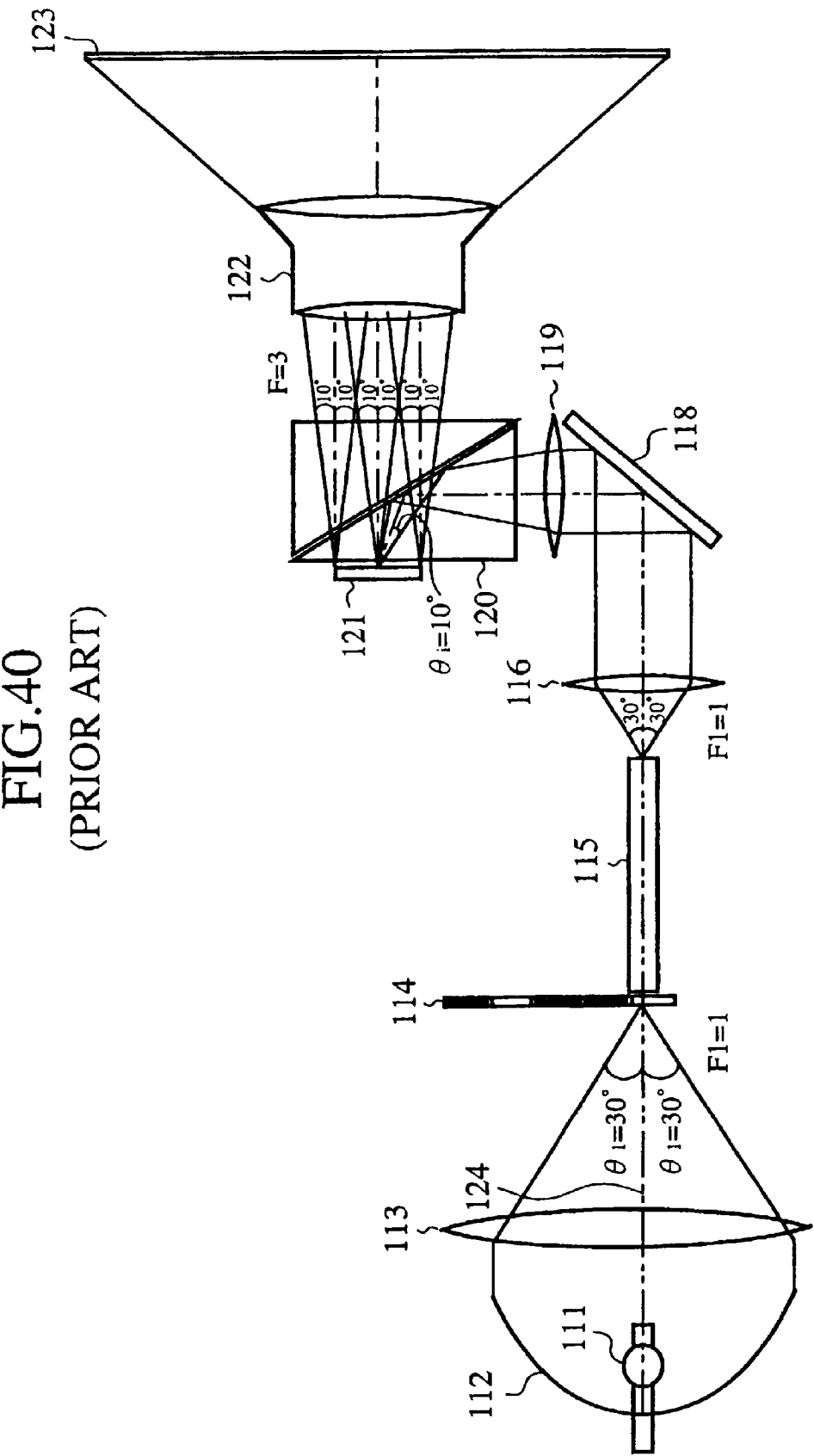
FIG. 40 is a view showing the configuration of a conventional image displaying apparatus using a light converging optical system.

FIG. 17C shows the comparison of an incident end plane (or an outgoing end plane) of the light-intensity distribution uniformizing element 32 and the incident end plane (or the outgoing end plane) of the integrator rod 115 of the conventional image displaying apparatus shown in FIG. 40.

The reflecting surface 15 of the reflection type optical-spatial modulator element 11 is set to the width Wx in the x-axial direction, and the reflecting surface 15 is set to the width Wy in the y-axial direction (refer to FIG. 14D). In this case, as shown in FIG. 17C, the width of the incident end plane (or the outgoing end plane) of the light-intensity distribution uniformizing element 32 in the x-axial direction is set to a width Wx/3 which is equal to ⅓ of that of the reflecting surface 15 in the x-axial direction, and the width of the incident end plane (or the outgoing end plane) of the light-intensity distribution uniformizing element 32 in the y-axial direction is set to a width Wy/2 which is equal to ½ of that of the reflecting surface 15 in the x-axial direction. Therefore, the incident end plane and the outgoing end plane of the light-intensity distribution uniformizing element 32 are respectively formed in a parallelogram shape.

33 and 34 indicate two cylindrical lenses (or a first cylindrical lens and a second cylindrical lense) disposed between the light-intensity distribution uniformizing element 32 and the reflection type optical-spatial modulator element 11. The cylindrical lens 33 has a positive lens function only in the x-axial direction, and the cylindrical lens 34 has a positive lens function only in the y-axial direction. The positive lens functions of the cylindrical lenses 33 and 34 differ from each other.

Parallel light coming from the parabola reflector 2 is converged onto the incident end plane of the light-intensity distribution uniformizing element 32 by the converging lens 3 as a light flux corresponding to the first F-number F1=1 (or the first diverging angle θ1=30 degrees), a plurality of light fluxes respectively having the first diverging angle of 30 degrees in both the x-axial direction and the y-axial direction are output from the outgoing end plane of the light-intensity distribution uniformizing element 32, and the light fluxes are incident on the cylindrical lenses 33 and 34. In this case, because the cylindrical lens 33 has a positive lens function only in the x-axial direction, the light fluxes are changed in the cylindrical lens 33 to a plurality of light fluxes respectively having a diverging angle θi=10 degrees (corresponding to the F-number Fi=3) in the x-axial direction. Also, because the cylindrical lens 34 has a positive lens function only in the y-axial direction, the light fluxes are changed in the cylindrical lens 34 to a plurality of light fluxes respectively having a second diverging angle θ2=15 degrees (corresponding to the second F-number F2=2) in the y-axial direction. Therefore, a plurality of elliptical light fluxes respectively having both the diverging angle of 10 degrees on the X-Z plane and the diverging angle of 15 degrees on the Y-Z plane are formed by the cylindrical lenses 33 and 34 and are incident on the reflection type optical-spatial modulator element 11.

In this embodiment, because of the relation (Wx/3)/Wx= θi/θ1=Fi/F1=⅓ in the x-axial direction, the magnification (that is, the width ratio of the reflection type optical-spatial modulator element 11 to the light-intensity distribution uniformizing element 32) in the x-axial direction is set to 3, and the width of the incident end plane (or the outgoing end plane) of the light-intensity distribution uniformizing element 32 in the x-axial direction is set to the width Wx/3 (Wx/(Wx/3)=3). Also, because of the relation (Wy/2)/Wx= θ2/θ1=F2/F1=½, the magnification in the y-axial direction is set to 2, and the width of the incident end plane (or the outgoing end plane) of the light-intensity distribution uniformizing element 32 in the y-axial direction is set to the width Wy/2 (Wy/(Wy/2)=2). In this case, a magnification ratio of the second embodiment to the prior art shown in FIG. 41 is set to 1 (3:3) on the X-Z plane (or in the x-axial direction), and a magnification ratio of the second embodiment to the prior art shown in FIG. 41 is set to 1.5 (3:2) on the X-Z plane (or in the y-axial direction).

Figure 41:
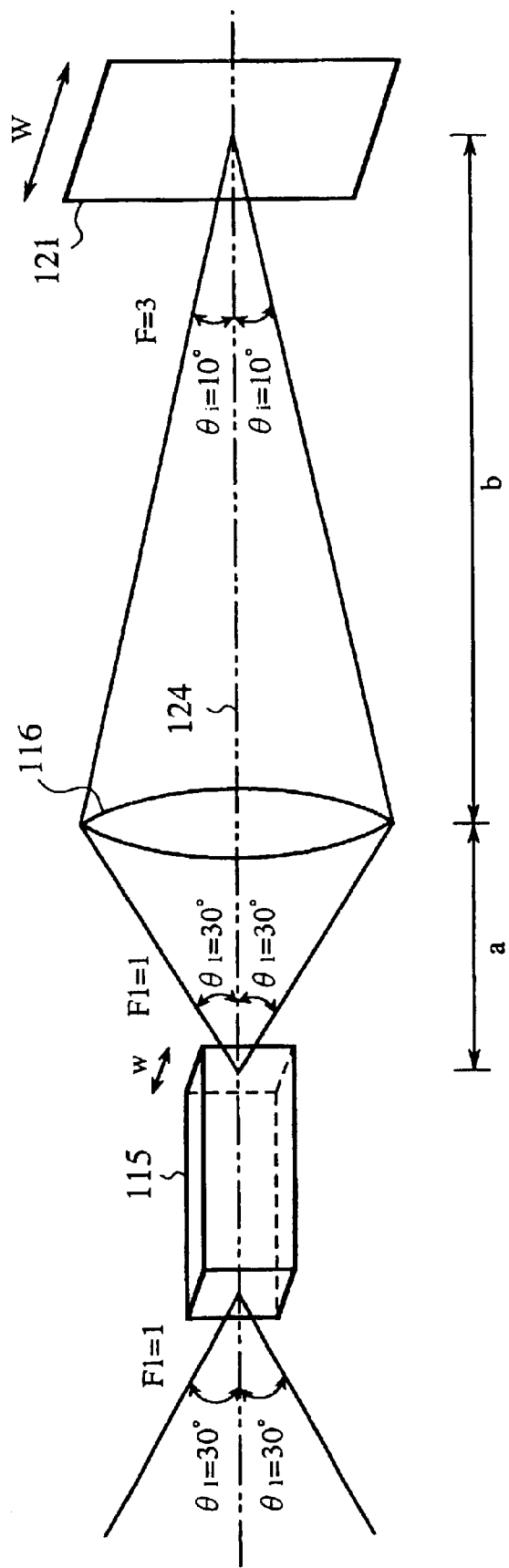
FIG. 41 is an explanatory view showing the relation between a integrator rod and the DMD.

In cases where the size of the reflection type optical-spatial modulator element 11 is set to be equal to that of the DMD 121 shown in FIG. 41, the width of the incident end plane (or the outgoing end plane) of the light-intensity distribution uniformizing element 32 in the x-axial direction is set to be equal to that of the incident end plane (or the outgoing end plane) of the integrator rod 115 (refer to FIG. 41) in the x-axial direction, and the width of the incident end plane (or the outgoing end plane) of the light-intensity distribution uniformizing element 32 in the y-axial direction is set to a value which is 1.5 times of that of the incident end plane (or the outgoing end plane) of the integrator rod 115 (refer to FIG. 41) in the y-axial direction. Therefore, because the size of the incident end plane (or the outgoing end plane) of the light-intensity distribution uniformizing element 32 is 1.5 times of that of the integrator rod 115, the light emitted from light emitting element 1 can be efficiently received in the light-intensity distribution uniformizing element 32 as compared with the light reception in the integrator rod 115.

Here, an aspect ratio of the reflecting surface 15 of the reflection type optical-spatial modulator element 11 is set to be 3:4, and a large number of micro-mirrors 16 respectively formed in a square shape are arranged on the reflecting surface 15. A rotation axis of each micro-mirror 16 is placed on a diagonal line of the micro-mirror 16 directed in the Y-axial direction. Because the outgoing end plane of the light-intensity distribution uniformizing element 32 has the image forming relation with the reflecting surface 15 of the reflection type optical-spatial modulator element 11, when the rotation axis of the micro-mirror 16 is projected onto the outgoing end plane of the light-intensity distribution uniformizing element 32, the projected rotation axis of the micro-mirror 16 is directed in the y-axial direction on the outgoing end plane of the light-intensity distribution uniformizing element 32 and the integrator rod 115. Therefore, because the major axis of the elliptic shape of each light flux is parallel to the rotation axis of the micro-mirror 16, the occurrence of an interference component can be prevented. This relation between the rotation axis of the micro-mirror 16 and the y-axial direction has been already described with reference to FIG. 14C. Because the length of the outgoing end plane of the light-intensity distribution uniformizing element 32 in they-axial direction is 1.5 times of that of the integrator rod 115 in the y-axial direction, as shown in FIG. 17C, the outgoing end plane of the light-intensity distribution uniformizing element 32 can be formed by expanding the outgoing end plane of the integrator rod 115 in the y-axial direction by 1.5 times.

As is described above, in the third embodiment, the light-intensity distribution uniformizing element 32 having the incident end plane and the outgoing end plane formed in the parallelogram shape is arranged, the width of the incident end plane (or the outgoing end plane) of the light-intensity distribution uniformizing element 32 in the x-axial direction is set to be ⅓ of the length of the reflecting surface 15 of the reflection type optical-spatial modulator element 11, and the width of the incident end plane (or the outgoing end plane) of the light-intensity distribution uniformizing element 32 in the y-axial direction is set to be ½ of the length of the reflecting surface 15 of the reflection type optical-spatial modulator element 11. Also, each light flux output from the light-intensity distribution uniformizing element 32 at the first diverging angle θ1=30 degrees corresponding to the first F-number F1=1 is received in the cylindrical lenses 33 and 34, the light flux is changed to the diverging angle θi=10 degrees corresponding to the F-number Fi=3 in the x-axial direction in the cylindrical lens 33, the light flux is changed to the diverging angle θ2=20 degrees corresponding to the second F-number F2=2 in the y-axial direction in the cylindrical lens 34, and the light flux is incident on the reflection type optical-spatial modulator element 11. Therefore, in the same manner as in the second embodiment, because the diverging angle of each light flux incident on the reflection type optical-spatial modulator element 11 in the x-axial direction differs from that in the y-axial direction, the light flux is formed in an elliptic shape in section. Also, because the size of the incident end plane of the light-intensity distribution uniformizing element 32 is larger than that of the integrator rod 115, the light receiving efficiency in the light-intensity distribution uniformizing element 32 can be heightened. Accordingly, no interference component is included in the light fluxes incident on the reflection type optical-spatial modulator element 11, an image displayed on the screen 13 can be maintained at high clearness or contrast, and the brightness of the image can be heightened as compared with that of the first embodiment.

Here, the number of cylindrical lenses 33 and 34 is not limited to 2, and it is applicable that the number of cylindrical lenses 33 and 34 be larger than 2. Also, it is applicable that each of the cylindrical lenses 33 and 34 be formed of a group of lenses.

Embodiment 4

FIG. 18A is a view showing an incident elliptic light flux incident on one micro-mirror 16 set to the "on" condition and an outgoing elliptic light flux reflected on the micro-mirror 16. FIG. 18B is a sectional view of both the incident elliptic light flux and the outgoing elliptic light flux shown in FIG. 18A. The constituent elements, which are the same as those shown in FIG. 6A or FIG. 6B, are indicated by the same reference numerals as those of the constituent elements shown in FIG. 6A or FIG. 6B.

In FIG. 18A, 35 indicates an incident principal ray incident on one micro-mirror 16 set to the "on" condition at an incident angle of 10+α degrees to the normal nA of the micro-mirror 16. Here, α is a positive value. 36 indicates an elliptic light flux incident on the micro-mirror 16. The incident principal ray 35 is placed in the center of the incident elliptic light flux 36, and the vertex of the incident elliptic light flux 36 is placed in the center of the micro-mirror 16. 36A and 36B indicate two incident rays of the incident elliptic light flux 36. The incident ray 36A is placed nearest to the normal nA among all rays of the incident elliptic light flux 36, and the incident ray 36B is placed furthest from the normal nA among all rays of the incident elliptic light flux 36. 37 indicates a outgoing principal ray reflected on the micro-mirror 16 at an angle of 10+α degrees to the normal nA of the micro-mirror 16. 38 indicates an elliptic light flux reflected on the micro-mirror 16. The outgoing principal ray 37 is placed in the center of the outgoing elliptic light flux 38, and the vertex of the outgoing elliptic light flux 38 is placed in the center of the micro-mirror 16. 38A and 38B indicate outgoing rays of the outgoing elliptic light flux 37. The outgoing ray 38A is placed nearest to the normal nA among all rays of the outgoing elliptic light flux 37, and the outgoing ray 38B is placed furthest from the normal nA among all rays of the outgoing elliptic light flux 37.

When the incident ray 36A is reflected on the micro-mirror 16, the incident ray 36A is changed to the outgoing ray 38A. Also, when the incident ray 36B is reflected on the micro-mirror 16, the incident ray 36B is changed to the outgoing ray 38B. The incident elliptic light flux 36 and the outgoing elliptic light flux 38 are, for example, formed in the elliptic shape in section according to the second embodiment or the third embodiment. Also, the incident light flux 27 and the outgoing light flux 28 are formed in the elliptic shape in section according to the second embodiment.

In the second embodiment, to output the outgoing principal ray 19 of the outgoing light flux 28 to a direction parallel to the normal n0 of the reflecting surface 15 of the reflection type optical-spatial modulator element 11 when the outgoing principal ray 19 is reflected on the micro-mirror 16 set to the "on" state, the incident principal ray 17 of the incident light flux 27 is incident on the micro-mirror 16 inclined at the inclination angle of 10 degrees at the incident angle of 10 degrees to the normal nA of the micro-mirror 16. In this case, because the outgoing principal ray 19 makes an angle of 20 degrees to the incident principal ray 17 in the x-axial direction, it is required to restrict the diverging angle of the incident light flux 27 in the x-axial direction for the purpose of preventing the occurrence of the interference between the incident light flux 27 and the outgoing light flux 28.

In contrast, in the fourth embodiment, a plurality of light fluxes respectively having both the diverging angle of 20 degrees in the x-axial direction and the diverging angle of 30 degrees in the y-axial direction are output from the light-intensity distribution uniformizing element 5, the diverging angles of each light flux is changed by the lenses 6 and 9 to both the diverging angle of 10+α degrees in the x-axial direction and the diverging angle of 15 degrees in the y-axial direction to for the incident elliptic light fluxes 36, the incident principal ray 35 of each incident elliptic light flux 36 is incident on the micro-mirror 16 set to the "on" state at the incident angle of 10+α degrees to the normal nA of the micro-mirror 16 in the x-axial direction, and the outgoing principal ray 37 of the outgoing elliptic light flux 38 is output at the angle of 10+α degrees to the normal nA in the x-axial direction. That is, the outgoing principal ray 37 propagates in the direction inclined from the normal n0 of the reflecting surface 15 by −α degrees. In this case, the outgoing principal ray 37 makes an angle of 20+2α degrees to the incident principal ray 35.

Therefore, as shown in FIG. 18B, as compared with the angle of 20 degrees between the incident light flux 27 and the outgoing light flux 28, the angle between the incident elliptic light flux 36 and the outgoing elliptic light flux 38 has a margin of 2α degrees in the x-axial direction. In this case, the incident elliptic light flux 36 set to a specific F-number (F=1/(2×tan(10+α)) corresponding to the diverging angle of 10+α degrees) smaller than the F-number Fi=3 (corresponding to the diverging angle of 10 degrees) of the incident light flux 27 in the X-axial direction is incident on the micro-mirror 16.

In this case, because each light flux output from the light-intensity distribution uniformizing element 5 is changed from the diverging angle of 20 degrees to the diverging angle of 10+α degrees in the x-axial direction, the width of the end plane 5a or 5b of the light-intensity distribution uniformizing element 5 in the x-axial direction is set to be (10+α)/10 times of that of the light-intensity distribution uniformizing element 5 of the second embodimen. Therefore, the width of the incident end plane of the light-intensity distribution uniformizing element 5 in the x-axial direction according to the fourth embodiment can be larger than that of the light-intensity distribution uniformizing element 5 according to the second embodiment. Accordingly, the light receiving efficiency in the light-intensity distribution uniformizing element 5 can be further heightened, and the brightness of the image displayed on the screen can be further heightened.

Here, the outgoing principal ray 37 of the outgoing elliptic light flux 38 propagates in the direction inclined from the normal n0 of the reflecting surface 15 by −α degrees, and the optical axis 14 of the projection lens 12 agrees with the normal n0 of the reflecting surface 15 of the reflection type optical-spatial modulator element 11. Therefore, to receive all rays of the outgoing elliptic light flux 38 in the projection lens 12, the projection lens 12 is designed and formed so as to receive the outgoing ray 38B making a largest angle to the normal n0 among all rays of the outgoing elliptic light flux 38.

As is described above, in the fourth embodiment, the incident principal ray 35 of the incident elliptic light flux 36 is incident on the micro-mirror 16, which is inclined at the inclination angle of 10 degrees to be set to the "on" state, at the incident angle of 10+α degrees to the normal nA of the micro-mirror 16 in the x-axial direction, the outgoing principal ray 37 makes an angle of 20+2α degrees to the incident principal ray 35, and the margin of the angle of 2α degrees is obtained.

Therefore, the elliptic light flux 36 set to a specific F-number smaller than that of the elliptic light flux 27 of the second embodiment can be incident on the micro-mirror 16, the specific F-number of the incident elliptic light flux 36 is not restricted by the inclination angle of the micro-mirror 16, and the brightness of the image displayed on the screen 13 can be further heightened.

In the fourth embodiment, the incident elliptic light flux 36 formed in the elliptic shape in section is incident on each micro-mirror 16. However, the fourth embodiment is not limited to the incident elliptic light flux 36.

That is, it is applicable that the incident light flux 107 (refer to FIG. 39) formed in the circular shape in section or the incident asymmetric light flux 24 (refer to FIG. 4C) formed in the almost D shape in section be incident on each micro-mirror 16 according to the fourth embodiment.

Also, in the fourth embodiment, the incident elliptic light flux 36 is formed in the elliptic shape in the same manner as in the second embodiment. However, it is applicable that the incident elliptic light flux 36 be formed in the elliptic shape in the same manner as in the third embodiment. In this case, the width of the end plane of the light-intensity distribution uniformizing element 32 according to the fourth embodiment is set to be (10+α)/10 times of that of the light-intensity distribution uniformizing element 36 of the third embodiment. Therefore, the light receiving efficiency of the light-intensity distribution uniformizing element 36 can be improved as compared with in the third embodiment.

Embodiment 5

In the first and second embodiments, the aperture 12d of the projection lens deformed diaphragm 12b is formed in the almost D shape (refer to FIG. 13B). In a fifth embodiment, the aperture 12d of the projection lens deformed diaphragm 12b is formed in a D shape.

Figure 19:
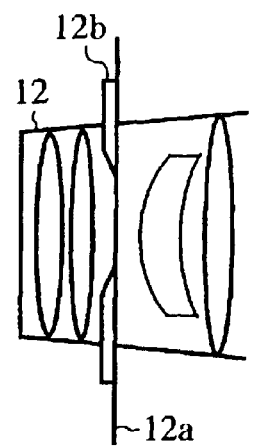
FIG. 19 is a vertical sectional view of a projection lens having a projection lens deformed diaphragm according to a fifth embodiment.
Figure 20:
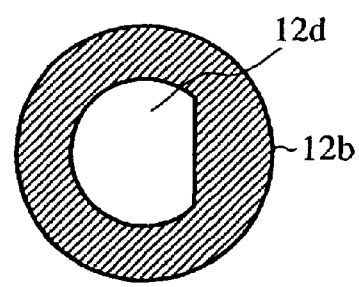
FIG. 20 is a plan view of the projection lens deformed diaphragm shown in FIG. 19.
Figure 21:
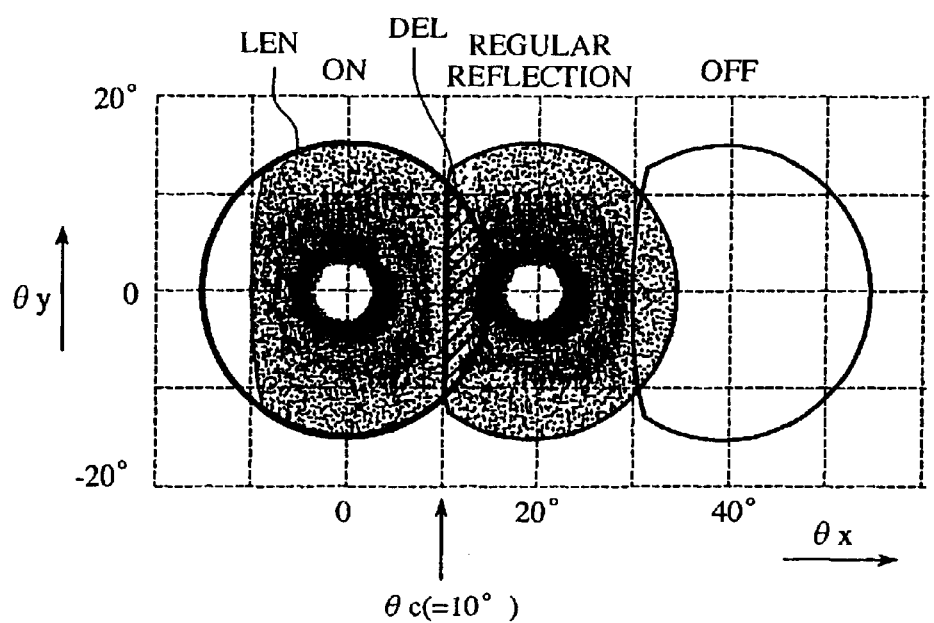
FIG. 21 is a schematic view of three angular distributions of rays of an asymmetric light flux with respect to an angle from a normal of a reflecting surface according to the fifth embodiment.

FIG. 19 is a vertical sectional view of the projection lens 12 having a projection lens deformed diaphragm 12b according to a fifth embodiment, and FIG. 20 is a plan view of the projection lens deformed diaphragm 12b shown in FIG. 19. FIG. 21 is a schematic view of three angular distributions of rays of the asymmetric light flux 24 with respect to the angle from the normal line n0 of the reflecting surface 15 according to the fifth embodiment in cases where the rays of light having the doughnut shaped angular distribution are emitted from the lamp light source of the light converging optical system.

Each micro-mirror 16 is inclined from the reflecting surface 15 placed on the X-Y plane, and the micro-mirror 16 is inclined on a rotation axis directed in the y-axial direction. In this case, a propagation direction of each ray of the asymmetric light flux 24 reflected on the micro-mirror 16 is expressed by angular coordinates (θx, θy). θx denotes an angle between the optical axis 14 of the projection lens 12 (or the normal no of the reflecting surface 15) and a propagation direction of the ray projected on the X-Z plane. θy denotes an angle between the optical axis 14 of the projection lens 12 and a propagation direction of the ray projected on the Y-Z plane. For example, a propagation direction of a principal ray of the asymmetric light flux 24 reflected on the micro-mirror 16 of the "on" state is expressed by (0, 0), and a propagation direction of a principal ray of the asymmetric light flux 24 reflected on the micro-mirror 16 of the "off" state is expressed by (+40 degrees, 0). That is, the propagation direction for the micro-mirror 16 of the "off" state is shifted in the +θx direction by 40 degrees as compared with the propagation direction for the micro-mirror 16 of the "on" state.

In FIG. 21, an angular distribution of rays of the asymmetric light flux 24 reflected on the micro-mirrors 16 of the "on" state is shown on the left side, an angular distribution of rays of stray light generated according to the specular reflection is shown on the middle side, and an angular range of rays of the asymmetric light flux 24 reflected on the micro-mirrors 16 of the "off" state is shown on the right side.

As shown in FIG. 20, the aperture 12d of the projection lens deformed diaphragm 12b is formed in a D shape. As shown in FIG. 21, a principal ray of the asymmetric light flux 24 reflected on the micro-mirror 16 of the "off" state propagates in a θx angular direction inclined by θx=40 degrees from the normal n0 of the reflecting surface 15. In this case, the projection lens deformed diaphragm 12b formed in the D shape intercepts rays of light placed in the overlapping area DEL equal to or larger than a stop angle θc in the θx angular direction. Therefore, rays of the reflected asymmetric light flux 24 and stray light placed in the overlapping area DEL are removed from the reflected asymmetric light flux 24. In the fifth embodiment, the stop angle θc is set to 10 degrees.

Next, the relation between the brightness of an image reproduced from the asymmetric light fluxes 24 and the stop angle θc will be described.

In cases where the micro-mirror 16 is controlled to be inclined at an angle of +θin or −θin degrees, a minimum value of the stop angle θc is set to 0.5×θin. Also, when the asymmetric light flux 24 reflected on the micro-mirror 16 of the "on" state is received in the projection lens 12, the asymmetric light flux 24 received in the projection lens 12 has a maximum angle θp in the θx angular direction. Therefore, a maximum value of the stop angle θc is set to θp. The angle θp is expressed by an equation tan θp=1/(2×Fp). Fp denotes the F-number of the projection lens 12. Therefore, in this embodiment, the range of the stop angle θc is expressed by 0.5×θin≦θc≦θp.

For example, in case of Fp=2 and θin=10 degrees, θp=14 degrees and 0.5×θin=5 degrees are obtained. Therefore, the range of the stop angle θc is expressed by 5 degrees ≦θc≦14 degrees.

Figure 22:
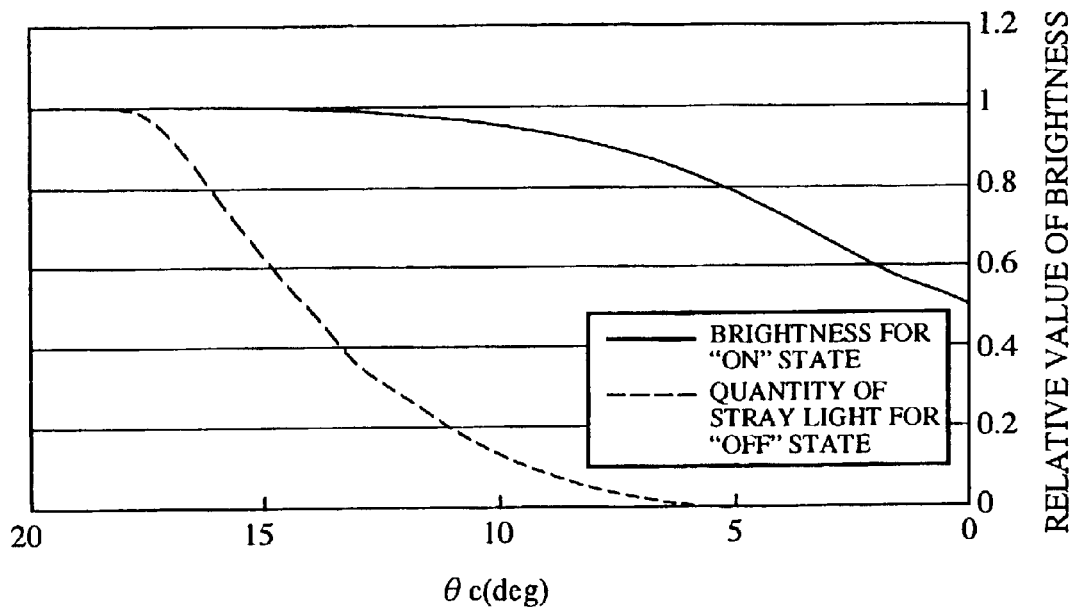
FIG. 22 shows a calculated example of both a change of the brightness of an image and a change of a quantity of stray light included in the image with respect to a stop angle θc.

FIG. 22 shows a calculated example of both a change of the brightness of an image and a change of a quantity of stray light included in the image with respect to the stop angle θc in case of Fp=2 and θin=10 degrees.

As shown in FIG. 22, when the stop angle θc is decreased from 14 degrees to 5 degrees, the brightness of an image displayed on the screen 13 is gradually lowered (refer to a solid line). Also, when the stop angle θc is decreased from 18 degrees to 10 degrees, a quantity of stray light is rapidly decreased (refer to a dotted line). Also, when the stop angle θc is decreased from 10 degrees to 5 degrees, a quantity of stray light is gradually decreased.

Therefore, when the stop angle θc is set to an optimum value, it is expected that the contrast between light and darkness in the image is improved.

Figure 23:
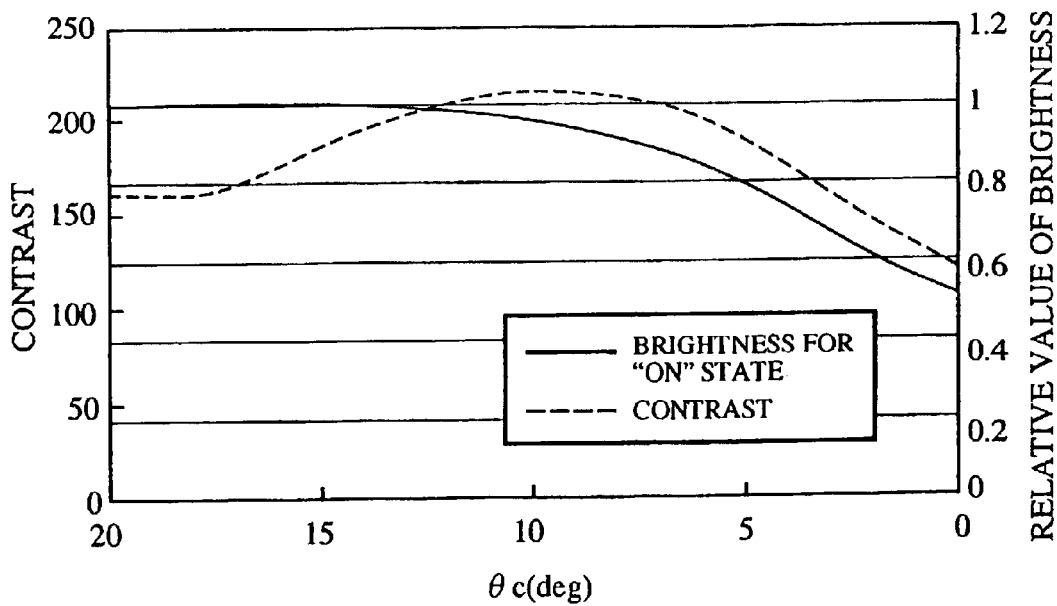
FIG. 23 shows a calculated example of the contrast between light and darkness with respect to a stop angle θc.

FIG. 23 shows a calculated example of the contrast between light and darkness with respect to the stop angle θc in case of Fp=2 and θin=10 degrees.

As shown in FIG. 23, when the stop angle θc is decreased from 14 degrees to 5 degrees, the brightness of the image (refer to a solid line) is slightly lowered, and the contrast between light and darkness (refer to a dotted line) is maintained at a high level. Also, because the degree of the contrast is maximized at the stop angle θc of about 10 degrees, it is preferred that the stop angle θc is set to about 10 degrees.

Accordingly, when the stop angle θc is set to about 10 degrees, the image can be displayed on the screen 13 at high contrast.

Next, an optimum shape of the aperture 12d of the projection lens deformed diaphragm 12b for the reflected elliptic light flux 28 or 38 will be described below.

Figure 24:
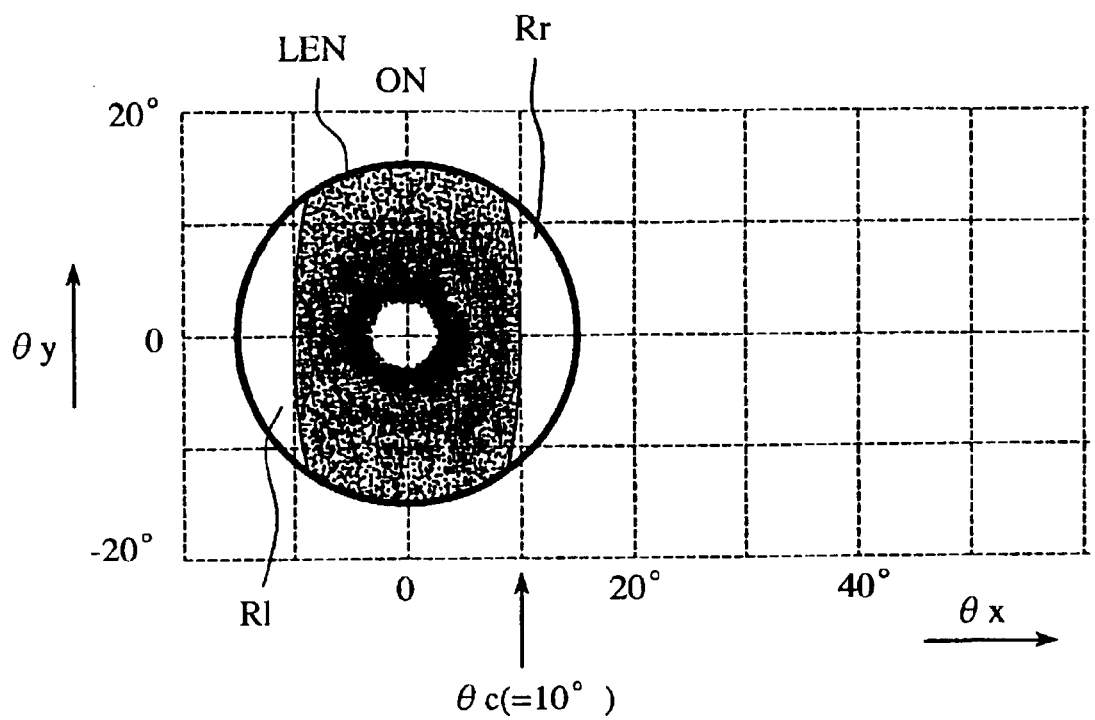
FIG. 24 shows an intensity distribution of an reflected elliptic light flux in an angular plane (θx, θy)
Figure 25:
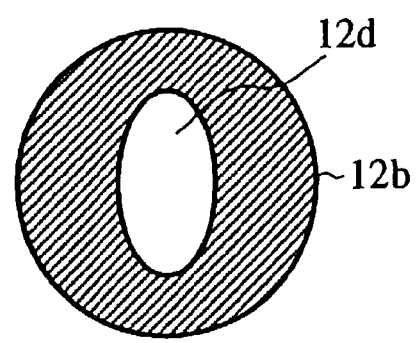
FIG. 25 is a plan view of a projection lens deformed diaphragm applied for the reflected elliptical light flux shown in FIG. 24.

FIG. 24 shows an intensity distribution of the reflected elliptic light flux 28 or 38 in the angular plane (θx, θy). FIG. 25 is a plan view of the projection lens deformed diaphragm 12b applied for the reflected elliptic light flux 28 or 38.

As shown in FIG. 24, in cases where the incident elliptic light flux 27 or 36 is reflected on the micro-mirror 16 according to the second or fourth embodiment, because the entrance pupil of the projection lens 12 is formed in a circular shape, the reflected elliptic light flux 28 or 38 does not pass through either a left-side region Rl or a right-side region Rr of the entrance pupil of the projection lens 12 when the incident elliptic light flux 27 or 36 is reflected on the micro-mirror 16 set to the "on" state. In this case, there is probability that stray light passes through the left-side region Rl or the right-side region Rr. To prevent the stray light from being received in the projection lens 12, as shown in FIG. 25, the aperture 12d of the projection lens deformed diaphragm 12b is formed in an elliptic shape. Therefore, the aperture 12d of the projection lens deformed diaphragm 12b prevents the stray light from passing through the left-side region Rl or the right-side region Rr of the entrance pupil of the projection lens 12.

Accordingly, in cases where the incident elliptic light flux 27 or 36 is reflected on the micro-mirror 16 according to the second or fourth embodiment, the image can be reliably displayed at high contrast.

Here, in the first to fifth embodiments, the inclination angle of each micro-mirror 16 is set to ±10 degrees. However, the first to fifth embodiments can be applied for the inclination angle other than ±10 degrees.

Embodiment 6

Figure 26:
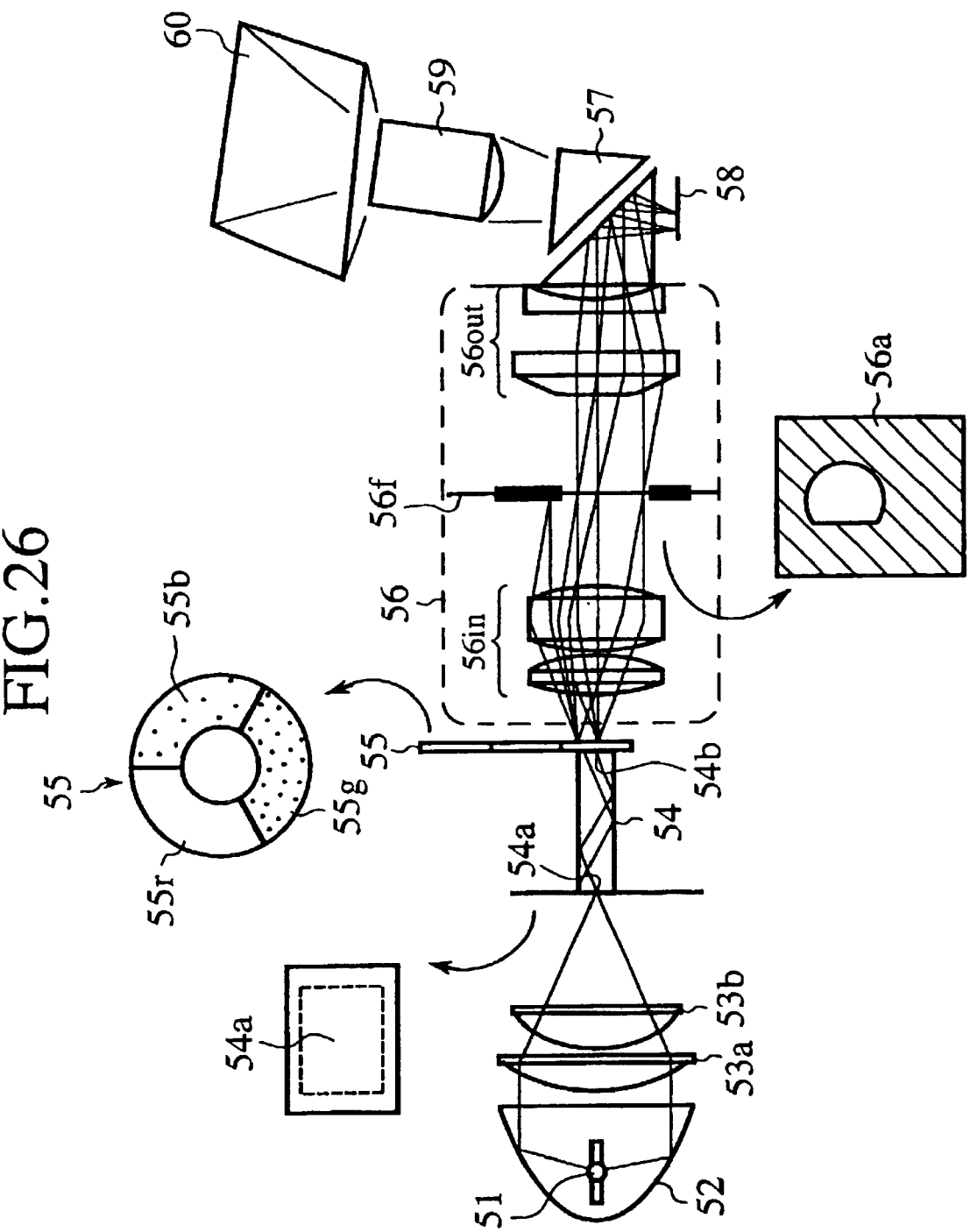
FIG. 26 is a view showing the configuration of an image displaying apparatus, in which an asymmetric optical system is used in the same manner as in the first embodiment, according to a sixth embodiment of the present invention.

FIG. 26 is a view showing the configuration of an image displaying apparatus, in which the asymmetric optical system is used in the same manner as in the first embodiment, according to a sixth embodiment of the present invention.

In FIG. 26, 51 indicates a light source formed of a high pressure mercury lamp. 52 indicates a reflector for changing white light emitted from the light source 51 to parallel white light. 53a and 53b indicate condensing lenses respectively. The parallel white light is changed to a white light flux by the condensing lenses 53a and 53b.

54 indicates a light-intensity distribution uniformizing element for producing a plurality of white light fluxes having a uniformized intensity distribution from the white light flux. 54a indicates an incident end plane of the light-intensity distribution uniformizing element 54. The white light flux is converged onto the incident end plane 54a by the condensing lenses 53a and 53b. 54b indicates an outgoing end plane of the light-intensity distribution uniformizing element 54. The size of both the incident end plane 54a and the outgoing end plane 54b of the light-intensity distribution uniformizing element 54 is larger than the regular size (5 mm×3.8 mm) of the light-intensity distribution uniformizing element 204 shown in FIG. 43 or FIG. 46. Therefore, a light receiving efficiency of the light-intensity distribution uniformizing element 54 is improved as compared with that of the light-intensity distribution uniformizing element 204.

55 indicates a disk shaped color wheel. The disk shaped color wheel 55 is disposed on the outgoing end plane 54b of the light-intensity distribution uniformizing element 54. 55r indicates a red color filter of the color wheel 55. 55b indicates a blue color filter of the color wheel 55. 55g indicates a green color filter of the color wheel 55. Each white light flux output from the light-intensity distribution uniformizing element 54 passes through the red color filter 55r, the blue color filter 55b or the green color filter 55g of the color wheel 55 and is colored red, blue or green.

56 indicates a relay lens unit (or a relay optical system). 56f denotes a Fourier transformation plane. 56in indicates a group of first lenses disposed on the incident side of the relay lens unit 56. The Fourier transformation plane 56f is formed by a group of first lenses 56in disposed on the incident side of the relay lens unit 56. The formation of the Fourier transformation plane 56f is described in detail with reference to FIG. 3. 56a indicates a relay deformed diaphragm. The relay deformed diaphragm 56a is figured in the same manner as the relay deformed diaphragm 7 shown in FIG. 4B and has an aperture 56b formed in an almost D shape. 56out indicates a group of second lenses disposed on the outgoing side of the relay lens unit 56. Light passing through the aperture 56b of the relay deformed diaphragm 56a is changed to a plurality of asymmetric colored light fluxes by the group of second lenses 56out in the same manner as in the first embodiment.

57 indicates a TIR prism. The TIR prism 57 functions in the same manner as the TIR prism 10 shown in FIG. 1. 58 indicates a reflection type optical-spatial modulator element for receiving the asymmetric colored light fluxes, adding position information denoting image information to the asymmetric colored light fluxes. 59 indicates a projection lens for forming an image from the asymmetric colored light fluxes having the image information. 60 indicates a screen for displaying the image.

Next, an operation of the image displaying apparatus shown in FIG. 26 will be described below.

The color wheel 55 with the color filters 55r, 55b and 55g is rotated. When white light is emitted from the light source 51, the white light is reflected by the reflector 52 so as to be changed to parallel white light. This parallel white light is converged onto the incident end plane 54a of the light-intensity distribution uniformizing element 54 as a white light flux by the condensing lenses 53a and 53b and is received in the light-intensity distribution uniformizing element 54. In this case, the size of the incident end plane 54a of the light-intensity distribution uniformizing element 54 is larger than the regular size (5 mm×3.8 mm) of the incident end plane 204in of the light-intensity distribution uniformizing element 204 shown in FIG. 43. Therefore, a quantity of light received in the light-intensity distribution uniformizing element 54 is larger than that in the light-intensity distribution uniformizing element 204.

Thereafter, the light flux received in the light-intensity distribution uniformizing element 54 is reflected many times in the inside wall of the light-intensity distribution uniformizing element 54 so as to produce a group of white light fluxes and to equalize intensities of the group of white light fluxes in the outgoing end plane 54b of the light-intensity distribution uniformizing element 54. Therefore, the group of white light fluxes having an intensity uniformized distribution are output from the outgoing end plane 54b of the light-intensity distribution uniformizing element 54.

Figure 45:
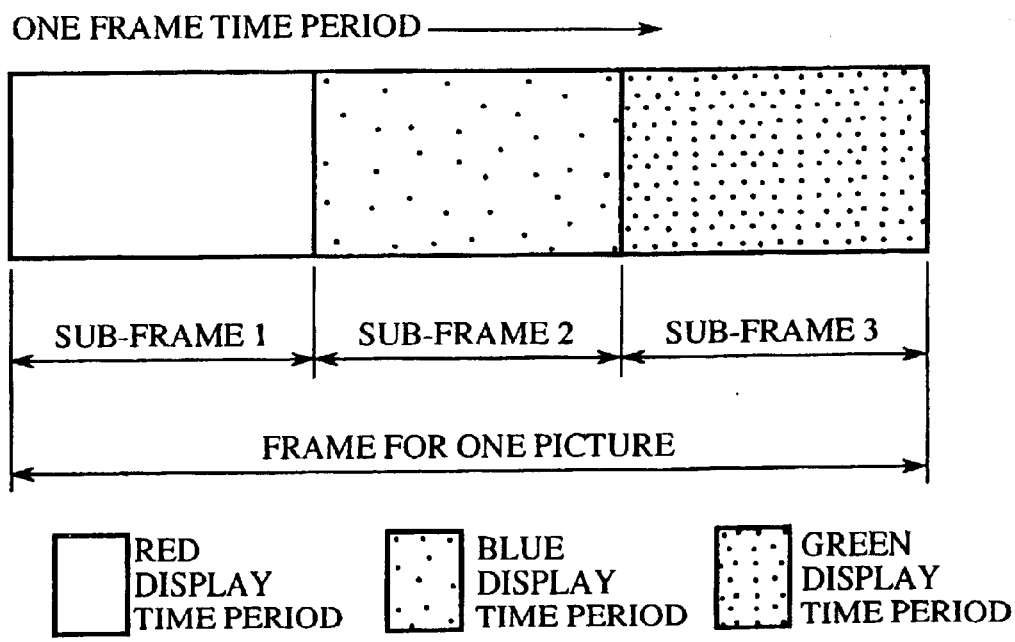
FIG. 45 is a view showing a display condition of three color filters of a color wheel in a single image frame time period.

Thereafter, the group of white light fluxes output from the light-intensity distribution uniformizing element 54 pass through the color filters 55r, 55b and 55g of the color wheel 55 in that order. Therefore, a group of red light fluxes (R), a group of blue light fluxes (B) and a group of green light fluxes (G) of three primary colors are separated one after another from the white light fluxes as colored light fluxes (refer to FIG. 45).

Thereafter, the colored light fluxes separated from the group of white light fluxes in the color wheel 55 pass through the relay lens unit 56 and the TIR prism 57 and are radiated to the reflection type optical-spatial modulator element 58. In this case, as is described in the first embodiment, assuming that each colored light flux radiated to the reflection type optical-spatial modulator element 58 is formed in a circular shape in section, because the light-intensity distribution uniformizing element 54 has the incident end plane 54a larger than the regular size (5 mm×3.8 mm), a portion of the colored light flux incident on a micro-mirror set to the "on" state in the reflection type optical-spatial modulator element 58 overlaps with a portion of an outgoing colored light flux reflected on the micro-mirror, and the overlapping portion of the colored light flux undesirably functions as an interference component.

To prevent the overlapping of the incident colored light flux with the outgoing colored light flux, the relay lens unit 56 is formed as an asymmetric optical system. In detail, the Fourier transformation plane 56f is formed by the group of first lenses 56in of the relay lens unit 56, the relay deformed diaphragm 56a is disposed on the Fourier transformation plane 56f or in the neighborhood of the Fourier transformation plane 56f. Therefore, position information indicating positions of rays of the colored light fluxes in the outgoing end plane 54b of the light-intensity distribution uniformizing element 56 is transformed into diverging angle information indicating diverging angles of rays of light in the Fourier transformation plane 56f, a portion of the rays of light functioning as an interference component is shielded from the reflection type optical-spatial modulator element 58 by the relay deformed diaphragm 56a according to the diverging angle information, and rays of light passing through the relay deformed diaphragm 56a are changed to a plurality of asymmetric colored light fluxes by the group of second lenses 56out.

Therefore, though the light-intensity distribution uniformizing element 54 has the incident end plane 54a larger than the regular size (5 mm×3.8 mm, when the asymmetric colored light fluxes obtained in the relay lens unit 56 are radiated to the reflection type optical-spatial modulator element 58 through the TIR prism 57, any portion of each asymmetric colored light flux incident on the corresponding micro-mirror set to the "on" state in the reflection type optical-spatial modulator element 58 does not overlap with a portion of an outgoing asymmetric colored light flux reflected on the micro-mirror.

Thereafter, a portion of the asymmetric colored light fluxes incident on a plurality of micro-mirrors set to the "on" state are reflected in an "on" direction so as to pass through the projection lens 59, and the portion of the asymmetric colored light fluxes are projected onto the screen 60 to display an image.

As is described above, in the sixth embodiment, the image displaying apparatus includes the condensing lenses 53a and 53b for converging parallel white light emitted from the combination of the light source 51 and the parabola reflector 52, the light-intensity distribution uniformizing element 54 having the incident end plane 54a larger than the regular size (5 mm×3.8 mm), the color wheel 55 disposed on the outgoing end plane 54b of the light-intensity distribution uniformizing element 54, the first group of lenses 56in of the relay lens unit 56, the relay deformed diaphragm 56a placed on the Fourier transformation plane 56f which is formed by the first group of lenses 56in, the TIR prism 57, the reflection type optical-spatial modulator element 58, the projection lens 59 and the screen 60. Therefore, a white light flux converged onto the incident end plane 54a by the condensing lenses 53a and 53b is received in the light-intensity distribution uniformizing element 54 at high light receiving efficiency, a plurality of white light fluxes are output from the outgoing end plane 54b of the light-intensity distribution uniformizing element 54, a plurality of red light fluxes (R), a plurality of blue light fluxes (B) and a plurality of green light fluxes (G) are separated one after another as a plurality of colored light fluxes from the white light fluxes in the color wheel 55, the colored light fluxes pass through the relay lens unit 56 and the aperture 56b of the relay deformed diaphragm 56a so as to be changed to a plurality of asymmetric colored light fluxes, the asymmetric colored light fluxes are incident on the micro-mirrors of the reflection type optical-spatial modulator element 58 through the TIR prism 57, the asymmetric colored light fluxes reflected on the micro-mirrors of the "on" state pass through the projection lens 59, and an image formed of the asymmetric colored light fluxes is displayed on the screen 60. Accordingly, because the size of the incident end plane 54a of the light-intensity distribution uniformizing element 54 is set to be larger than the regular size (5 mm×3.8 mm) in the image displaying apparatus having the asymmetric optical system, the light use efficiency can be considerably improved.

Also, in the sixth embodiment, because the relay deformed diaphragm 56a has the aperture 56b formed in the almost D shape, the asymmetric colored light fluxes formed in the asymmetric shape in section are formed in the relay lens unit 56 including the relay deformed diaphragm 56a, and the overlapping of a portion of the asymmetric colored light fluxes incident on the micro-mirrors with a portion of the asymmetric colored light fluxes reflected on the micro-mirrors can be prevented. Accordingly, the image can be maintained at high contrast.

Here, in the sixth embodiment, it is applicable that the projection lens deformed diaphragm 12b shown in FIG. 13B be disposed on the a Fourier transformation plane determined by an incident group of lenses of the projection lens 59 in the same manner as in the modification of the first embodiment to remove stray light from the asymmetric colored light fluxes projected on the screen 60.

Also, in the sixth embodiment, it is applicable that the cylindrical lenses 25 and 26 shown in FIG. 14, the prism 30 shown in FIG. 15A or the aperture plate 31 shown in FIG. 16A be arranged in the image displaying apparatus in place of the relay deformed diaphragm 56a in the same manner as in the second embodiment.

Also, in the sixth embodiment, it is applicable that the light-intensity distribution uniformizing element 32 and the cylindrical lenses 33 and 34 be arranged in the image displaying apparatus in place of the light-intensity distribution uniformizing element 54 and the relay lens unit 56 in the same manner as in the third embodiment.

Also, in the sixth embodiment, it is applicable that a diverging angle of a colored light flux incident on the reflection type optical-spatial modulator element 58 be set to 10+a degrees ($\alpha>0$) in the same manner as in the fourth embodiment.

Embodiment 7

Figure 27:
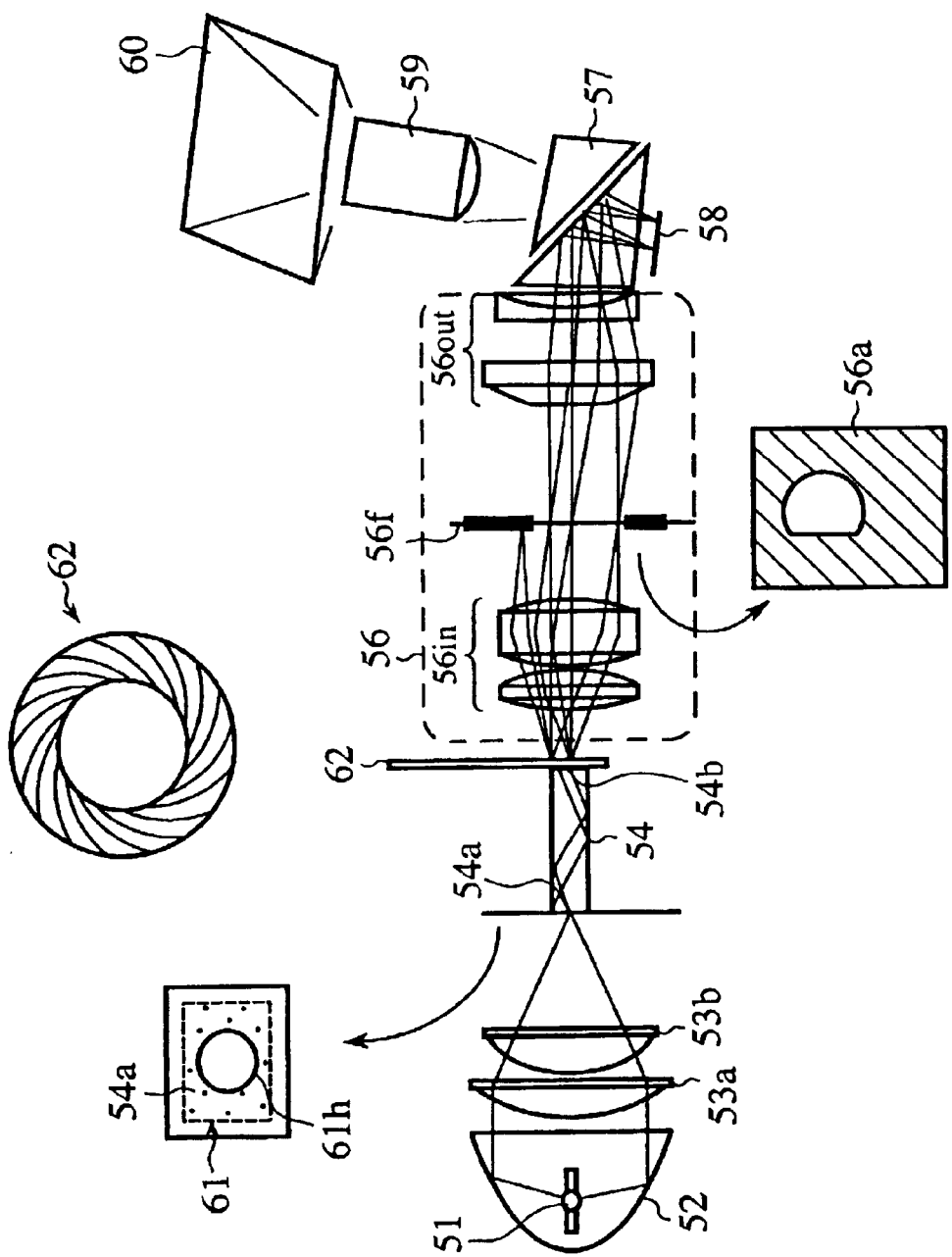
FIG. 27 is a view showing the configuration of an image displaying apparatus, in which both a light recycle system and an asymmetric optical system are used, according to a seventh embodiment of the present invention.

FIG. 27 is a view showing the configuration of an image displaying apparatus, in which both the light recycle system and the asymmetric optical system are used, according to a seventh embodiment of the present invention. The constituent elements, which are the same as those shown in FIG. 26, are indicated by the same reference numerals as those of the constituent elements shown in FIG. 26.

In FIG. 27, 61 indicates a reflection film disposed on the incident end plane 54a of the light-intensity distribution uniformizing element 54. 61h indicates an aperture of the reflection film 61. 62 indicates an SCR wheel disposed on the outgoing end plane 54b of the light-intensity distribution uniformizing element 54. The SCR wheel 62 functions in the same manner as the SCR wheel 212 shown in FIG. 46.

Next, an operation of the image displaying apparatus shown in FIG. 27 will be described below.

The SCR wheel 62 is rotated. A white light flux is converged onto the incident end plane 54a of the light-intensity distribution uniformizing element 54 by the condensing lenses 53a and 53b in the same manner as in the sixth embodiment. Therefore, a major portion of the white light flux passes through the aperture 61h of the reflection film 61 and is received in the light-intensity distribution uniformizing element 54. In this case, the size of the incident end plane 54a of the light-intensity distribution uniformizing element 54 is larger than the regular size of the incident end plane 204in of the light-intensity distribution uniformizing element 204 shown in FIG. 46. Therefore, a quantity of light received in the light-intensity distribution uniformizing element 54 is larger than that in the light-intensity distribution uniformizing element 204.

Thereafter, the white light flux received in the light-intensity distribution uniformizing element 54 is reflected many times in the inside wall of the light-intensity distribution uniformizing element 54 so as to produce a group of white light fluxes and to equalize intensities of the group of white light fluxes in the outgoing end plane 54b of the light-intensity distribution uniformizing element 54. Therefore, the group of white light fluxes having an intensity uniformized distribution are output from the outgoing end plane 54b of the light-intensity distribution uniformizing element 54.

Figure 48:
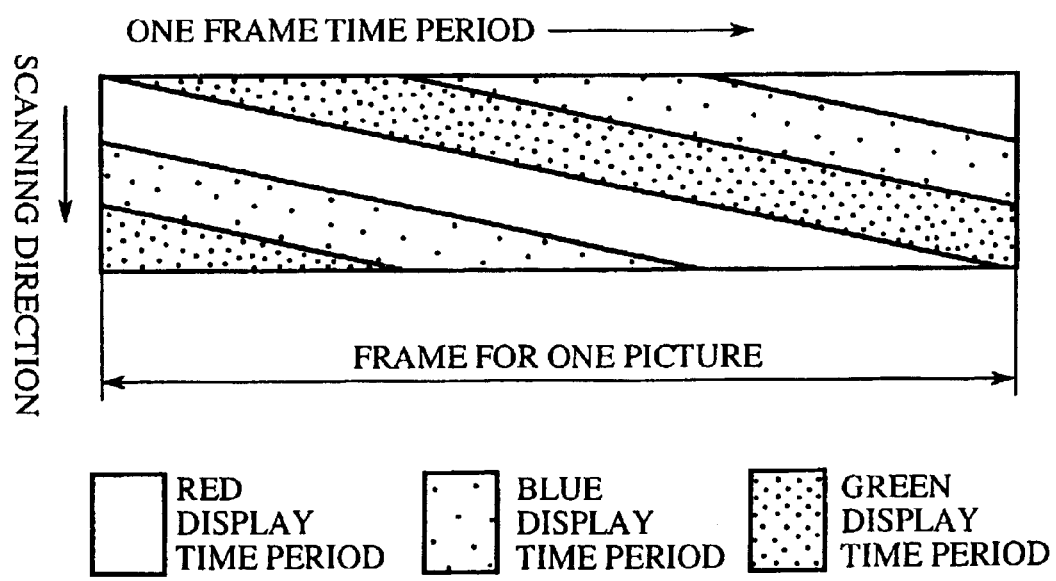
FIG. 48 is a view showing the color filters 212r, 212b and 212g of the SCR wheel 212 going across the white light in a single image frame time period.
Figure 49:
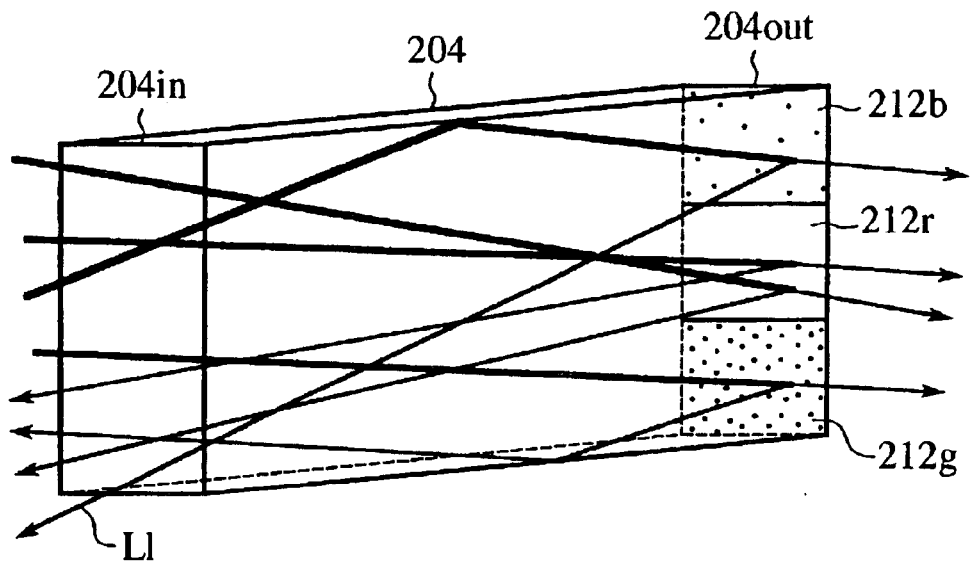
FIG. 49 is a view showing loci of rays of light passing through an integrator rod in cases where no reflecting film is disposed on an incident end plane of the integrator rod.

Thereafter, the group of white light fluxes output from the light-intensity distribution uniformizing element 54 pass through the SCR wheel 62, and a group of red light fluxes (R), a group of blue light fluxes (B) and a group of green light fluxes (G) of three primary colors are simultaneously separated from the white light fluxes in the SCR wheel 62 as colored light fluxes (refer to FIG. 48).

Figure 50:
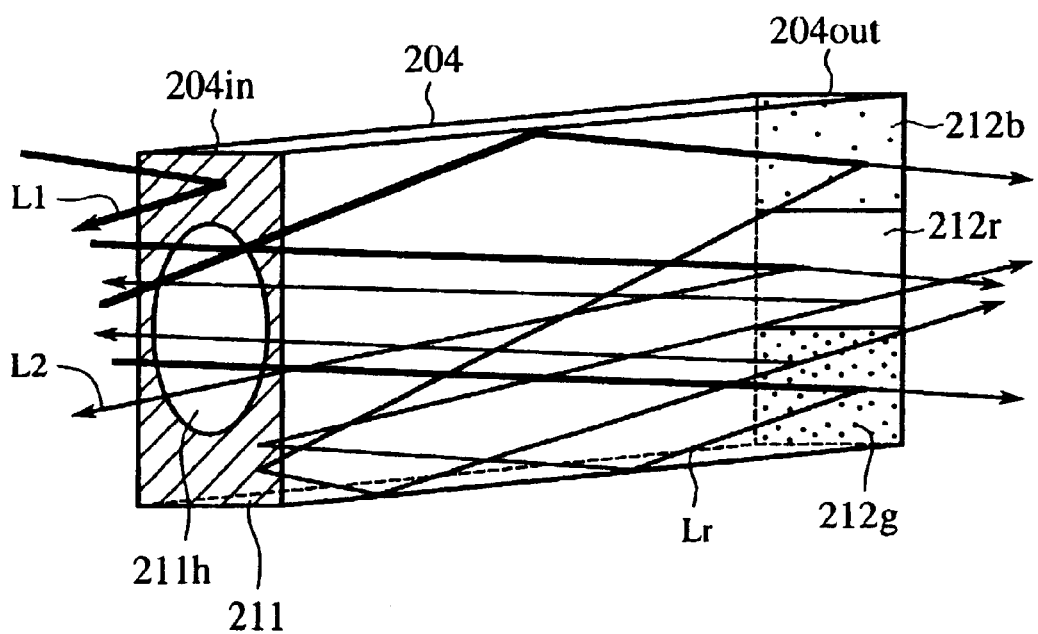
FIG. 50 is a view showing loci of rays of light passing through the integrator rod in cases where a reflecting film is disposed on the incident end plane of the integrator rod.

In this case, as is described with reference to FIG. 50, a portion of light reflected on each color filter of the SCR wheel 62 is reflected on the reflection film 61 as recycle light, and the recycle light again reaches the SCR wheel 62. When the recycle light is incident on another color filter of the SCR wheel 62, the recycle light output from the light-intensity distribution uniformizing element 54 passes through the SCR wheel 62 as a portion of the colored light fluxes. Therefore, the recycle light is reused.

Thereafter, the colored light fluxes passing through the SCR wheel 62 are changed to a plurality of asymmetric colored light fluxes in the relay lens unit 56 in the same manner as in the sixth embodiment, the asymmetric colored light fluxes are radiated to the reflection type optical-spatial modulator element 58 through the TIR prism 57, the asymmetric colored light fluxes incident on the micro-mirrors of the "on" state pass through the projection lens 59, and the asymmetric colored light fluxes are projected onto the screen 60 to display an image.

Figure 46:
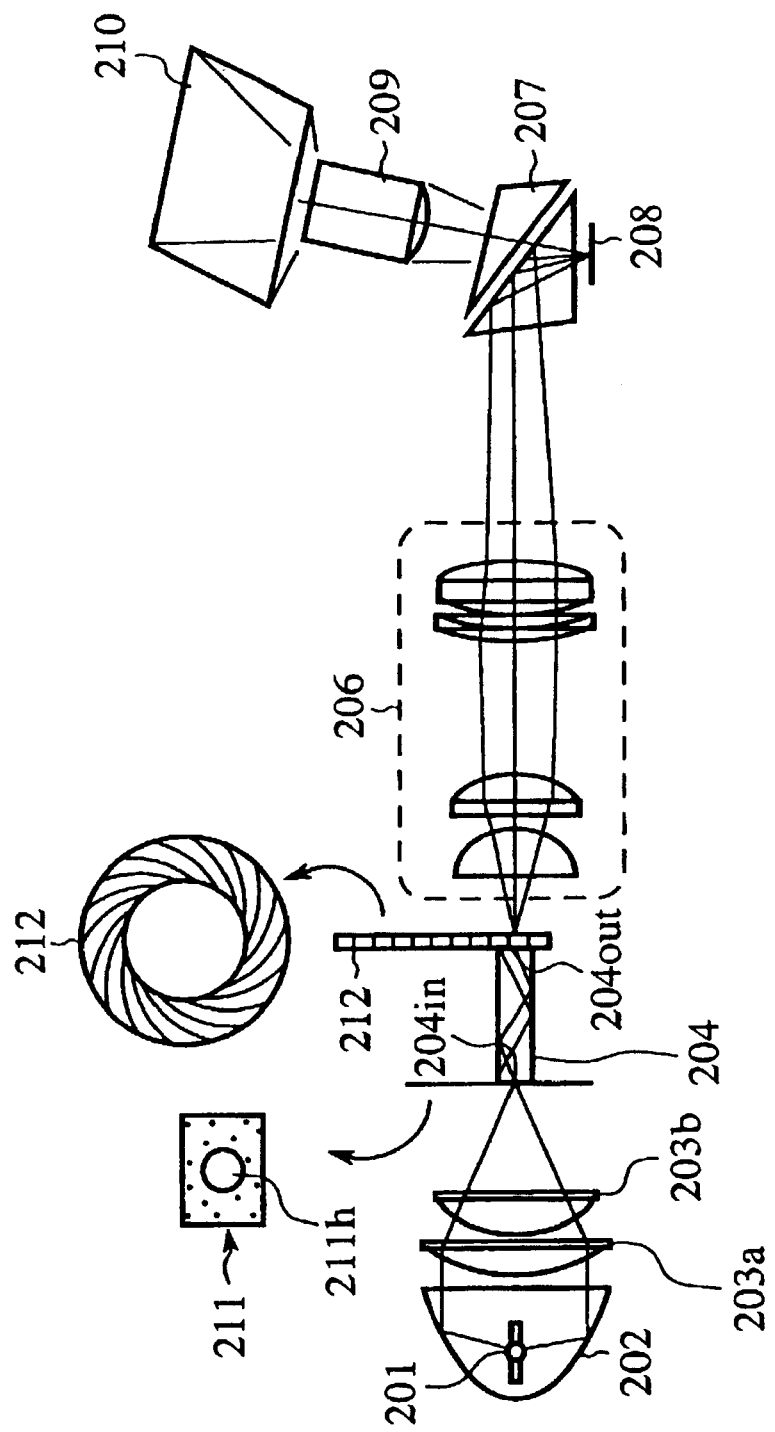
FIG. 46 is a view showing the configuration of a conventional image displaying apparatus using a light recycling optical system.
Figure 47:
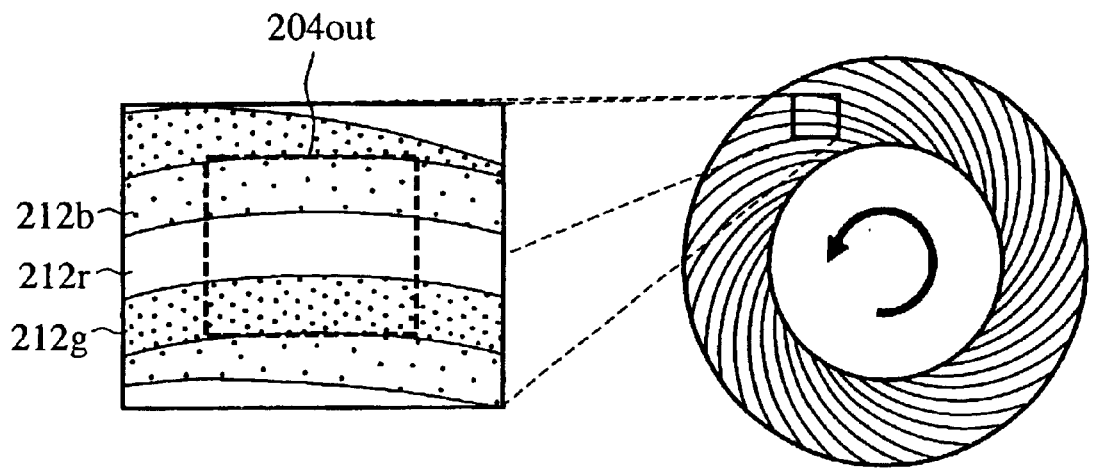
FIG. 47 is a view showing the structure of an SCR wheel of the conventional image displaying apparatus shown in FIG. 46.

In the conventional image displaying apparatus shown in FIG. 46, because the integrator rod 204 is set to the regular size in the symmetric optical system, even though the light recycle optical system composed of the reflection film 211 and the SCR wheel 212 is used, the improvement of the light use efficiency is not sufficient. In contrast, in the displaying apparatus according to the seventh embodiment, the asymmetric optical system is used to set the incident end plane 54a of the light-intensity distribution uniformizing element 54 to a size larger than the regular size of the light-intensity distribution uniformizing element 204. Therefore, a quantity of light received in the light-intensity distribution uniformizing element 54 is increased as compared with that in the light-intensity distribution uniformizing element 204, and the contrast of the image displayed on the screen 60 is maintained by reshaping the light fluxes incident on the reflection type optical-spatial modulator element 58 in the asymmetric shape in section. Therefore, the light use efficiency can be considerably improved when the optimized combination of both the light receiving efficiency and the light recycle efficiency is performed.

Next, effects in the image displaying apparatus using both the light recycle system and the asymmetric optical system will be described in detail.

In cases where the incident end plane 54a of the light-intensity distribution uniformizing element 54 is, for example, set to a size of 8.8 mm×6.7 mm which is larger than the regular size of 5 mm×3.8 mm and is almost the same as that of the converged spot of the white light flux converged by the condensing lenses 53a and 53b, the light receiving efficiency can be heightened to 96% in case of the aperture 56b having a diameter of 10 mm (refer to FIG. 32). In this case, the asymmetric light flux incident on the reflection type optical-spatial modulator element 58 has a diverging angle of about 16 degrees corresponding to the F-number F=1.7. Therefore, the diverging angle of the asymmetric light flux is larger than the inclination angle of 10 degrees. Assuming that the light flux incident on the reflection type optical-spatial modulator element 58 is formed in a circular shape in a symmetric optical system, a portion of the incident light flux overlaps with a portion of the outgoing light flux reflected on the micro-mirror of the "on" state, and an interference component is included in the outgoing light flux.

Figure 28A:
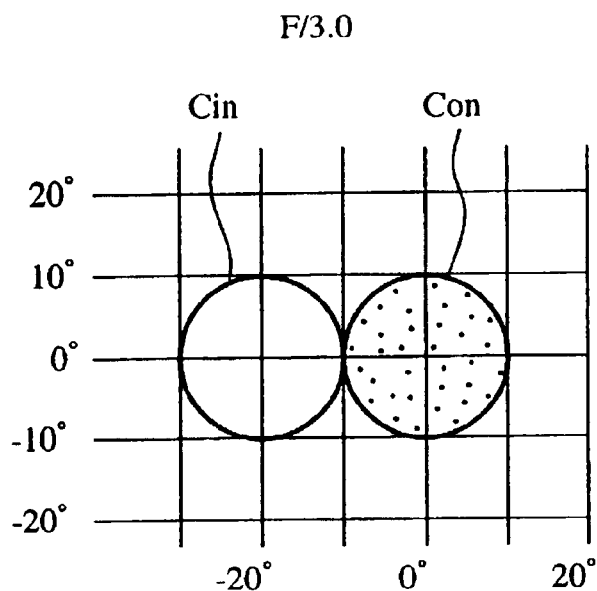
FIG. 28A shows an incident light flux Cin and an outgoing light flux Cout set to a diverging angle of 10 degrees corresponding to the F-number F=3 in the symmetric optical system.
Figure 28B:
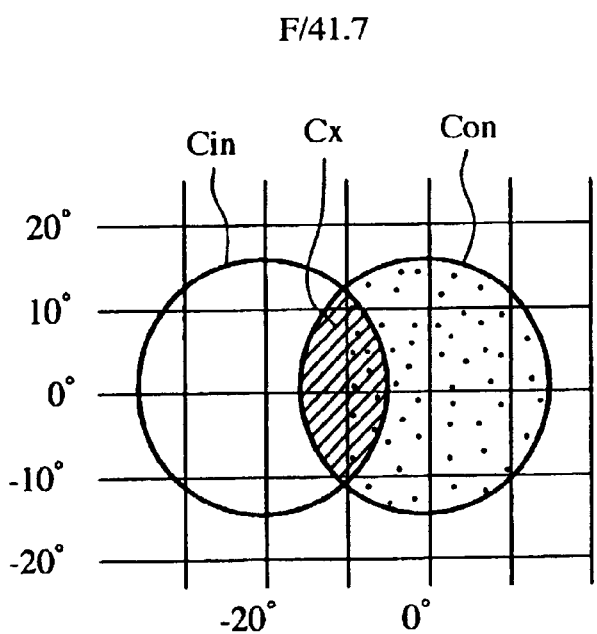
FIG. 28B shows an incident light flux Cin and an outgoing light flux Cout set to a diverging angle of about 16 degrees corresponding to the F-number F=1.7 in the symmetric optical system.

FIG. 28A shows an incident light flux Cin and an outgoing light flux Cout set to a diverging angle of 10 degrees corresponding to the F-number F=3 in the symmetric optical system, and FIG. 28B shows an incident light flux Cin and an outgoing light flux Cout set to a diverging angle of about 16 degrees corresponding to the F-number F=1.7 in the symmetric optical system.

As shown in FIG. 28A, when an incident light flux Cin incident on the reflection type optical-spatial modulator element 58 is set to a diverging angle of 10 degrees corresponding to the F-number F=3, the incident light flux Cin does not overlaps with an outgoing light flux Cout reflected on the micro-mirror set to the "on" state, and no interference component is generated.

In contrast, as shown in FIG. 28B, when an incident light flux Cin incident on the reflection type optical-spatial modulator element 58 is set to a diverging angle of about 16 degrees corresponding to the F-number F=1.7, a portion of the incident light flux Cin overlaps with a portion of the outgoing light flux Cout in an overlapping area Cx, and an interference component is generated in the overlapping area Cx.

Figure 29:
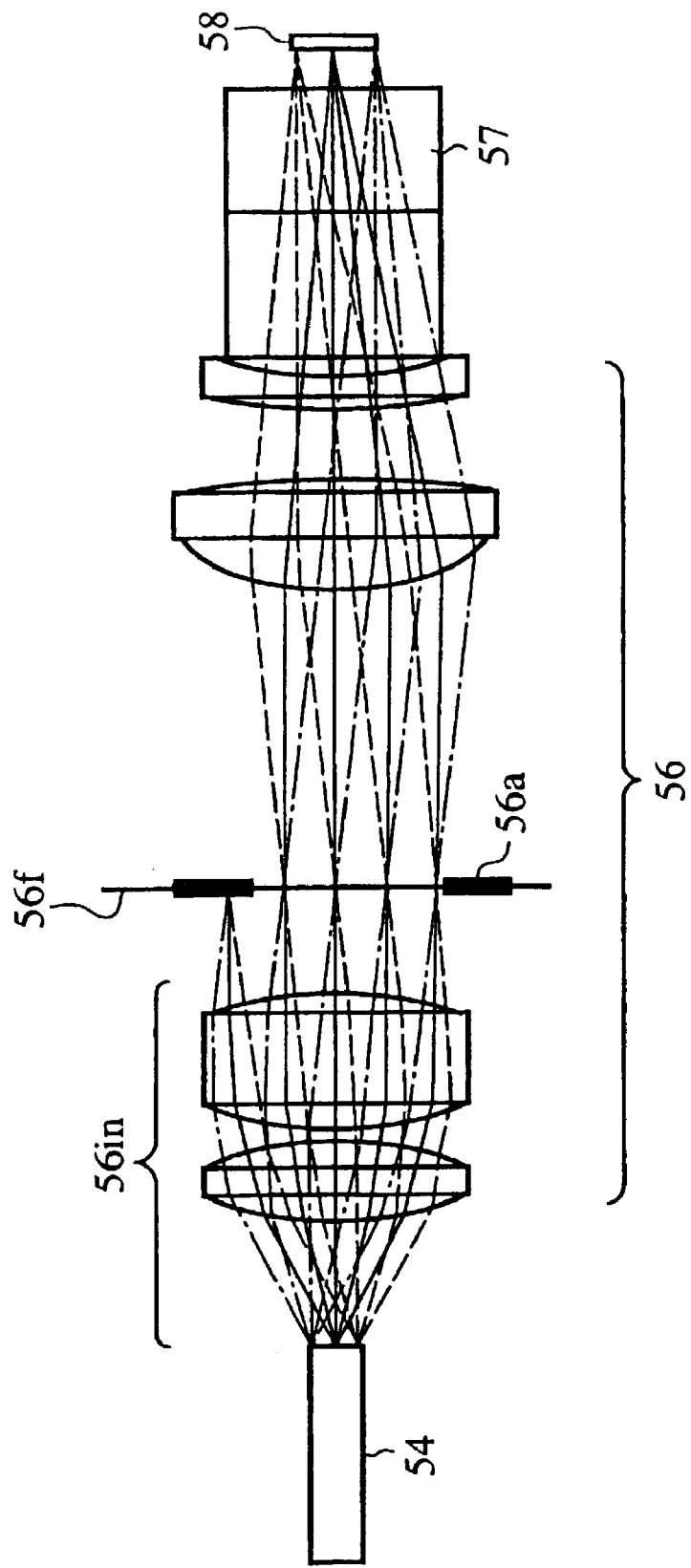
FIG. 29 is an enlarged view showing the asymmetric optical system.

To prevent the overlapping of the incident light flux Cin with the outgoing light flux Cout in the seventh embodiment, the asymmetric optical system shown in FIG. 29 in detail is used for the image displaying apparatus. In detail, the Fourier transformation plane 56f is formed by using the first group of lenses 56in of the relay lens unit 56, the relay deformed diaphragm 56a is placed on the Fourier transformation plane 56f, position information of the light fluxes output from the outgoing end plane 54a of the light-intensity distribution uniformizing element 54 is transformed into diverging angle information in the Fourier transformation plane 56f, and a portion of rays of the light flux having the diverging angle information is shielded from the reflection type optical-spatial modulator element 58 by the relay deformed diaphragm 56a.

FIG. 30 shows a plan view of the relay deformed diaphragm 56a, and FIG. 31 shows an asymmetric incident light flux Cin and an asymmetric outgoing light flux Cout set to a diverging angle of about 16 degrees corresponding to the F-number F=1.7 in the asymmetric optical system.

In FIG. 30, the aperture 56b of the relay deformed diaphragm 56a has a circular arc 56c corresponding to the F-number F=1.7 and a chord 56d figured by a wall 56w. The mid point of the chord 56d is placed on a circle (indicated by a dotted line) which is concentric with the circular arc 56c and corresponds to the F-number F=3. Therefore, the aperture 56b is formed in the D shape. Light placed outside the light flux corresponding to the F-number F=1.7 is intercepted by the wall 56w of the relay deformed diaphragm 56a placed outside the circular arc 56c. Therefore, a portion of the incident light flux overlapping with a portion of the outgoing light flux in the overlapping area Cx is intercepted by the wall 56w of the relay deformed diaphragm 56a placed outside the chord 56d. In this case, when the light flux passing through the first group of lenses 56in of the relay lens unit 56 is deformed by the relay deformed diaphragm 56a to form an asymmetric light flux in the second group of lenses 56out of the relay lens unit 56, as shown in FIG. 31, the asymmetric incident light flux Cin does not overlap with the asymmetric outgoing light flux Cout.

Next, the light receiving efficiency, the light recycle efficiency and the light use efficiency will be described in case of the light-intensity distribution uniformizing element 54 having the incident end plane 54a set to a larger size of 8.8 mm×6.7 mm.

Figures 33, 34:
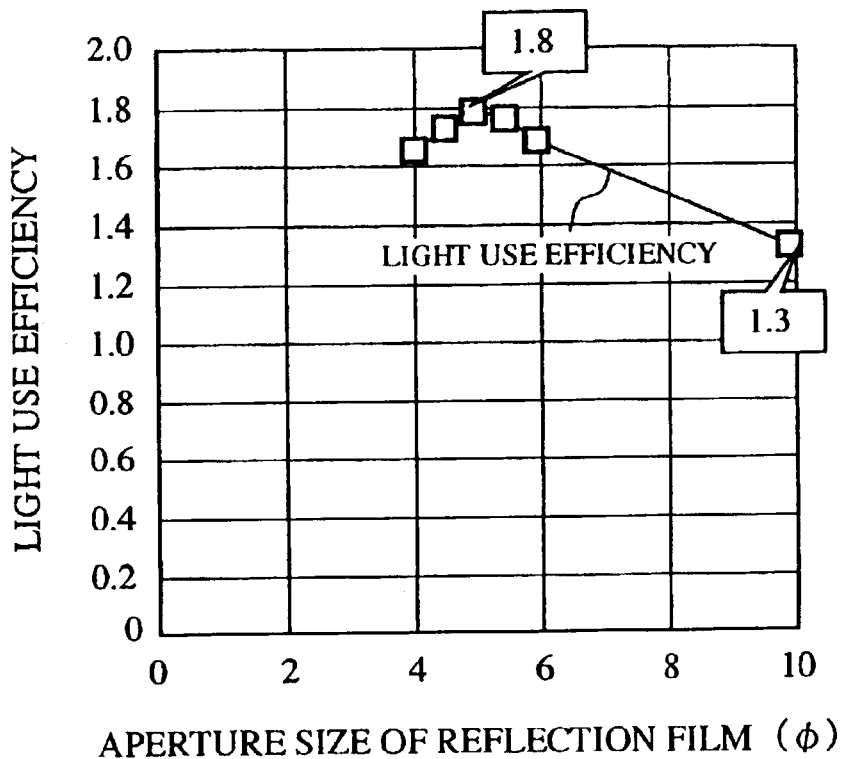
FIG. 33 shows a light use efficiency with respect to a size of an aperture of a relay deformed diaphragm.
FIG. 34 shows results of the improvement of the light use efficiency in three cases of the use of only the light recycle optical system, the use of only the asymmetric optical system and the use of both the light recycle optical system and the asymmetric optical system.
Figure 51:
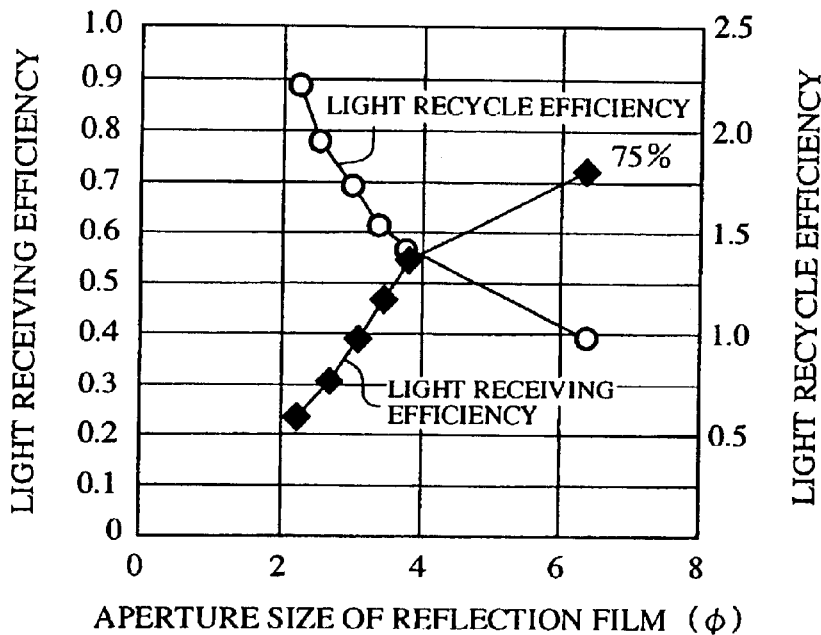
FIG. 51 is a view showing the relation between a light receiving efficiency and a light recycle efficiency when an incident end plane of an integrator rod shown in FIG. 46 is set to a regular size of 5×3.8 mm.
Figure 52:
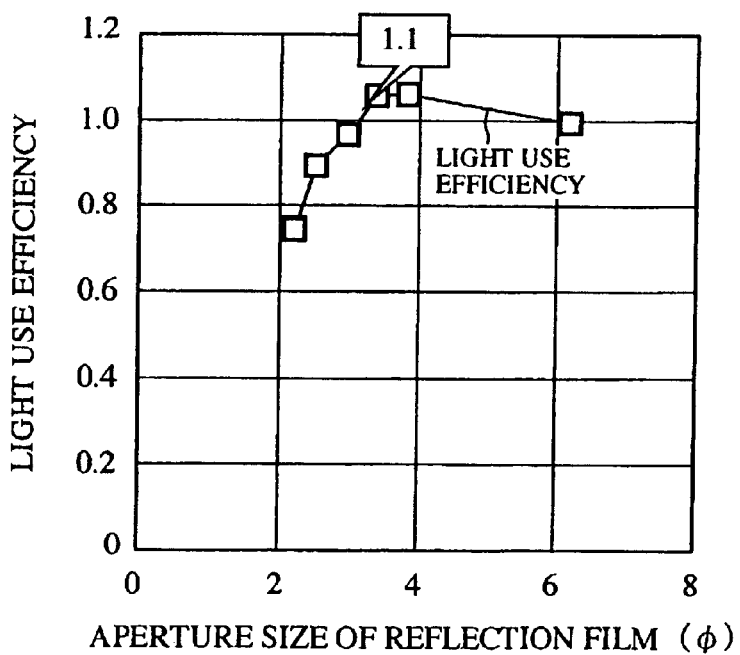
FIG. 52 is a view showing a light use efficiency when an incident end plane of an integrator rod shown in FIG. 46 is set to a regular size of 5×3.8 mm.

FIG. 32 shows the relation between the light receiving efficiency and the light recycle efficiency with respect to a size of the aperture 56b of the relay deformed diaphragm 56a in case of the light-intensity distribution uniformizing element 54 having the incident end plane 54a set to a larger size of 8.8 mm×6.7 mm. FIG. 33 shows the light use efficiency with respect to a size of the aperture 56b of the relay deformed diaphragm 56a in case of the light-intensity distribution uniformizing element 54 having the incident end plane 54a set to a larger size of 8.8 mm×6.7 mm. As is described in the prior art with reference to FIG. 51 and FIG. 52, the light use efficiency is defined as a product value of the light receiving efficiency and the light recycle efficiency, and the light use efficiency is normalized to unity for the case of the light recycle efficiency of 1.0 and the light receiving efficiency of 75%.

In FIG. 32 and FIG. 33, the aperture 56b having a diameter of 10 mm (φ10) corresponds to a case of no reflection film disposed on the incident end plane 54a of the light-intensity distribution uniformizing element 54. In cases where the asymmetric optical system is used for the image displaying apparatus shown in FIG. 26 without using the light recycle optical system (a diameter of 10 mm in the aperture 56b), the light receiving efficiency reaches about 96% (refer to FIG. 32). Because the light receiving efficiency is equal to 75% in the conventional image displaying apparatus shown in FIG. 43, the light use efficiency in the image displaying apparatus using only the asymmetric optical system is heightened to 1.3 times (96%/75%) of that in the conventional image displaying apparatus using the symmetric optical system without using the light recycle optical system (refer to FIG. 33).

In contrast, in cases where the diameter of the aperture 56b is set to 5 mm (φ5) in the image displaying apparatus shown in FIG. 27, an area of the aperture 56b is equal to about ⅓ of an area (8.8 mm×6.7 mm) of the incident end plane 54a of the light-intensity distribution uniformizing element 54, and the asymmetric light fluxes obtained by using both the light recycle optical system and the asymmetric optical system are incident on the reflection type optical-spatial modulator element 58. In this case, the effect of the optimum combination of the light receiving efficiency and the light recycle efficiency is obtained, and the light use efficiency is considerably heightened to 1.8 times of that in the conventional image displaying apparatus using the symmetric optical system without using the light recycle optical system (refer to FIG. 33).

FIG. 34 shows results of the improvement of the light use efficiency in three cases of the use of only the light recycle optical system, the use of only the asymmetric optical system and the use of both the light recycle optical system and the asymmetric optical system.

In case of no use of the asymmetric optical system, the incident end plane 204in of the integrator rod 204 is set to the size of 5 mm×3.8 mm. In case of the use of the asymmetric optical system, the incident end plane 54a of the light-intensity distribution uniformizing element 54 is set to the size of 8.8 mm×6.7 mm.

Figure 43:
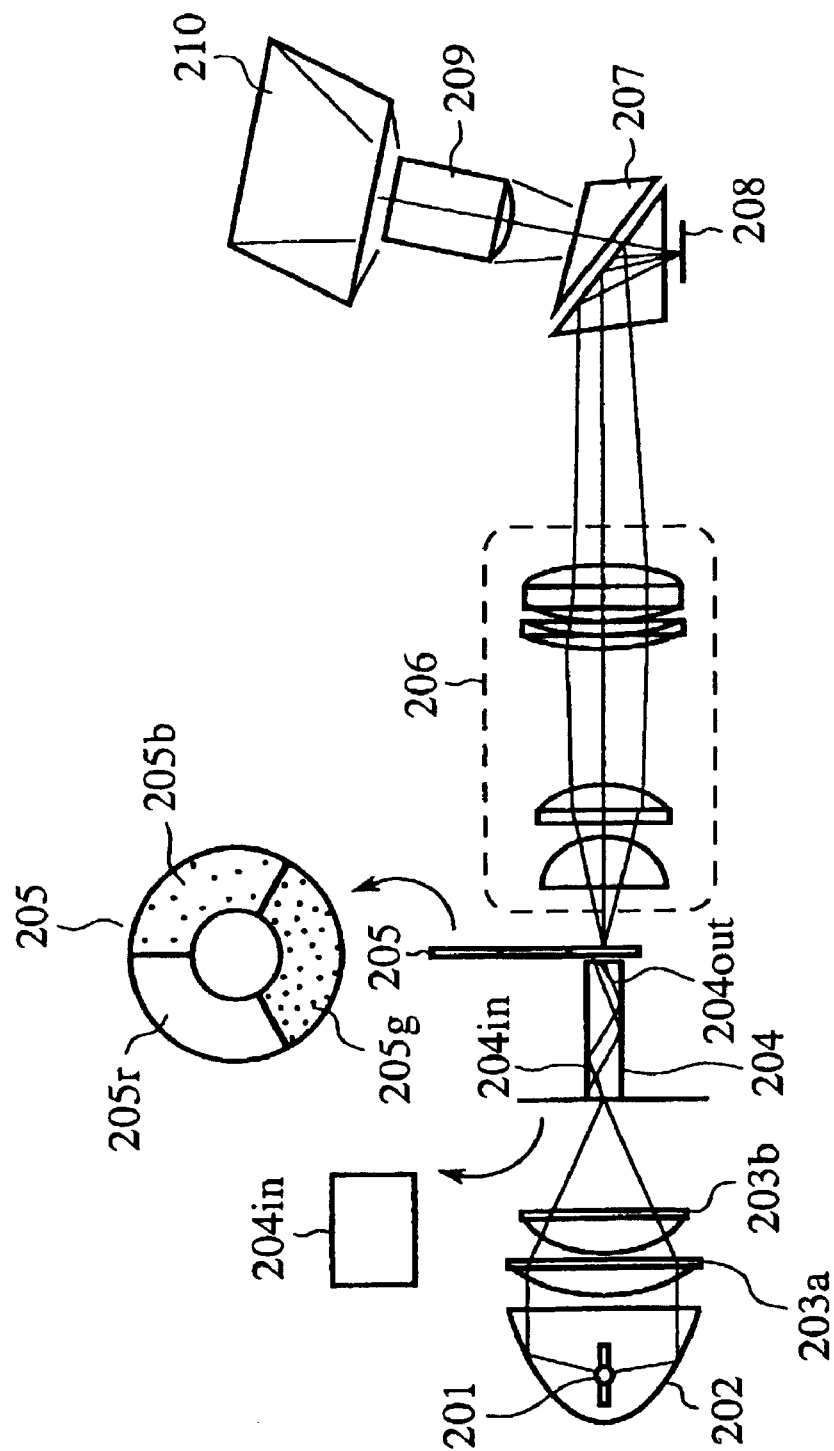
FIG. 43 is a view of the configuration of another conventional image displaying apparatus.
Figure 44:
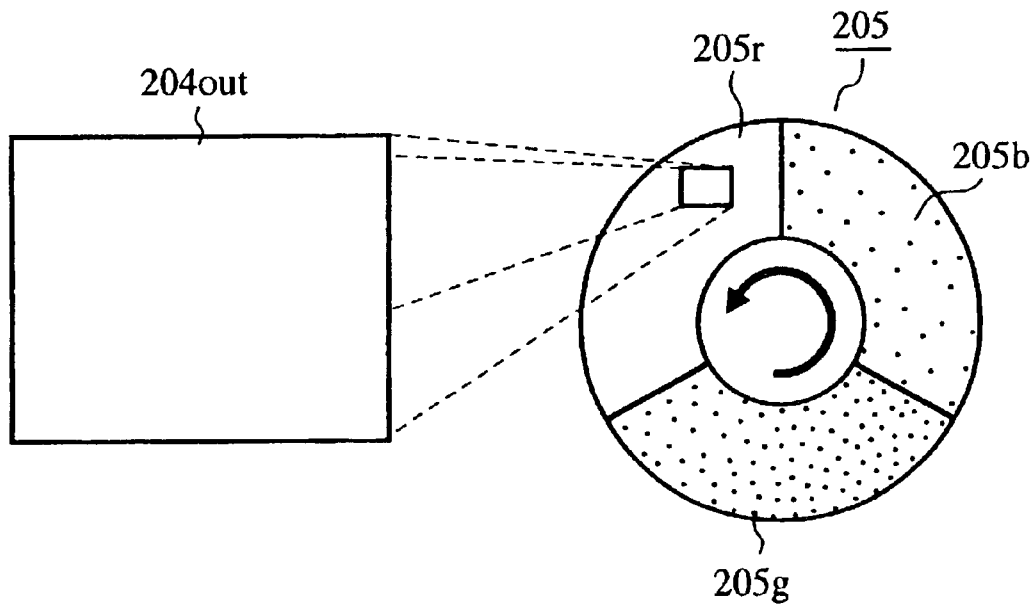
FIG. 44 is a view of the configuration of a color wheel used for the conventional image displaying apparatus shown in FIG. 43.

As shown in FIG. 34, the light use efficiency in the conventional image displaying apparatus shown in FIG. 46 corresponding to the case of the use of only the light recycle optical system is equal to about 1.1 times of that in the conventional displaying apparatus shown in FIG. 43, and the light use efficiency in the image displaying apparatus shown in FIG. 26 corresponding to the use of only the asymmetric optical system is equal to about 1.3 times of that in the conventional displaying apparatus shown in FIG. 43. In contrast, the light use efficiency in the image displaying apparatus shown in FIG. 27 corresponding to the use of both the light recycle optical system and the asymmetric optical system is equal to about 1.8 times of that in the conventional displaying apparatus shown in FIG. 43. Therefore, in cases where the diameter of the aperture 56b is set to 5 mm (φ5) in the image displaying apparatus shown in FIG. 27, the light use efficiency can be considerably improved.

Next, a range of the F-number corresponding to the diverging angle of the asymmetric light flux incident on the reflection type optical-spatial modulator element 58 will be described below.

Figures 36A, 36B:
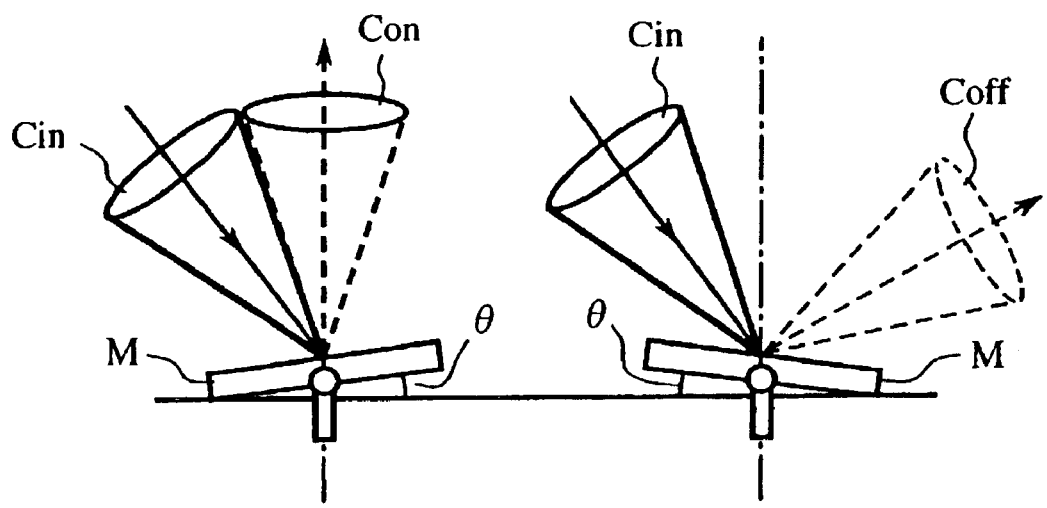
FIG. 36A shows an incident asymmetric light flux Cin incident on a micro-mirror set to an "on" state and an outgoing asymmetric light flux Cout.
FIG. 36B shows an incident asymmetric light flux Cin incident on a micro-mirror set to an "off" state and an outgoing asymmetric light flux Cout.
Figure 37:
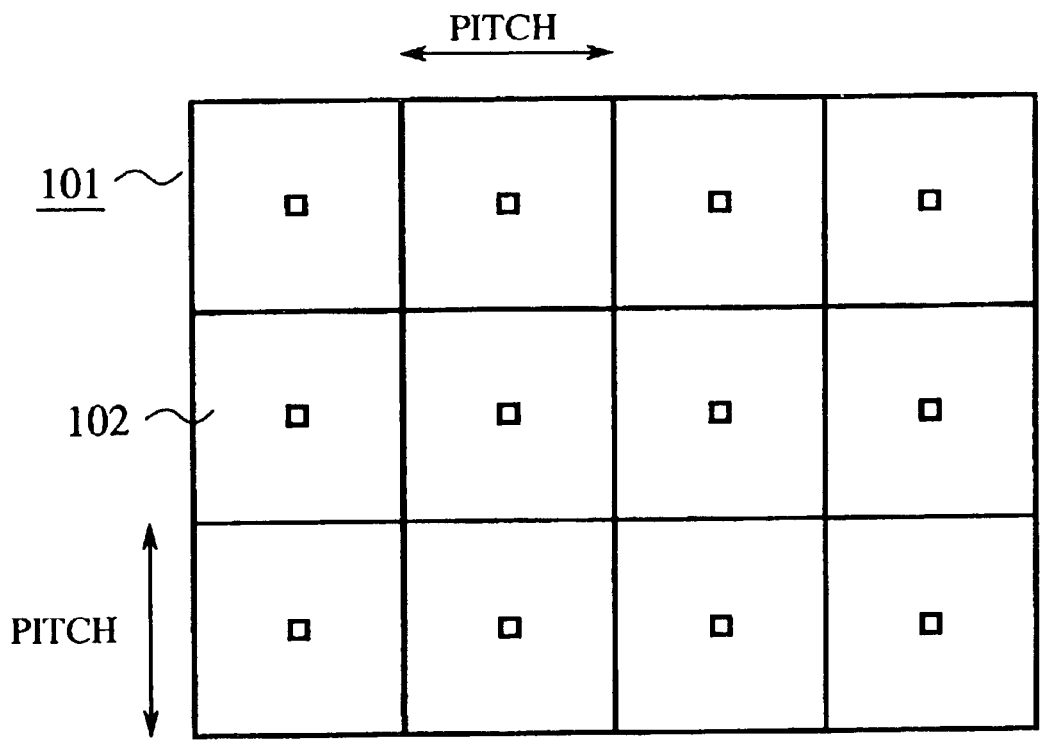
FIG. 37 is a partially enlarged view of a reflecting surface of a DMD.
Figure 38:
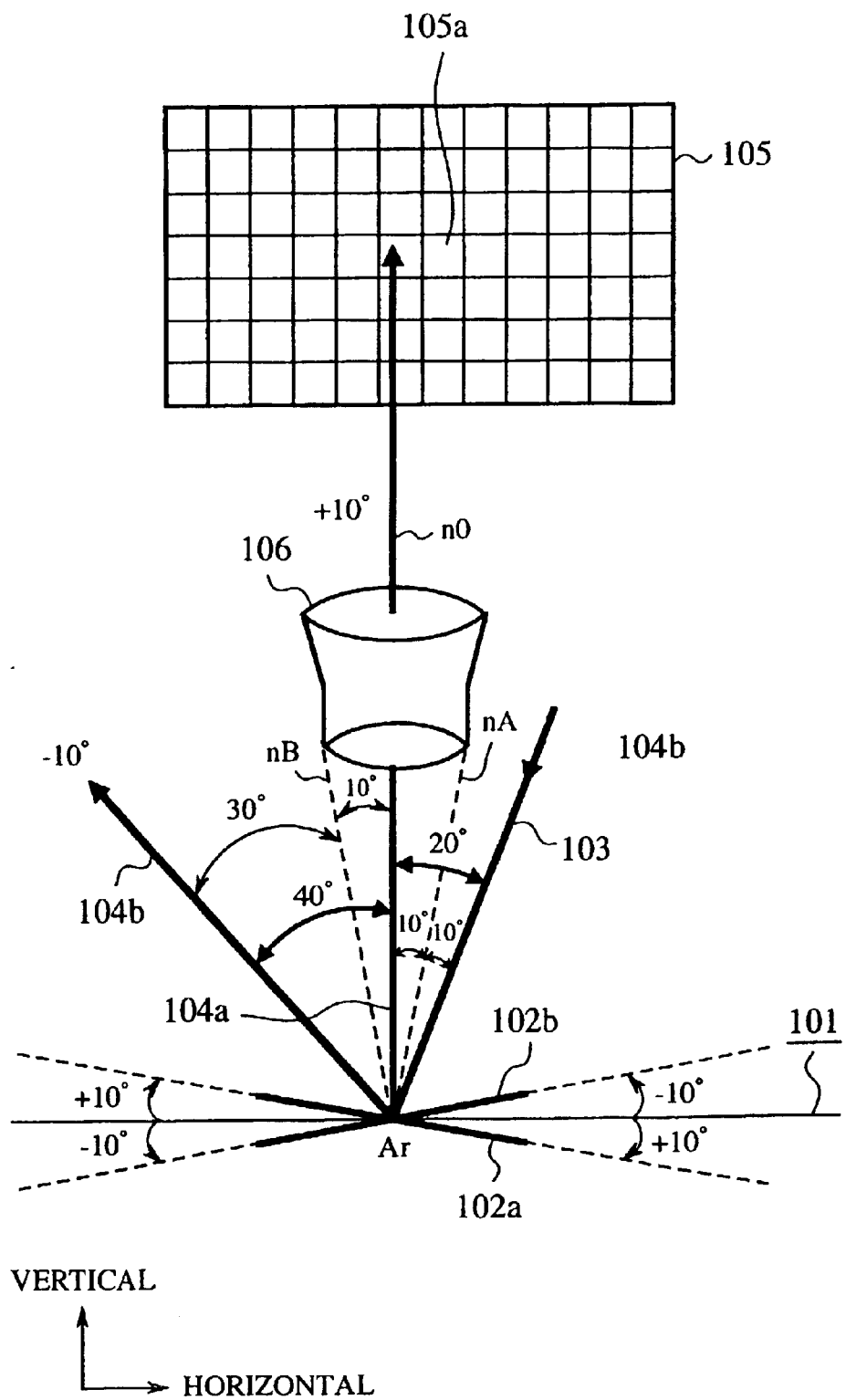
FIG. 38 is an explanatory view of an operation of an inclination control performed for a micro-mirror.

FIG. 35 is a graphic view showing the brightness of the image displayed on the screen 60 with respect to the F-number corresponding to the asymmetric light flux incident on the reflection type optical-spatial modulator element 58. FIG. 36A shows the incident asymmetric light flux Cin incident on a micro-mirror of the "on" state and the outgoing asymmetric light flux Cout. FIG. 36B shows the incident asymmetric light flux Cin incident on a micro-mirror of the "off" state and the outgoing asymmetric light flux Cout.

In cases where the high pressure mercury lamp emitting the light in a doughnut shaped angular distribution is used as the light source 51, the brightness of the image displayed on the screen 60 is calculated with respect to the F-number corresponding to the diverging angle of the asymmetric light flux incident on the reflection type optical-spatial modulator element 58.

As shown in FIG. 36A and FIG. 36B, the micro-mirror M is inclined by the inclination angle θin in the counter-clockwise direction so as to be set to the "on" state, and the micro-mirror M is inclined by the inclination angle θin in the clockwise direction so as to be set to the "off" state.

As shown in FIG. 35, the more the F-number is decreased, the more the brightness is heightened. The brightness is maximized at the F-number F=1.3. Therefore, the range of the F-number can be expressed according to an equation (1).

$$1.3 < F\text{-number} < 1/(2 \times \tan \theta in) \qquad (1)$$

Here the maximum value of the F-number equal to $1/(2 \times \tan \theta in)$ is used for the conventional image displaying apparatus. Also, the brightness is maximized in case of the F-number equal to 1.3.

Also, in cases where the general high pressure mercury lamp is used as the light source 51, the diameter of the converged spot of the white light flux formed on the incident end plane 54a of the light-intensity distribution uniformizing element 54 depends on the arc length of the light source 51, and the white light flux formed in a doughnut shaped angular distribution is converged on the incident end plane 54a of the light-intensity distribution uniformizing element 54. To receive the white light flux in the light-intensity distribution uniformizing element 54 at high efficiency, it is preferred that the size of the incident end plane 54a of the light-intensity distribution uniformizing element 54 is enlarged to a value corresponding to the F-number of 1.7 in case of the inclination angle θin of 10 degrees. Therefore, to receive the white light flux in the light-intensity distribution uniformizing element 54 at high efficiency, the range of the F-number is generally formulated as follows.

$$1.3 < F\text{-number} \leq 1/(2 \times \tan(1.5 \times \theta in)) \qquad (2)$$

Also, the inclination angle θin=10 degrees, the inclination angle θin=12 degrees and the inclination angle θin=14 degrees are actually used for the reflection type optical-spatial modulator element or the DMD widely used in this technical field. Therefore, the range of the F-number is formulated for each value of the inclination angle θ according to the equation (1),

| | |
|---|---|
| 1.3 ≤ F-number ≤ 3.0 | in case of θ in = 10 degrees |
| 1.3 ≤ F-number ≤ 2.35 | in case of θ in = 12 degrees |
| 1.3 ≤ F-number ≤ 2.0 | in case of θ in = 14 degrees |

As is described above, in the seventh embodiment, the image displaying apparatus includes the condensing lenses 53a and 53b for converging parallel white light emitted from the combination of the light source 51 and the parabola reflector 52, the light-intensity distribution uniformizing element 54 having the incident end plane 54a larger than the regular size (5 mm×3.8 mm), the reflection film 61 disposed on the incident end plane 54a of the light-intensity distribution uniformizing element 54, the SCR wheel 62 disposed on the outgoing end plane 54b of the light-intensity distribution uniformizing element 54, the first group of lenses 56in of the relay lens unit 56, the relay deformed diaphragm 56a placed on the Fourier transformation plane 56f which is determined by the first group of lenses 56in, the TIR prism 57, the reflection type optical-spatial modulator element 58, the projection lens 59 and the screen 60. Therefore, a white light flux converged onto the incident end plane 54a by the condensing lenses 53a and 53b is received in the light-intensity distribution uniformizing element 54 through the aperture 61h of the reflection film 61, a plurality of white light fluxes are output from the outgoing end plane 54b of the light-intensity distribution uniformizing element 54, light reflected on the SCR wheel 62 is reflected on the reflection film 61 and is output from the outgoing end plane 54b of the light-intensity distribution uniformizing element 54 as recycle light Lr by the function of the light recycle optical system, a plurality of red light fluxes (R), a plurality of blue light fluxes (B) and a plurality of green light fluxes (G) are simultaneously separated as a plurality of colored light fluxes from the white light fluxes including the recycle light Lr in the SCR wheel 62, the colored light fluxes pass through the relay lens unit 56 and the aperture 56b of the relay deformed diaphragm 56a so as to be changed to a plurality of asymmetric colored light fluxes formed in an asymmetric shape in section, the asymmetric colored light fluxes are incident on the micro-mirrors of the reflection type optical-spatial modulator element 58 through the TIR prism 57, the asymmetric colored light fluxes reflected on the micro-mirrors set to the "on" state pass through the projection lens 59, and an image formed of the asymmetric colored light fluxes is displayed on the screen 60. Accordingly, the light use efficiency can be considerably heightened.

Also, in the seventh embodiment, because the relay deformed diaphragm 56a has the aperture 56b formed in the D shape, the asymmetric colored light fluxes formed in the asymmetric shape in section are formed in the relay lens unit 56 including the relay deformed diaphragm 56a, and the overlapping of a portion of the asymmetric colored light fluxes incident on the micro-mirrors with a portion of the asymmetric colored light fluxes reflected on the micro-mirrors can be prevented. Accordingly, the image can be maintained at high contrast.

Also, in the seventh embodiment, when each micro-mirror set to the "on" state is inclined at the inclination angle θin, the range of the F-number corresponding to the diverging angle of the asymmetric light flux incident on the reflection type optical-spatial modulator element 58 is expressed by an equation $1.3 \leq F\text{-number} < 1/(2 \times \tan \theta in)$. Accordingly, the light use efficiency can be considerably heightened on condition that the image is maintained at high contrast.

Also, in the seventh embodiment, when each micro-mirror set to the "on" state is inclined at the inclination angle θin, the range of the F-number corresponding to the diverging angle of the asymmetric light flux incident on the reflection type optical-spatial modulator element 58 in a doughnut shaped angular distribution is expressed by an equation $1.3 \leq F\text{-number} \leq 1/(2 \times \tan(1.5 \times \theta in))$. Accordingly, the light use efficiency can be considerably heightened on condition that the image is maintained at high contrast.

Also, in the seventh embodiment, an area of the aperture 56b of the relay deformed diaphragm 56a is set to about ⅓ of an area (8.8 mm×6.7 mm) of the incident end plane 54a of the light-intensity distribution uniformizing element 54, the light use efficiency can be considerably heightened to a value which is equal to about 1.8 times of that in the conventional displaying apparatus.

Here, in the seventh embodiment, it is applicable that the projection lens deformed diaphragm 12b shown in FIG. 13B be disposed on the a Fourier transformation plane determined by an incident group of lenses of the projection lens 59 in the same manner as in the first embodiment to remove stray light from the asymmetric colored light fluxes projected on the screen 60.

Also, in the seventh embodiment, it is applicable that the cylindrical lenses 25 and 26 shown in FIG. 14, the prism 30 shown in FIG. 15A or the aperture plate 31 shown in FIG. 16A be arranged in the image displaying apparatus in place of the relay deformed diaphragm 56a in the same manner as in the second embodiment.

Also, in the seventh embodiment, it is applicable that the light-intensity distribution uniformizing element 32 and the cylindrical lenses 33 and 34 be arranged in the image displaying apparatus in place of the light-intensity distribution uniformizing element 54 and the relay lens unit 56 in the same manner as in the third embodiment.

Also, in the seventh embodiment, it is applicable that a diverging angle of a colored light flux incident on the reflection type optical-spatial modulator element 58 be set to 10+α degrees (α>0) in the same manner as in the fourth embodiment.

What is claimed is:

1. A light converging optical system, in which light incident on a reflecting optical-spatial modulator element having a plurality of micro-mirrors respectively inclined at an inclination angle is converged, comprising:

a converging lens changing light emitted from a light source into a first light flux having a first diverging angle corresponding to a first F-number;

a light-intensity distribution uniformizing element changing the first light flux received from the converging lens into a plurality of second light fluxes respectively corresponding to the first F-number, equalizing intensities of the second light fluxes in an outgoing end plane and outputting the second light fluxes having uniform intensity distribution; and a relay optical system changing each second light flux output from the light-intensity distribution uniformizing element to a third light flux having a second diverging angle larger than the inclination angle of each micro-mirror of the reflecting optical-spatial modulator element and relaying the third light flux of the second diverging angle to the reflecting optical-spatial modulator element, wherein the relay optical system comprises:

a first group of lenses producing a Fourier transformation plane in which position information indicating positions of rays of the second light fluxes in the outgoing end plane of the light-intensity distribution uniformizing element is transformed into diverging angle information indicating diverging angles of rays of light relative to an optical axis of the light-intensity distribution uniformizing element;

a relay deformed diaphragm, disposed proximate the Fourier transformation plane produced by the first group of lenses, receiving the rays of light having the diverging angle information from the first group of lenses, intercepting a portion of the rays of light as an interference component in reflection by a micro-mirror set to an "on" state in the reflecting optical-spatial modulator element, according to the diverging angle information; and a second group of lenses changing the rays of light passing through the relay deformed diaphragm to the third light fluxes of the second diverging angle and outputting the third light fluxes to the reflecting optical-spatial modulator element.

2. The light converging optical system according to claim 1, wherein the relay deformed diaphragm is shaped to intercept an interference portion of each third light flux which interferes with a reflected light flux obtained by reflection of the third light flux on the micro-mirror set to the "on" state.

3. The light converging optical system a according to claim 1, wherein the relay deformed diaphragm has an aperture with a shape substantively the shape of the letter D.

4. The light converging optical system according to claim 1, wherein the micro-mirror set to the "on" state is inclined by an angle θ from a reflecting surface of the reflecting optical-spatial modulator element, and an F-number of each third light flux is at least 1.3 and is no more than $1/(2 \times \tan\theta)$.

5. The light converging optical system according to claim 1, wherein the micro-mirror set to the "on" state is inclined by an angle θ from a reflecting surface of the reflecting optical-spatial modulator element, and an F-number of each third light flux is at least 1.3 and no more than $1/(2 \times \tan(1.5 \times \theta))$.

6. An image displaying apparatus, in which converged light is incident on a reflecting optical-spatial modulator element having a plurality of micro-mirrors respectively inclined at an inclination angle to display an image, comprising:

a converging lens changing light emitted from a light source into a first light flux corresponding to a first F-number;

a light-intensity distribution uniformizing element changing the first light flux received from the converging lens into a plurality of second light fluxes respectively corresponding to the first F-number, equalizing intensities of the second light fluxes in an outgoing end plane and outputting the second light fluxes having a uniform intensity distribution;

a relay optical system changing each second light flux output from the light-intensity distribution uniformizing element into a third light flux having a second diverging angle larger than the inclination angle of each micro-mirror of the reflecting optical-spatial modulator element and relaying the third light flux of the second diverging angle to the reflecting optical-spatial modulator element;

a projecting optical system projecting the third light fluxes which are output from the relay optical system and receive image information in the reflecting optical-spatial modulator element; and a screen for forming an image from the third light fluxes projected by the projecting optical system according to the image information included in the third light fluxes projected by the projecting optical system, wherein the relay optical system comprises:

a first group of lenses producing a Fourier transformation plane in which position information indicating positions of rays of the second light fluxes in the outgoing end plane of the light-intensity distribution uniformizing element is transformed into diverging angle information indicating diverging angles of rays of light relative to an optical axis of the reflecting optical-spatial modulator element;

a relay deformed diaphragm, disposed proximate the Fourier transformation plane produced by the first group of lenses, receiving the rays of light having the diverging angle information from the first group of lenses, intercepting a portion of the rays of light as an interference component in reflection by a micro-mirror set to an "on" state in the reflecting optical-spatial modulator element, according to the diverging angle information; and a second group of lenses changing the rays of light passing through the relay deformed diaphragm to the third light fluxes of the second diverging angle and outputting the third light fluxes to the reflecting optical-spatial modulator element.

7. The image displaying apparatus according to claim 6, further comprising:

a reflection film with an aperture, disposed on an incident end plane of the light-intensity distribution uniformizing element, passing the first light flux through the aperture; and a sequential color recapture wheel, disposed on the outgoing end plane of the light-intensity distribution uniformizing element, separating light of one color from the second light fluxes which are produced in the light-intensity distribution uniformizing element from the first light flux passing through the aperture of the reflection film.

8. The image displaying apparatus according to claim 6, further comprising a reflection film with an aperture, disposed on an incident end plane of the light-intensity distribution uniformizing element, wherein area of the aperture is substantially equal to ⅓ of area of the incident end plane.

9. The image displaying apparatus according to claim 6, wherein the projecting optical system comprises:

an incident-side lens producing a projecting optical system Fourier transformation plane in which position information indicating positions of a plurality of micro-mirrors set to the "on" state in a reflecting surface of the reflecting optical-spatial modulator element is transformed into diverging angle information indicating diverging angles of rays of a portion of third light fluxes reflected by the micro-mirrors with respect to the optical axis of the light-intensity distribution uniformizing element;

a projecting optical system deformed diaphragm, disposed proximate the projecting optical system Fourier transformation plane produced by the incident-side lens, passing the third light fluxes reflected on the micro-minors in the "on" state sent from the incident-side lens and intercepting light other than the third light fluxes, according to the diverging angle information indicated by the third light fluxes; and an outgoing-side lens outputting the third light fluxes passing through the projecting optical system deformed diaphragm to the screen.

10. The image displaying apparatus according to claim 9, wherein propagation direction of each third light flux reflected on the micro-mirror of an "off" state is shifted in a θx angular direction as compared with a propagation direction of the third light flux reflected by the micro-mirror in the "on" state, propagation direction of a principal ray of the third light flux reflected by the micro-mirror in the "on" state is expressed by an angle value θx=0 in the θx angular direction, and the projecting optical system deformed diaphragm has an aperture having a shape substantially the shape of the letter D, intercepting rays of the third light fluxes which are reflected by the micro-mirrors in the "on" state and propagated at angles at least equal to a stop angle θc in the θx angular direction.

11. The image displaying apparatus according to claim 10, wherein an inclination angle of each micro-mirror set to the "on" state and an inclination angle of the micro-mirror set to the "off" state are expressed by +θin and −θin, respectively, θin is a positive angle, propagation directions of the third light fluxes reflected by the micro-mirrors in the "on" state has a maximum angle θp in the θx angular direction, and the relation $0.5 \times \theta in < \theta c < \theta p$ is satisfied.

12. The image displaying apparatus according to claim 10, wherein an inclination angle of each micro-mirror set to the "on" state and an inclination angle of the micro-mirror set to the "off" state are expressed by +θin and −θin, respectively, θin is a positive angle, and the stop angle θc is substantially equal to the inclination angle θin.

13. An image displaying apparatus, in which converged light is incident on a reflecting optical-spatial modulator element having a plurality of micro-mirrors respectively inclined at an inclination angle to display an image, comprising:

a light source emitting light;

light changing means for changing width of the light emitted from the light source to a first width in a first co-ordinate axial direction perpendicular to a propagation direction of the light and changing the width of the light emitted from the light source to a second width, larger than the first width, in a second co-ordinate axial direction, perpendicular to both the propagation direction of the light and the first co-ordinate axial direction;

a converging lens converging the light changed by the light changing means into a first light flux in which a diverging angle in the second co-ordinate axial direction is larger than that in the first co-ordinate axial direction;

a light-intensity distribution uniformizing element changing the first light flux converged by the converging lens into a plurality of second light fluxes, equalizing intensities of the second light fluxes in an outgoing end plane and outputting each second light flux in which a diverging angle in the second co-ordinate axial direction is larger than that in the first co-ordinate axial direction;

a relay optical system changing each second light flux output from the light-intensity distribution uniformizing element into a third light flux, in which a diverging angle in the second co-ordinate axial direction is larger than that in the first co-ordinate axial direction and is larger than the inclination angle of the corresponding micro-mirror of the reflecting optical-spatial modulator element, and relaying the third light fluxes to the reflecting optical-spatial modulator element while making the second co-ordinate axial direction parallel to a rotation axis of each micro-mirror of the reflecting optical-spatial modulator element;

a projecting optical system projecting the third light fluxes which are output from the relay optical system and receive image information in the reflecting optical-spatial modulator element; and a screen for forming an image from the third light fluxes projected by the projecting optical system according to the image information included in the third light fluxes projected by the projecting optical system.

14. The image displaying apparatus according to claim 13, wherein the projecting optical system comprises:

an incident-side lens producing a projecting optical system Fourier transformation plane in which position information indicating positions of a plurality of micro-mirrors set to the "on" state on a reflecting surface of the reflecting optical-spatial modulator element is transformed into diverging angle information indicating diverging angles of rays of a portion of third light fluxes reflected by the micro-mirrors with respect to the optical axis of the reflecting optical-spatial modulator element;

a projecting optical system deformed diaphragm, disposed proximate the projecting optical system Fourier transformation plane produced by the incident-side lens, passing the third light fluxes reflected by the micro-mirrors in the "on" state sent from the incident-side lens and intercepting light other than the third light fluxes according to the diverging angle information indicated by the third light fluxes; and an outgoing-side lens outputting the third light fluxes passing through the projecting optical system deformed diaphragm to the screen.

15. The image displaying apparatus according to claim 14, wherein propagation direction of each third light flux reflected by the micro-mirror in an "off" state is shifted in a θx angular direction as compared with a propagation direction of the third light flux reflected by the micro-mirror in the "on" state, a propagation direction of a principal ray of the third light flux reflected by the micro-mirror of the "on" state is expressed by an angle value θx=0 in the θx angular direction, and the projecting optical system deformed diaphragm has an aperture substantially elliptical in shape to intercept rays of the third light fluxes which are reflected by the micro-mirrors in the "on" state and are propagated in prescribed angles θell satisfying θell <−θc' or θc'<θell in case of a stop angle θc'>0 in the θx angular direction.

16. The image displaying apparatus according to claim 15, wherein an inclination angle of each micro-mirror set to the "on" state and an inclination angle of the micro-mirror set to the "off" state are expressed by +θin and −θin, respectively, θin is a positive angle, propagation directions of the third light fluxes reflected by the micro-mirrors in the "on" state has a maximum angle θp in the θx angular direction, and the relation 0.5×θ in <θc'<θp is satisfied.

17. The image displaying apparatus according to claim 15, wherein an inclination angle of each micro-mirror set to the "on" state and an inclination angle of the micro-mirror set to the "off" state are expressed by +θin and −θin, respectively, Gin is a positive angle, and the stop angle θc' is substantially equal to the inclination angle θin.

18. The image displaying apparatus according to claim 13, further comprising:

a reflection film with an aperture, disposed on an incident end plane of the light-intensity distribution uniformizing element, passing the first light flux through the aperture; and a sequential color recapture wheel, disposed on the outgoing end plane of the light-intensity distribution uniformizing element, separating light of a color from the second light fluxes which are produced in the light-intensity distribution uniformizing element from the first light flux passing through the aperture of the reflection film.

19. The image displaying apparatus according to claim 13, further comprising:

a reflection film with an aperture, disposed on an incident end plane of the light-intensity distribution uniformizing element, wherein area of the aperture is substantially equal to ⅓ of area of the incident end plane.

* * * * *